(12) United States Patent
Mazaki et al.

(10) Patent No.: US 11,742,747 B2
(45) Date of Patent: Aug. 29, 2023

(54) POWER SUPPLY SYSTEM

(71) Applicant: DENSO CORPORATION, Kariya (JP)

(72) Inventors: Koji Mazaki, Kariya (JP); Kazuyoshi Obayashi, Kariya (JP); Tadatoshi Asada, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/672,849

(22) Filed: Feb. 16, 2022

(65) Prior Publication Data
US 2022/0169193 A1    Jun. 2, 2022

Related U.S. Application Data

(60) Division of application No. 16/825,312, filed on Mar. 20, 2020, now Pat. No. 11,465,574, which is a (Continued)

(30) Foreign Application Priority Data

Sep. 22, 2017  (JP) .................................. 2017-183010
Jul. 31, 2018  (JP) .................................. 2018-144219

(51) Int. Cl.
*B60R 16/033*    (2006.01)
*H02H 3/08*      (2006.01)
(Continued)

(52) U.S. Cl.
CPC ............. *H02M 1/32* (2013.01); *B60R 16/033* (2013.01); *H02H 3/08* (2013.01); *H02J 1/10* (2013.01);
(Continued)

(58) Field of Classification Search
CPC ........ H02M 1/32; H02M 3/158; H02M 1/325; H02M 3/00; B60R 16/033; H02H 3/08;
(Continued)

(56) References Cited

U.S. PATENT DOCUMENTS

| 5,559,466 A | 9/1996 | Okumura et al. |
| 2015/0087990 A1 | 3/2015 | Honda et al. |
| | (Continued) | |

FOREIGN PATENT DOCUMENTS

| JP | 2006-258485 A | 9/2006 |
| JP | 2008-276727 A | 11/2008 |
| | (Continued) | |

OTHER PUBLICATIONS

Oct. 30, 2018 International Search Report issued in International Patent Application No. PCT/JP2018/031324.
(Continued)

*Primary Examiner* — Jared Fureman
*Assistant Examiner* — Michael J Warmflash
(74) *Attorney, Agent, or Firm* — Oliff PLC

(57) ABSTRACT

A power supply system having a plurality of power systems is provided with a power output section in each of the power systems, an electrical load in each of the power systems, operating from power supplied by the power output section, main paths that connect the power output sections of adjacent ones of the power systems, an inter-system switch that establishes a conducting condition between the adjacent power systems by being turned on and establishes a disconnected condition between the adjacent power systems by being turned off, and an intra-system switch in each of the power systems, which is disposed on the main path between the power output section and the inter-system switch, and which establishes a conducting condition between the power output section and the electrical load by being turned on and establishes a disconnected condition between the power output section and the electrical load by being turned off.

2 Claims, 44 Drawing Sheets

Related U.S. Application Data continuation of application No. PCT/JP2018/031324, filed on Aug. 24, 2018.

(51) Int. Cl.
  *H02J 1/10* (2006.01)
  *H02J 7/14* (2006.01)
  *H02J 7/34* (2006.01)
  *H02M 3/158* (2006.01)
  *H02M 1/32* (2007.01)

(52) U.S. Cl.
  CPC .............. *H02J 7/1423* (2013.01); *H02J 7/34* (2013.01); *H02M 3/158* (2013.01)

(58) Field of Classification Search
  CPC .. H02H 7/28; H02J 1/10; H02J 7/1423; H02J 7/34; H02J 1/082; H02J 7/1492; H02J 2310/46; H02J 1/08; H02J 1/084; H02J 7/143

See application file for complete search history.

(56) References Cited

U.S. PATENT DOCUMENTS

| | | |
|---|---|---|
| 2015/0277457 A1 | 10/2015 | Sakaguchi et al. |
| 2015/0311752 A1* | 10/2015 | Luebke ............. H02J 13/00007 361/63 |
| 2017/0030316 A1 | 2/2017 | Sekiguchi |
| 2018/0001850 A1 | 1/2018 | Kontani |
| 2020/0216002 A1 | 7/2020 | Mazaki et al. |

FOREIGN PATENT DOCUMENTS

| | | |
|---|---|---|
| JP | 2015-074348 A | 4/2015 |
| JP | 2015-077933 A | 4/2015 |
| JP | 2016-054617 A | 4/2016 |
| JP | 2016128283 A | 7/2016 |
| JP | 2016-187236 A | 10/2016 |
| JP | 2016-203969 A | 12/2016 |
| JP | 2017-141012 A | 8/2017 |

OTHER PUBLICATIONS

Dec. 6, 2021, Requirement for Restriction/ Election Issued in U.S. Appl. No. 16/825,312.

\* cited by examiner

| GROUND FAULT LOCATION AND DIRECTION OF CURRENT FLOW IN SWITCH | | | | | | | | SWITCHES THAT BECOME SPECIFIED |
|---|---|---|---|---|---|---|---|---|
| | A/B | SW201 | C/G | SW100 | D/H | SW202 | E/F | |
| (a) | — | ➡ | — | ➡ | — | ➡ | — | NONE |
| (b) | ✕ | ⬅ | — | ⬅ | — | ⬅ | — | SW201 |
| (c) | — | ➡ | ✕ | ⬅ | — | ⬅ | — | SW201, SW100 |
| (d) | — | ➡ | — | ➡ | ✕ | ⬅ | — | SW100, SW202 |
| (e) | — | ➡ | — | ➡ | — | ➡ | ✕ | SW202 |

| GROUND FAULT LOCATION AND DIRECTION OF CURRENT FLOW IN SWITCH | | | | | | | | SWITCHES THAT BECOME SPECIFIED |
|---|---|---|---|---|---|---|---|---|
| | A/B | SW201 | C/G | SW100 | D/H | SW202 | E/F | |
| (a) | — | → | — | → | — | → | — | NONE |
| (b) | ✕ | ⇐ | — | ⇐ | — | ⇐ | — | SW201 |
| (c) | — | → | ✕ | ⇐ | — | ⇐ | — | SW201, SW100, SW301 |
| (d) | — | → | — | → | ✕ | ⇐ | — | SW100, SW202, SW302 |
| (e) | — | → | — | → | — | → | ✕ | SW202 |

| | GROUND FAULT LOCATION | MAGNITUDE OF CURRENT | | | | INDIVIDUAL SWITCH TO BE TURNED OFF |
|---|---|---|---|---|---|---|
| | | SW201 | SW100 | SW301A | SW301B | |
| (a) | C | HIGH | HIGH | LOW | LOW | SW301A, SW301B |
| (b) | I | HIGH | HIGH | HIGH | LOW | SW301A |
| (c) | G | HIGH | HIGH | LOW | HIGH | SW301B |

FIG.49

| | GROUND FAULT LOCATION | DIRECTION OF CURRENT FLOW ||||| SWITCHES THAT BECOME SPECIFIED |
|---|---|---|---|---|---|---|---|
| | | SW211C | SW211 | SW121 | SW212 | SW212C | |
| (a) | Z1 | ← | A ← / B ← | A ← / B ← | A ← / B ← | ← | SW211C |
| (b) | Z2 | → | A ← / B ← | A ← / B ← | A ← / B ← | ← | SW211C, SW211A, SW211B |
| (c) | Z3 | → | A → / B — | A ← / B — | A ← / B — | ← | SW211A, SW121A |
| (d) | Z3 | → | A → / B → | A ← / B → | A ← / B ← | ← | SW211A, SW121A |

POWER SUPPLY SYSTEM

CROSS-REFERENCE TO RELATED APPLICATION

This application is a Divisional Applications of U.S. patent application Ser. No. 16/825,312, filed Mar. 20, 2020, which in turn is a U.S. bypass application of International Application No. PCT/JP2018/031324 filed Aug. 24, 2018 which designated the U.S. and claims priority to Japanese Patent Applications No. 2017-183010, filed on Sep. 22, 2017, and No. 2018-144219, filed on Jul. 31, 2018, the contents of all of which are incorporated herein by reference.

TECHNICAL FIELD

The present disclosure relates to a power supply system.

BACKGROUND

A power supply system having a plurality of power systems is known in the prior art, as shown in JP 2017-141012 B. The power supply system includes power supplies such as batteries, etc., and electrical loads. The power supplies and the electrical loads are provided respectively corresponding to the plurality of power systems. The electrical loads operate from power supplied by the power supplies.

SUMMARY

In a power supply system according to a first aspect, the power supply system has a plurality of power systems, each of the power systems is provided with a power output section that outputs electric power, and an electrical load which operates from power supplied by the power output section, with the power system also having main paths that connect the power output sections of adjacent ones of the power systems and an inter-system switch that establishes a conducting condition between the adjacent power systems by being turned on and establishes a disconnected condition between the adjacent power systems by being turned off, and with each of the power systems being provided with an intra-system switch disposed on the main path between the power output section and the inter-system switch, which establishes a conducting condition between the power output section and the electrical load by being turned on, and establishes a disconnected condition between the power output section and the electrical load by being turned off.

BRIEF DESCRIPTION OF THE DRAWINGS

The objects, features and advantages of the present disclosure will be made clearer by the following detailed description, given referring to the appended drawings. In the accompanying drawings:

FIG. 49 is a diagram showing the relationship between the location of occurrence of a ground fault, the flow directions and magnitudes of the currents that flow through the switches, and the switch that is specified as the target of a turn-off operation;

DETAILED DESCRIPTION OF THE PREFERRED EMBODIMENTS

Figure 1:
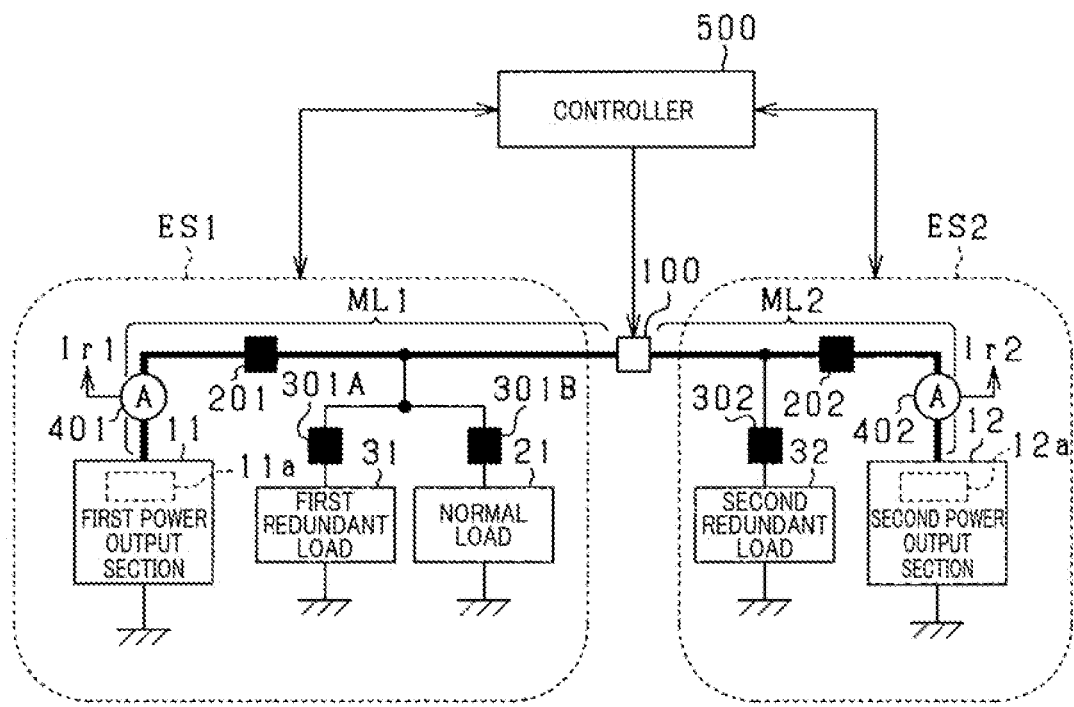
FIG. 1 is an overall configuration diagram of an in-vehicle power supply system according to a first embodiment.

An abnormality may occur in some of the plurality of power systems. Even in such a case there is a requirement for enabling, as far as possible, continued use of a power supply or electrical load which is a constituent of an abnormally operating power system and which is capable of continuing to be used, in order to suppress a decrease in the reliability of the power supply system.

The main objective of the present disclosure is to provide a power supply system that can suppress a decrease in reliability even when an abnormality has occurred in some of a plurality of power systems.

In a power supply system according to a first aspect, the power supply system has a plurality of power systems, each of which is provided with a power output section that outputs electric power, and an electrical load which operates from power supplied by the power output section, with the power system also having main paths that connect the power output sections of adjacent ones of the power systems and an inter-system switch that establishes a conducting condition between the adjacent power systems by being turned on and establishes a disconnected condition between the adjacent power systems by being turned off, and with each of the power systems being provided with an intra-system switch disposed on the main path between the power output section and the inter-system switch, which establishes a conducting condition between the power output section and the electrical load by being turned on, and establishes a disconnected condition between the power output section and the electrical load by being turned off.

The present disclosure includes inter-system switches and intra-system switches. For example, when an abnormality occurs within part of the power systems, the abnormally operating power system can be disconnected from the other power systems by means of the inter-system switches. When an abnormality occurs within a power system, the power output section and the electrical load of the power system can be disconnected from one another by means of an intra-system switch of the power system. According to the present disclosure, even when an abnormality occurs in a part of the plurality of power systems, at least one of the power output section and the electrical load constituting a power system in which an abnormality has occurred can continue to be used as far as possible, by operating the inter-system switches and intra-system switches. A decrease in reliability of the power supply system can thereby be suppressed.

First Embodiment

A first embodiment embodying a power supply system according to the present disclosure will be described in the following, referring to the drawings. The power supply system of the present embodiment is for installation in a vehicle that is equipped with an engine as the main in-vehicle machine, or in an electric vehicle equipped with a drive motor.

As shown in FIG. 1, the power supply system includes a first system ES1 and a second system ES2, as power systems. The first system ES1 includes a first power output section 11, a normal load 21 and a first redundant load 31. The second system ES2 includes a second power output section 12 and a second redundant load 32. With this embodiment, each of the electric power output sections 11 and 12 is an electrical storage device, specifically a storage battery such as a lead-acid storage battery or a lithium ion storage battery, for example. The normal load 21 includes, for example, at least one of a power window, an electric fan of a radiator that cools the engine coolant, a stop lamp, an interior light, a USB power socket, and a motor that drives a mirror which is disposed outside the passenger compartment.

Figure 2:
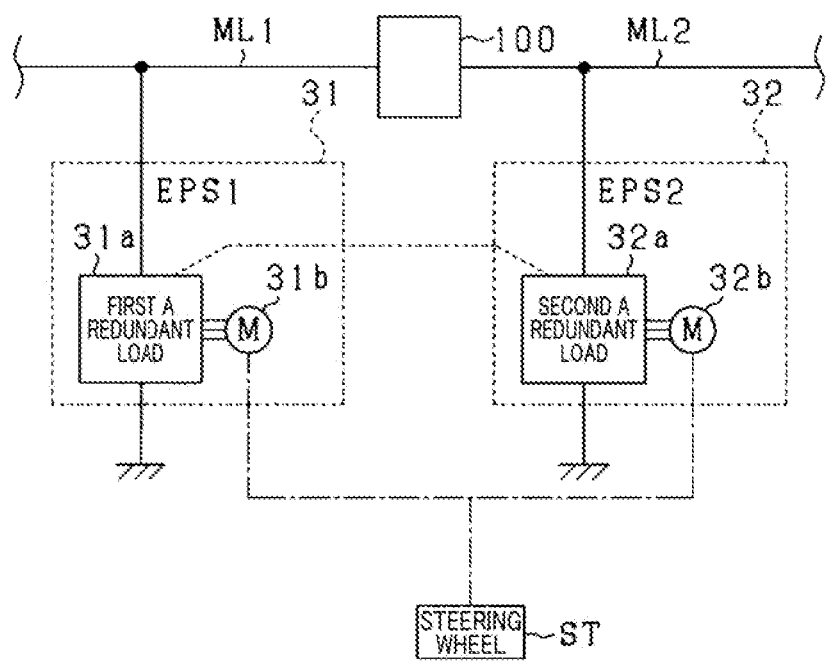
FIG. 2 is a diagram showing a specific configuration of a redundant load.

The power supply system includes a first path ML1 and a second path ML2 as main paths. The paths ML1, ML2 connect the first power output section 11 of the first system ES1 and the second power output section 12 of the second system ES2, which is adjacent to the first system ES1. In FIG. 1, the paths ML1 and ML2 connecting the first power output section 11 to the second power output section 12 are indicated by bold lines. In FIG. 2 and subsequent figures, for convenience, members corresponding to a main path are not indicated by bold lines.

The power supply system includes an inter-system switch 100. The first system ES1 includes a first intra-system switch 201, a first A individual switch 301A, and a first B individual switch 301B. The second system ES2 includes a second intra-system switch 202 and a second individual switch 302. Each of the switches 201, 202, 301A, 301B, 302 is constituted by a semiconductor switch such as a relay or MOS FET, for example. With this embodiment, turning on any of the switches 201, 202, 301A, 301B or 302 allows current to flow between the first and second terminals of the switch. On the other hand, turning off any of the switches 201, 202, 301A, 301B or 302 blocks current from flowing from the first terminal to the second terminal of the switch, and from flowing from the second terminal to the first terminal of the switch.

The first path ML1 is connected to the second path ML2 via the inter-system switch 100. That is, the inter-system switch 100 is provided in the main paths constituted by the paths MLA and ML2. A first intra-system switch 201 is provided in the first path MIL. In the first path ML1, the positive electrode of the first power output section 11 is connected to the first intra-system switch 201 on the side opposite the inter-system switch 100. The negative electrode of the first power output section 11 is connected to a ground point. The ground contact portion is, for example, a vehicle body. The positive electrode of the normal load 21 is connected via the first A individual switch 301B to the first path ML1 between the inter-system switch 100 and the first intra-system switch 201. The negative electrode of the normal load 21 is connected to a ground point. The positive electrode of the first redundant load 31 is connected via the first B individual switch 301A to the first path M1 between the inter-system switch 100 and the first intra-system switch 201. The negative electrode of the first redundant load 31 is connected to a ground point.

With the present embodiment, an electric power steering device is constituted by the first redundant load 31 and the second redundant load 32. This apparatus will be described referring to FIG. 2.

The first redundant load 31 includes a first drive circuit 31a and a first motor 31b. With the present embodiment, the first drive circuit 31a is a three-phase inverter that converts DC power supplied from the first power output section 11 into AC power, converts DC power supplied from the second power output section 12, transferred via the inter-system switch 100, into AC power, and outputs the converted power. The AC power that is outputted from the first drive circuit 31a is supplied to the first motor 31b. The first motor 31b is a three-phase motor and is driven by the supply of AC power to generate torque. The first motor 31b is, for example, a permanent magnet synchronous motor.

The second redundant load 32 includes a second drive circuit 32a and a second motor 32b. With the present embodiment, the configuration of the second redundant load 32 is identical to that of the first redundant load 31. Hence, detailed description of the second redundant load 32 is omitted.

An output shaft (not shown) is connected to the respective rotors of the first motor 31b and the second motor 32b, and a steering wheel ST is connected to these output shafts via a reduction gear or the like. The first redundant load 31 and the second redundant load 32 cooperatively generate an assist torque that provides assistance to the vehicle driver in performing steering, while the first drive circuit 31a and the second drive circuit 32a exchange information with one other. For convenience of description, FIG. 2 shows a configuration in which two motors are separately installed. However, the present invention is not limited to this, and a configuration may be employed in which two sets of three-phase windings are wound in a single motor, with the sets of windings being energized from respective drive circuits.

It should be noted that it would be equally possible for the redundant loads 31 and 32 to be, for example, an electric brake device that applies a braking force to the wheels, a camera for monitoring the situation in the surroundings of the vehicle, a laser radar such as LIDAR (Laser Imaging Detection and Ranging) apparatus, a millimeter-wave radar apparatus or a by-wire system. Furthermore, in the example of the electric power steering, the first redundant load and the second redundant load are configured identically, however it would be equally possible to use a configuration in which equivalent functions are realized by a combination of different devices. For example, the first redundant load could be a LIDAR, for monitoring ahead of the vehicle, while the second redundant load could be a camera.

The first system ES1 includes a first current detector 401. The first current detector 401 is provided in an electrical path connecting the positive electrode of the first power output section 11 to the first path ML1, and detects the output current of the first power output section 11 as a first output current Ir1. The second system ES2 includes a second current detector 402. The second current detector 402 is provided in an electrical path connecting the positive electrode of the second power output section 12 to the second path ML2, and detects the output current of the second power output section 12 as a second output current Ir2. The detected values from the current detectors 401 and 402 are inputted to a controller 500 that is included in the power supply system.

The controller 500 turns on or off the inter-system switch 100, the intra-system switches 201 and 202, and the individual switches 301A, 301B, and 302. The controller 500 also performs engine combustion control, etc. Each of these categories of control may actually be implemented by respective controllers, however FIG. 1 shows these controllers together in the form of a single controller 500. The functions implemented by the controller 500 may be provided, for example, by software that is recorded in a non-volatile memory device and a computer that executes the software, or by hardware, or by a combination thereof.

The controller 500 performs control for assisting the driver in operating the steering wheel ST, by driving the electric power steering apparatus. With the present embodiment, the electric power steering device is divided into a first redundant load 31 and a second redundant load 32. As a result, even if an abnormality occurs in either one of the first redundant load 31 and the second redundant load 32, the other redundant load can be used for control, so that a condition in which steering assistance suddenly becomes inoperative can be avoided. In addition, since the first power output section 11 and the second power output section 12 are provided, power supply redundancy is ensured even when an abnormality occurs in one of the power output sections, and hence the operational reliability of the first redundant load 31 and the second redundant load 32 can be improved.

It is possible that the output current of at least one of the first power output section 11 and the second power output section 12 may become excessively large. For example, when a ground fault occurs in which a part of a power supply system becomes short-circuited to ground, the output current may become excessively large. Even in such a circumstance, it is desirable to continue, as far as possible, to use any part of the power supply system that remains usable, for example to enable vehicle evacuation. Hence with the present embodiment, the controller 500 performs the abnormal operation processing shown in FIG. 3.

In step S10, the first output current Ir1 and the second output current Ir2 are acquired. A decision is then made as to whether the acquired first output current Ir1 or second output current Ir2 exceeds a first threshold value of current Ith1. For example, the first threshold value of current Ith1 may be set to a value that is higher than the assumed maximum value of the output current when a ground fault has not occurred. With the present embodiment, the processing of step S10 corresponds to a current judgement section.

If an affirmative decision is made in step S10, the processing proceeds to step S11, and the inter-system switch 100 is turned off. As a result, the first path ML and the second path ML2 become electrically disconnected, and the first system ES1 and the second system ES2 become electrically disconnected. With the present embodiment, the processing of step S11 corresponds to an inter-system operating section.

In step S12, a decision is made as to whether at least one of the first output current Ir1 or the second output current Ir2 has become higher than a second threshold value of current Ith2 which is higher than the first threshold value of current Ith1, by the time point at which a first judgement interval Tα has elapsed since the inter-system switch 100 was turned off. If a negative decision is made in step S12, the processing proceeds to step S21, and the inter-system switch 100 is turned on. A situation in which a negative decision is made in step S12 may be, for example, a situation in which noise is superimposed on the first output current Ir1 or the second output current Ir2, and an affirmative decision has been made in step S10.

If an affirmative decision is made in step S12, the processing proceeds to step S13. In step S13, each of the intra-system switch and the individual switches provided in the target system are turned off, where the target system is the one of the first and second systems ES1 and ES2 for which the output current has been judged to exceed the second threshold value of current Ith2. For example, if the target system is the first system ES1, the first intra-system switch 201 and the first A individual switch 301A and first B individual switch 301B are turned off. All of the intra-system switches and individual switches in the first and second systems ES1 and ES2, other than the switches of the target system, remain turned on. For example, if the target system is the first system ES1, the second intra-system switch 202 and the second individual switch 302 remain turned on. With the present embodiment, the processing of steps S12 and S13 corresponds to an intra-system operating section.

In step S14, the intra-system switch and the individual switches in the target system are sequentially turned on, starting from the one of these switches that is closest to the power output section. For example, if the target system is the first system ES1, then the first intra-system switch 201 is the first to be turned on. If the processing thereafter proceeds to step S14 after proceeding via steps S15 and S16, one of the first A and first B individual switches 301A and 301B is turned on. If the processing then again proceeds to step S14 via steps S15 and S16, the other one of the first A and first B individual switches 301A and 301B is turned on.

If a second judgement interval Tβ has elapsed since turning on of the switches by executions of step S14 was completed, detection of the first and second currents is performed in step S15. A decision is then made as to whether an output current Ir detected by a first or second current detector 401 or 402 provided in the target system exceeds the second threshold value of current Ith2.

If it is judged that the second threshold value of current Ith2 has not been exceeded before the second judgement interval Tβ elapsed, the processing proceeds to step S16, and a decision is made as to whether all of the intra-system switches and individual switches provided in the target system have been turned on. If an affirmative decision is made in step S16, the processing proceeds to step S21. On the other hand, if a negative decision is made in step S16, the processing proceeds to step S14, in which the next one of the intra-system switch and individual switches that is required to be turned on, in the target system, is then turned on. In the present embodiment, the processing of steps S14 and S16 corresponds to a first changeover operating section.

If it is judged in step S15 that the second threshold value of current Ith2 has been exceeded before the second judgement interval Tβ elapsed, the processing proceeds to step S17. In step S17, one of the intra-system switches and individual switches in the target system is specified, where the specified switch is one of the intra-system switches and individual switches in the target system for which the output current Ir, detected by the current detector of the target system, exceeded the second threshold value of current Ith2 when that switch was turned on in step S14. That switch is then registered in a storage device such as a memory provided in the controller 500. With the present embodiment, the processing of steps S15 and S17 corresponds to a specifying section.

In step S18, all the intra-system switches and individual switches in the target system are turned off. This prevents the output current of the power output section of the target system from becoming excessively high.

In step S19, a decision is made as to whether the switch specified in step S17 is an individual switch. If it is judged in step S19 that the switch is an individual switch, the processing proceeds to step S20 in which, of the intra-system switches and individual switches in the target system, only the individual switch specified in step S17 is turned off, while the other switches are turned on. The inter-system switch 100 is then turned on in step S21. With the present embodiment, the processing of step S20 corresponds to a second changeover operating section.

If a negative decision is made in step S19, the processing proceeds to step S22, and the off state of the inter-system switch 100 is maintained.

If a ground fault occurs in the first path ML1 between the first power output section 11 and the first intra-system switch 201, then even if the first intra-system switch 201 has been turned off, the output current of the first power output section 11 will continue to rise. In that case, the output of current from the first power output section 11 may be interrupted by causing the first protection section 11*a* that is provided in the first power output section 11 to operate. Furthermore, it would be equally possible for the first protection section 11*a* itself to detects its output current, and to operate when it is judged that the detected current exceeds the second threshold value of current Ith2, or for the first protection section 11*a* to operate under the control of the controller 500. It should also be noted that when the first protection section 11*a* is provided in the first electric power output section 11, it is not essential for the first intra-system switch 201 to be provided in the first system ES1.

Figure 4:
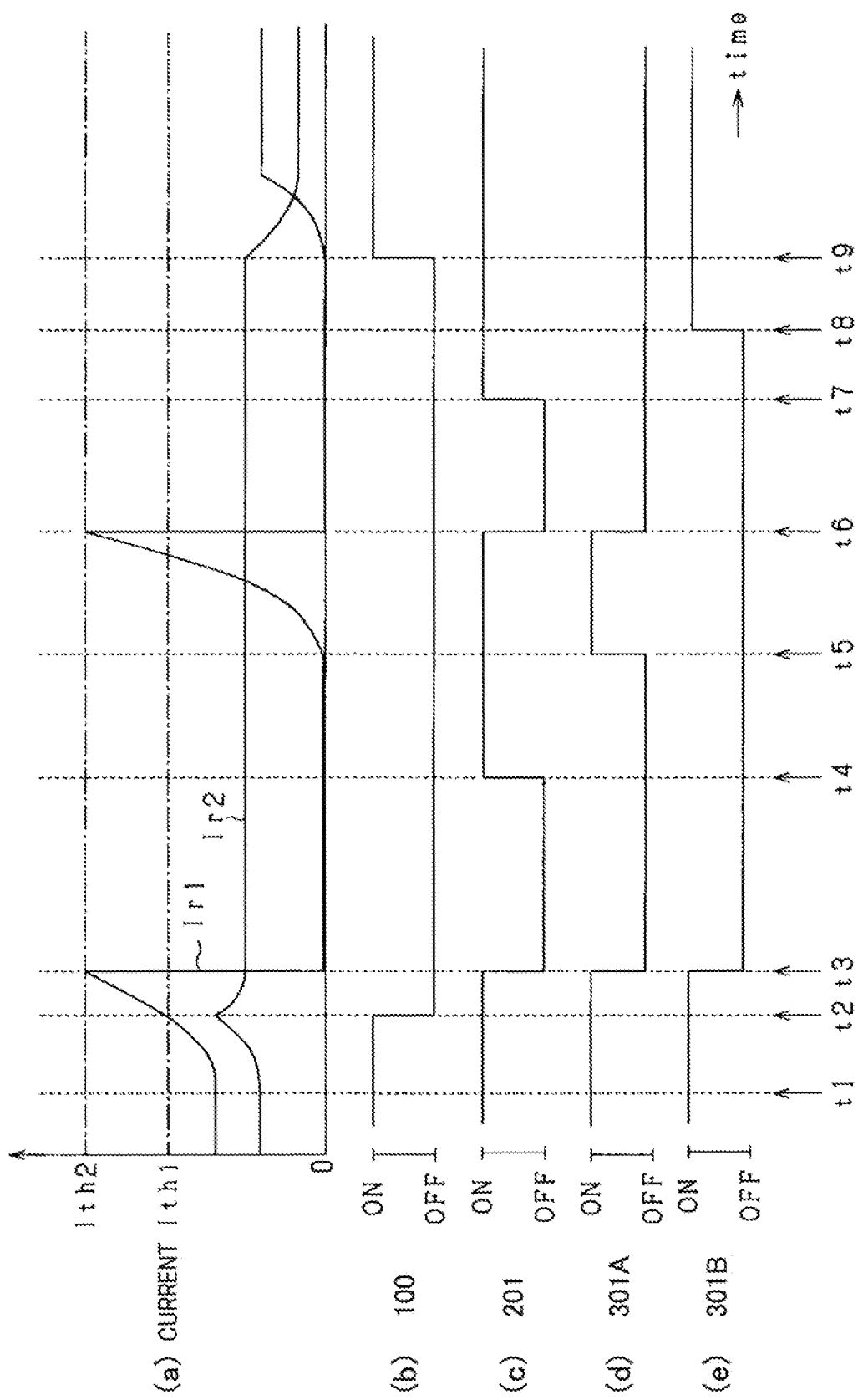
FIG. 4 is a time chart showing an example of an operating procedure that is executed when an abnormality occurs.
Figure 5:
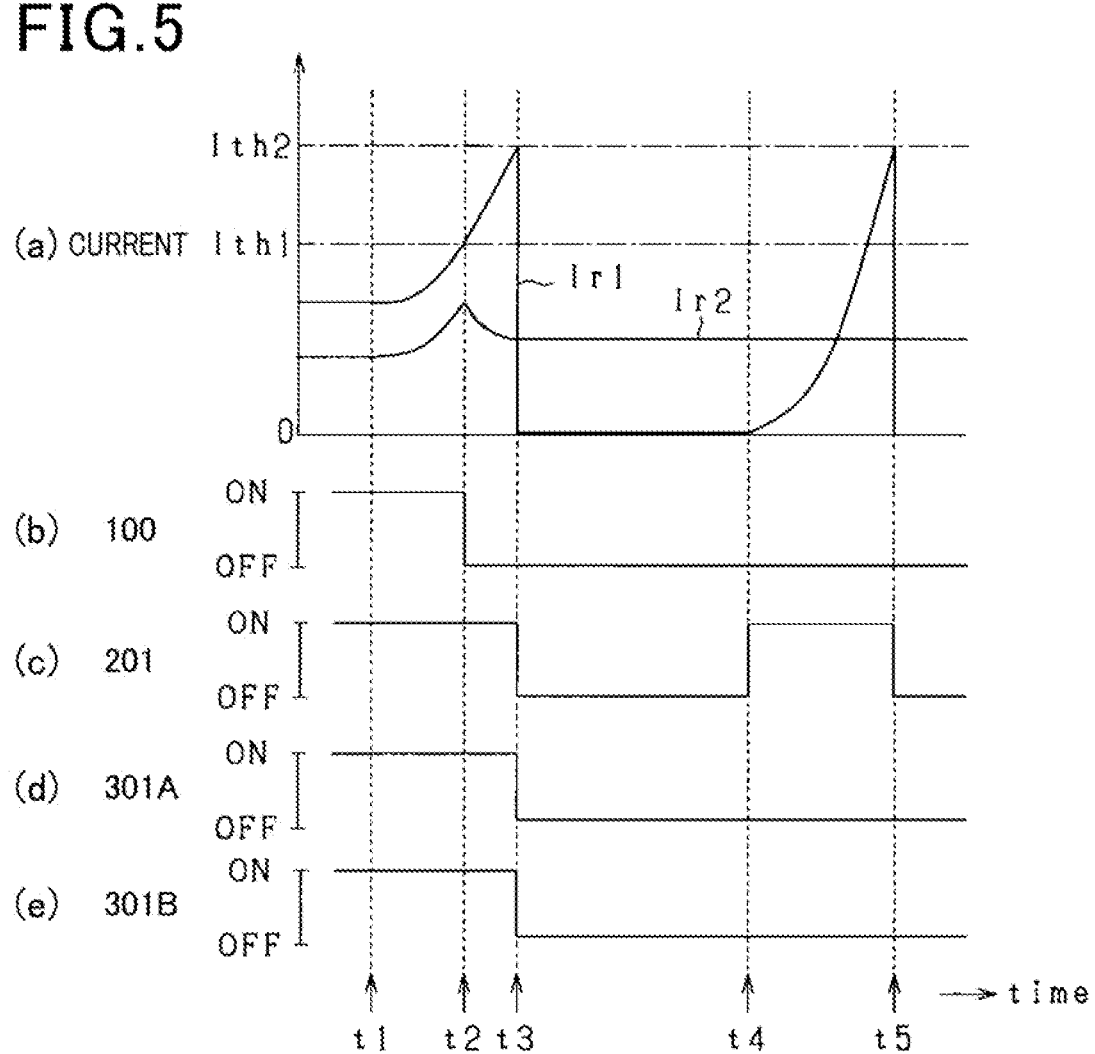
FIG. 5 is a time chart showing an example of an operating procedure that is executed when an abnormality occurs.

Moreover, if a ground fault occurs in the second path ML2 between the second power output section 12 and the second intra-system switch 202, then even if the second intra-system switch 202 is turned off the output current of the second power output section 12 will continue to rise. In that case, as with the first protection section 11*a*, the output of current from the second power output section 12 can be interrupted by operating the second protection section 12*a* that is included in the second power output section 12. It should be noted that when the second protection section 12*a* is provided in the second power output section 12, it is not essential for the second intra-system switch 202 to be provided in the second system ES2. FIGS. 4 and 5 show an example of the operation processing executed when an abnormality occurs. Firstly, FIG. 4 shows a case in which a ground fault has occurred between the positive electrode of the first redundant load 31 and the first A individual switch 301A, in the first system ES1. FIG. 4(*a*) shows the transitions of first and second output currents Ir1 and Ir2, and FIGS. 4(*b*) to (*e*) shows the transitions of the operation states of the inter-system switch 100, the first intra-system switch 201, and the first A and first B individual switches 301A and 301B.

At time t1, a ground fault occurs at the location described above. As a result, a high level of current begins to flow from the first power output section 11 and the second power output section 12 toward the ground fault location, and the first and second output currents Ir1 and Ir2 begin to rise. At time t2, the first output current Ir1 exceeds the first threshold value of current Ith1. As a result, the inter-system switch 100 is turned off, thereby disconnecting the second system ES2 from the first system ES1 in which aground fault has occurred. As a result, the increase in the second output current Ir2 is halted. Moreover, the second system ES2, which is functioning normally and in which no ground fault has occurred, continues to be used.

Thereafter, the first output current Ir1 continues to rise. The first output current Ir1 exceeds the second threshold value of current Ith2 at time t3, before the first judgement interval Tα has elapses after the inter-system switch 100 was turned off. As a result, the first intra-system switch 201 and the 1A and 1B individual switches 301A and 301B are turned off. The first output current Ir1 thereby decreases toward zero.

At time t4 the first intra-system switch 201, which is the switch that is closest to the first power output section 11 among the first intra-system switch 201 and the first A and first B individual switches 301A and 301B, is turned on. Even if the second judgement interval Tβ has elapsed after the first intra-system switch 201 was turned on, the first output current Ir1 will not exceed the second threshold value of current Ith2. Hence at time t5, the switch that is closest to the first power output section 11, among the first intra-system switch 201 and the first A and first B individual switches 301A and 301B, is turned on. With the present embodiment, the next closest switches are the first A individual switch 301A and the first B individual switch 301B. Hence, of the individual switches 301A and 301B, the first A individual switch 301A, which is connected to a redundant load, is turned on. As a result, when a condition has arisen whereby the second redundant load 32 of the second system ES2 has become unusable, during a period in which a specified switch has caused an overcurrent to flow in the first system ES1, the first power output section 11 can supply power to the first redundant load 31 with priority over supplying power to the normal load 21.

When the first A individual switch 301A is turned on, the first output current starts to rise. Thereafter, the first output current Ir1 exceeds the second threshold value of current Ith2 at time t6, before the second judgement interval Tβ has elapsed after the first A individual switch 301A was turned on. As a result, of the first intra-system switch 201 and the first A and the first B individual switches 301A and 301B, the first A individual switch 301A is specified and registered as being the switch that has caused the first output current Ir1 to exceed the second threshold value of current Ith2. Furthermore, the first intra-system switch 201 and the first A individual switch 301A are again turned off. With the present embodiment the 1A individual switch 301A, which has been specified and registered, is not turned on thereafter.

At time t7, the first intra-system switch 201 is turned on, and at time t8, the first B individual switch 301B is turned on. At time t9, the inter-system switch 100 is turned on.

It should be noted that of the first intra-system switch 201 and the first A individual switch 301A, it would be equally possible for only the first A individual switch 301A, which has been specified, to be turned off again at time 6.

Next, FIG. 5 shows a case in which a ground fault has occurred in the first system ES1, on the first path ML1 between the inter-system switch 100 and the first intra-system switch 201. FIGS. 5(*a*) to 5(*e*) correspond to the previous FIGS. 4(*a*) to 4(*e*).

At time t1, a ground fault occurs at the above-described location, and at time t2, the first output current Ir1 exceeds the first threshold value of current Ith1. As a result, the inter-system switch 100 is turned off. Thereafter, the first output current Ir1 exceeds the second threshold value of current Ith2 at a time 13, before the first judgement interval Tα has elapsed after the inter-system switch 100 was turned off. As a result, the first intra-system switch 201 and the 1A and B individual switches 301A and 301B are turned off.

At time 14 the first intra-system switch 201, which is the closest switch to the first power output section 11, is turned on. Thereafter, the first output current Ir1 exceeds the second threshold value of current Ith2 at time t5, before the second judgement interval Tβ has elapsed after the first intra-system switch 201 was turned on. Hence, of the first intra-system switch 201 and the first A and the first B individual switches 301A and 301B, the first intra-system switch 201 is specified and registered as the switch that has caused the first output current Ir1 to exceed the second threshold value of current Ith2. Furthermore, the first intra-system switch 201 is turned off again. With the present embodiment, the first intra-system switch 201, which has been registered, is not turned on thereafter. In addition, the inter-system switch 100 is maintained in the off state.

With the present embodiment described above, even if a ground fault occurs in either of the first and second systems ES1 and ES2, the power output section and the load (s) that constitute the system in which the ground fault has occurred can continue to be used as far as possible. A lowering of the reliability of the power supply system can thereby be suppressed.

Modification Example of First Embodiment

Figure 3:
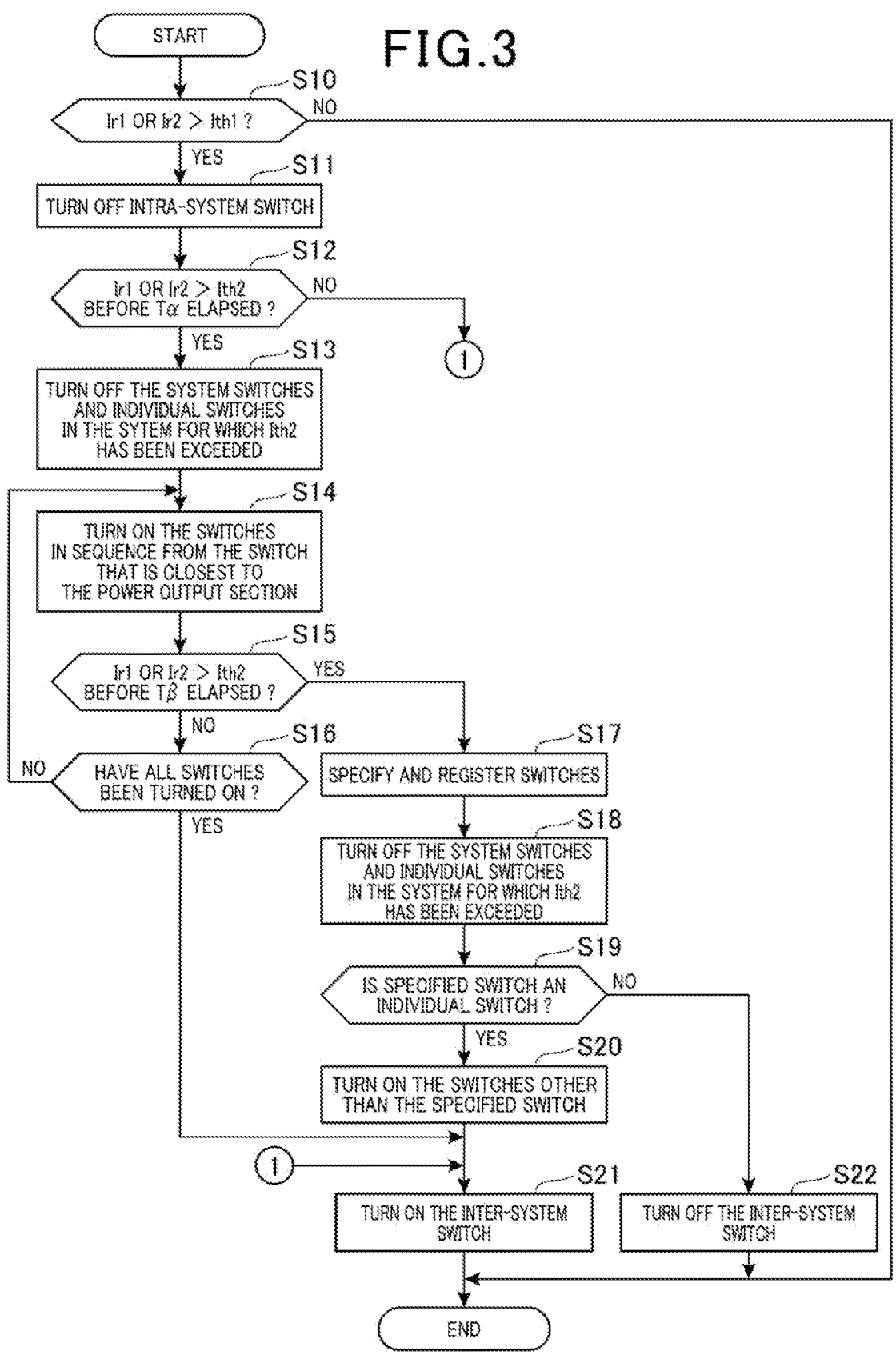
FIG. 3 is a flowchart showing an operating procedure that is executed when an abnormality occurs.

In FIG. 3, the processing of steps S12 to S22 may be omitted. Even in that case it is possible to protect the one of the first and second systems ES1, ES2 in which no ground fault has occurred, and to continue using that system.

In FIG. 3, the processing of steps S14 to S22 may be omitted. Even in that case, it is possible to avoid an overcurrent from being produced from the power output section of the target system, and thus to protect that power output section.

Second Embodiment

Figure 6:
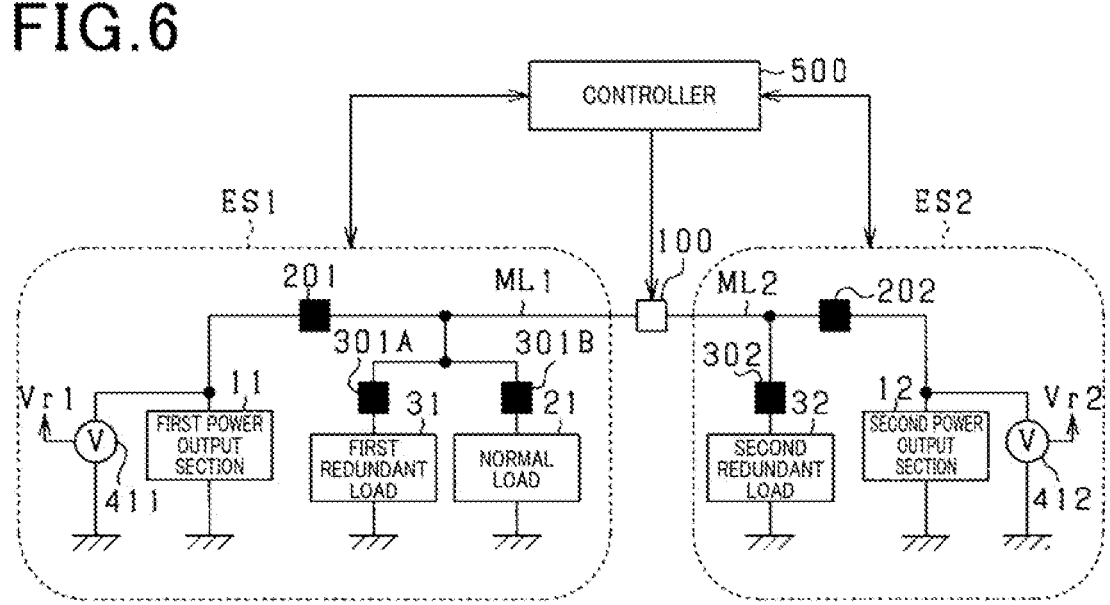
FIG. 6 is an overall configuration diagram of an in-vehicle power supply system according to a second embodiment.

A second embodiment will be described referring to the drawings with a focus on points of difference from the first embodiment. With the present embodiment, as illustrated in FIG. 6, a power supply system includes a voltage detector instead of the current detector. In FIG. 6, components that are identical to those shown in FIG. 1 are designated by the same reference numerals as in FIG. 1, for convenience.

The first system ES1 includes a first voltage detector 411. The first voltage detector 411 detects the output voltage of the first power output section 11, as the first output voltage Vr1. The second system ES2 includes a second voltage detector 412. The second voltage detector 412 detects the output voltage of the second power output section 12, as the second output voltage Vr2. The detection values from the voltage detectors 411 and 412 are inputted to the controller 500.

Figure 7:
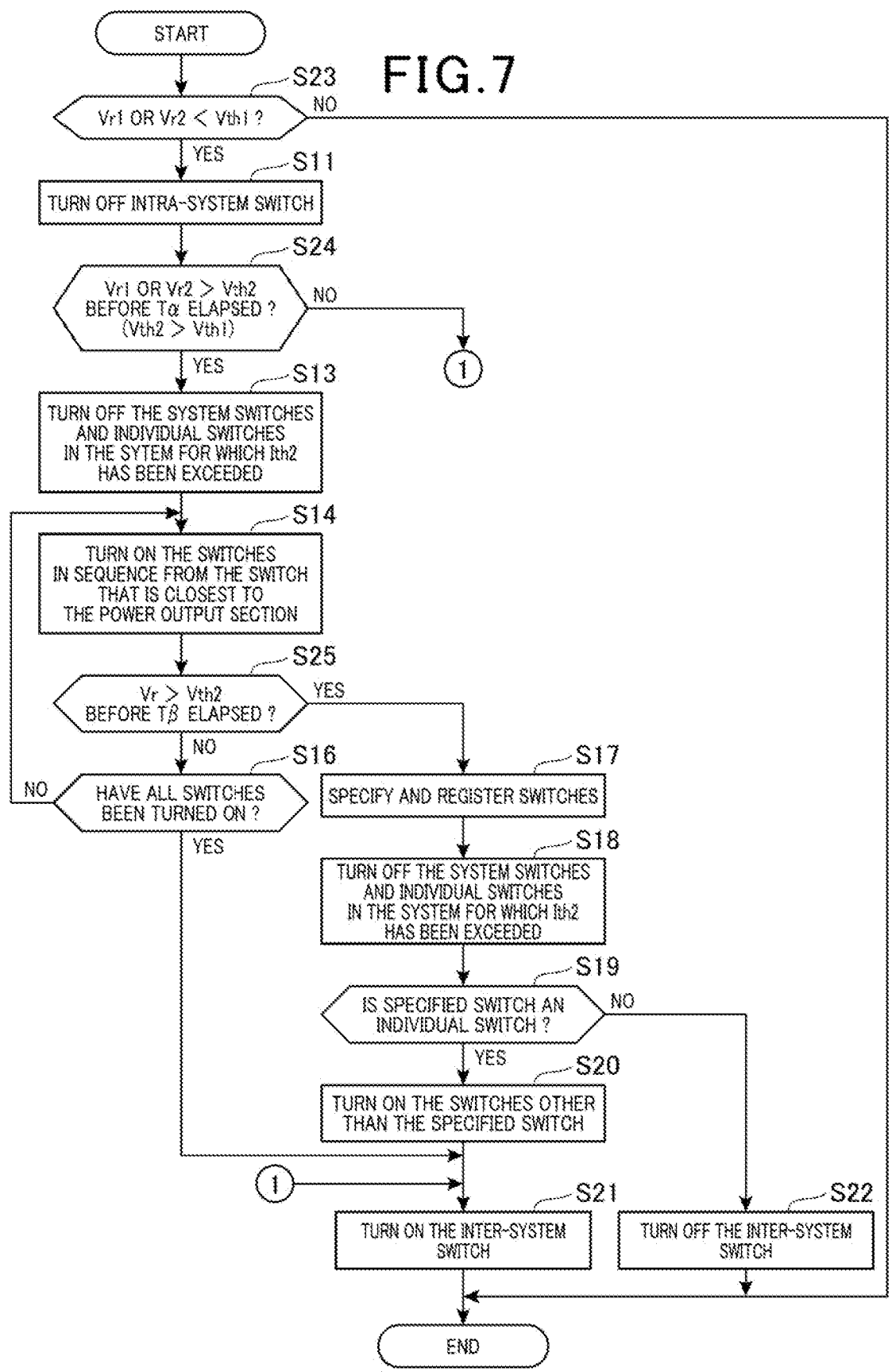
FIG. 7 is a flowchart showing an operating procedure that is executed when an abnormality occurs.

The processing executed by the present embodiment when an abnormality occurs will be described referring to FIG. 7. This processing is executed by the controller 500. In FIG. 7, processing steps that are identical to those shown in FIG. 3 are designated by the same reference numerals as in FIG. 3, for convenience.

In step S23, the first output voltage Vr1 and the second output voltage Vr2 are acquired. A decision is then made as to whether the acquired first output voltage Vr1 or second output voltage Vr2 is lower than the first voltage threshold value Vth1. This processing is based on the fact that when a ground fault occurs, the amount of lowering of the output voltage increases as the output current increases. With the present embodiment, the processing of step S23 corresponds to a voltage judgement section.

If an affirmative decision is made in step S23, the processing proceeds to step S24 via step S11. In step S24, a decision is made as to whether the first output voltage Vr1 or the second output voltage Vr2 is below a second voltage threshold value Vth2, which is lower than the first voltage threshold value Vth1. If an affirmative decision is made in step S24, the processing proceeds to step S13. In step S13, one of the first and second systems ES1 and ES2, for which it has been judged that the output voltage is lower than the second voltage threshold value Vth2, is set as the target system.

After the processing of step S14 is completed, the processing proceeds to step S25, in which a decision is made as to whether the output voltage Vr detected by the one of the first and second voltage detectors 411 and 412 provided in the target system has become lower than the second voltage threshold value Vth2 during the interval which elapsed from the time when a switch is turned on in step S14 until the second judgement interval Tβ elapsed.

If an affirmative decision is made in step S25, the processing proceeds to step S17. In step S17 one of the switches in the target system is specified, where the specified switch is the one of the intra-system switches and individual switches in the target system for which the output voltage Vr detected by the voltage detector of the target system was lower than the second voltage threshold value Vth2, when that switch was turned on in step S14.

The same effects as those of the first embodiment can be obtained with the embodiment described above.

Third Embodiment

Figure 8:
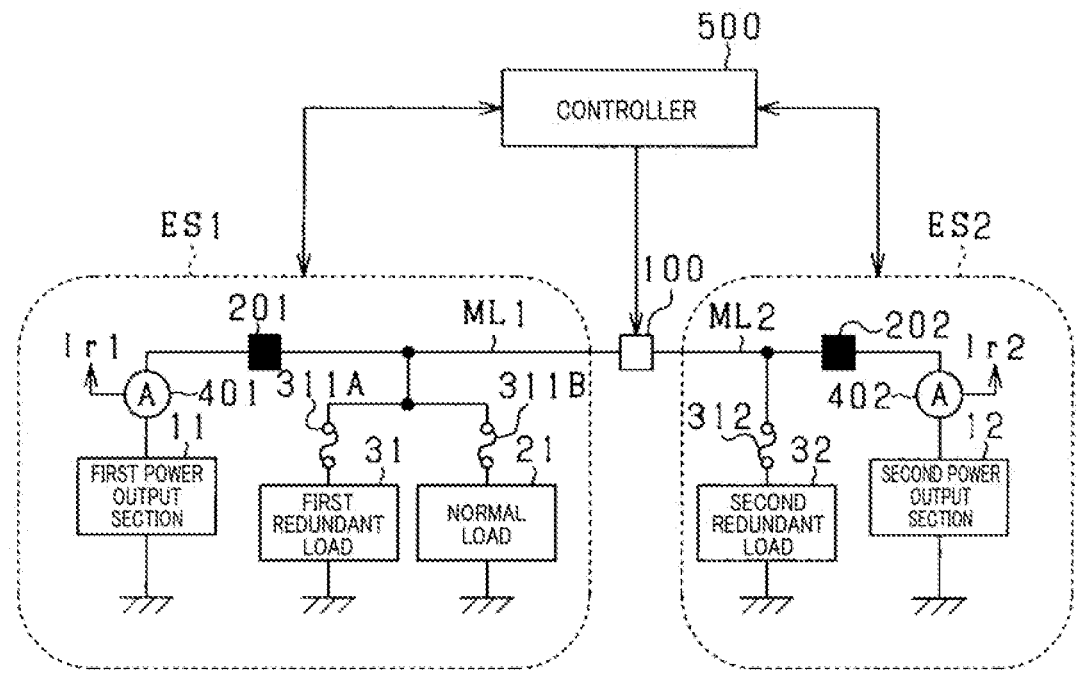
FIG. 8 is an overall configuration diagram of an in-vehicle power supply system according to a third embodiment.

A third embodiment will be described in the following referring to the drawings, with a focus on points of difference from the first embodiment. With the present embodiment, as shown in FIG. 8, a power supply system is provided with fuses, instead of the individual switches. In FIG. 8, configuration components that are identical to those shown in FIG. 1 above are designated by the same reference numerals as in FIG. 1, for convenience.

A first A fuse 311A is provided in place of the first A individual switch 301A, a first B fuse 311B is provided in place of the first B individual switch 301B, and a second fuse 312 is provided in place of the second individual switch 302. For example, current will continue to flow through each of the fuses 311A, 311B and 312 even if the first threshold value of current Ith1 is exceeded, however a fuse will become blown before the current flowing through that fuse exceeds the second threshold value of current Ith2. If the second fuse 312 is blown, for example, then the second redundant load 32 will become disconnected from the second path ML2.

With the present embodiment, when a ground fault occurs between a fuse 311A, 311B or 312 and the respective one of the loads 31, 21, 32, the fuse that is connected to the location where the ground fault occurs becomes blown. As a result, unlike the first embodiment, it is not necessary to again turn on those of the individual switches which do not correspond to the location where the ground fault occurred.

On the other hand, when a ground fault occurs on the first path M1 between the inter-system switch 100 and the first intra-system switch 201, or when a ground fault occurs on the second path ML2 between the inter-system switch 100 and the second intra-system switch 202 t, the first intra-system switch 201 or the second intra-system switch 202 must be operated. In view of this, the controller 500 performs the abnormal operation processing shown in FIG. 8. In FIG. 8, processing steps that are identical to those shown in FIG. 3 are designated by the same reference numerals as in FIG. 3, for convenience After completion of the processing of step S11, the processing proceeds to step S30, in which a decision is made as to whether the first output current Ir1 or the second output current Ir2 has increased even after the third predetermined time Ty elapsed since the inter-system switch 100 was turned off in step S11. This processing serves to determine whether a ground fault has occurred in the first path ML1 between the inter-system switch 100 and the first intra-system switch 201, or in the second path ML2 between the inter-system switch 100 and the second intra-system switch 202. The first system ES1 will be described as an example. If a ground fault occurs between the first redundant load 31 and the first A fuse 311A, the first A fuse 311A will be blown when a certain amount of time has elapsed after the ground fault occurred, and hence the first output current Ir1 will not increase, and will start to decrease. On the other hand if a ground fault occurs in the first path ML between the inter-system switch 100 and the first intra-system switch 201, then neither the first A fuse 311A nor the first B fuse 311B will be blown, and hence the first output current Ir1 will continue to rise.

With the present embodiment, the one of the first and second systems ES1 and ES2 in which the output current continues to increase is made the target system.

If an affirmative decision is made in step S30, the processing proceeds to step S31, in which the intra-system switch of the target system is turned off. For example, if the target system is the first system ES1, the first intra-system switch 201 is turned off. This prevents a high level of current flow from the power output section of the target system.

If a negative decision is made in step S30, the processing proceeds to step S32, in which the inter-system switch 100 is turned on. In that case, in the target system, the fuse corresponding to the ground fault location will become blown.

The present embodiment described above enables simplification of the contents of operation processing that is executed when an abnormality occurs.

Modification Example 1 of Third Embodiment

With the configuration shown in FIG. 8, the first and second intra-system switches 201 and 202 may be omitted.

Modification Example 2 of Third Embodiment

Figure 10:
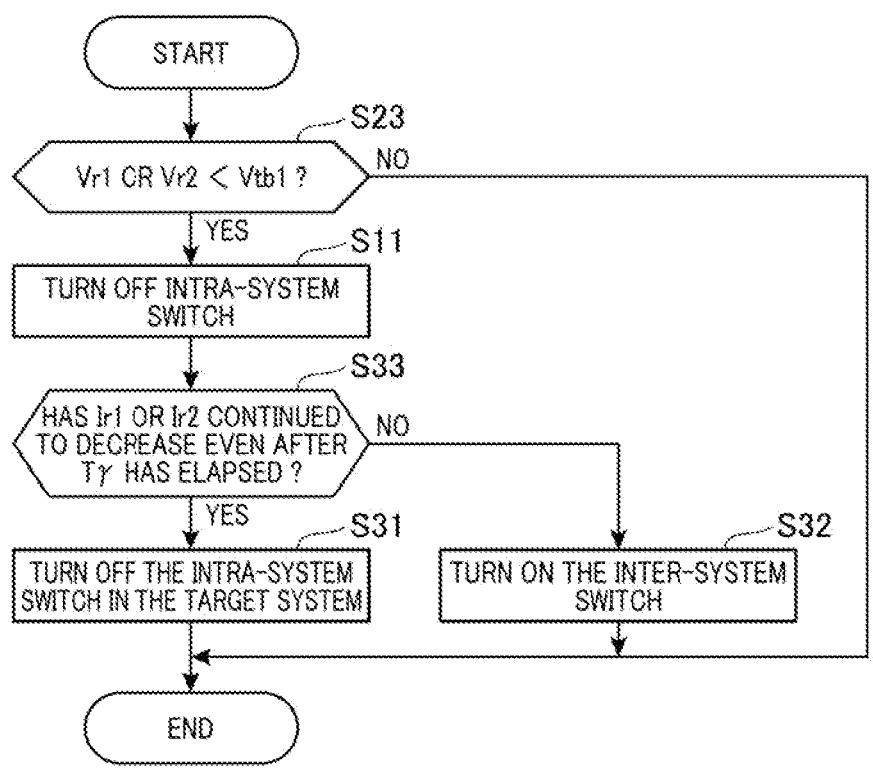
FIG. 10 is a flowchart showing an operating procedure that is executed with a modification example 2 of the third embodiment when an abnormality occurs.

With the configuration shown in FIG. 8, the first and second voltage detectors 411 and 412 shown in FIG. 6 may be provided in place of the first and second current detectors 401 and 402. The abnormal operation processing that is executed by the controller 500 in that case will be described referring to FIG. 10. In FIG. 10, processing steps that are identical to those shown in FIG. 7 are designated by the same reference numerals as in FIG. 7, for convenience.

Figure 9:
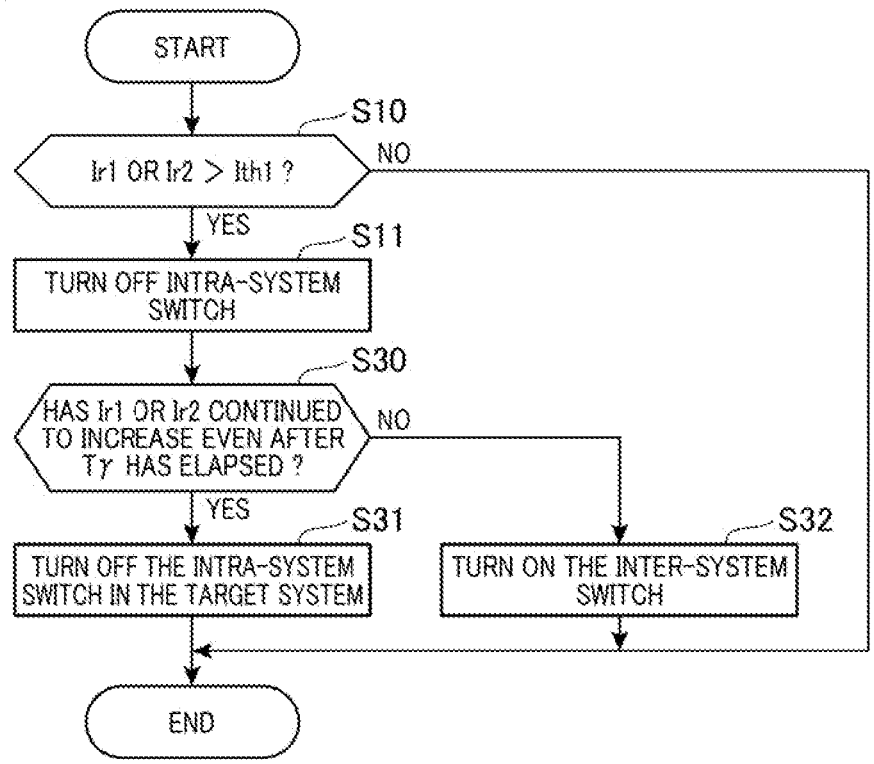
FIG. 9 is a flowchart showing an operating procedure that is executed when an abnormality occurs.

If an affirmative decision is made in step S23, the processing proceeds to step S33 via step S11. In step S33, a decision is made as to whether the first output voltage Vr1 or the second output voltage Vr2 continues to decrease even after the third predetermined time Ty has elapsed since the inter-system switch 100 was turned off in step S11. This processing step is provided for the same purpose as step S30 in FIG. 9. With the present embodiment, the target system is taken to be the one of the first and second systems ES1 and ES2 for which the output voltage is judged to continue to decrease.

If an affirmative decision is made in step S33, the processing proceeds to step S31. On the other hand, if a negative decision is made in step S33, the processing proceeds to step S32.

Fourth Embodiment

Figure 11:
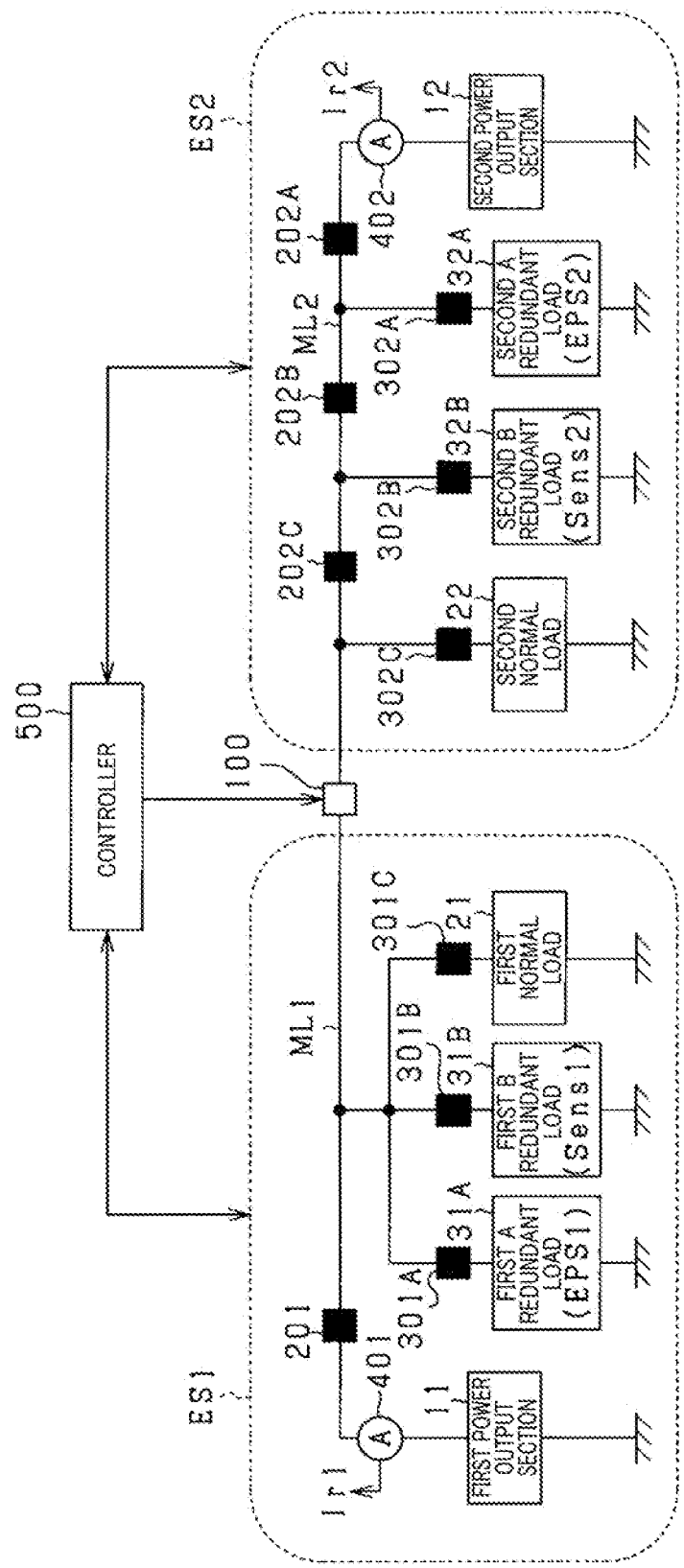
FIG. 11 is an overall configuration diagram of an in-vehicle power supply system according to a fourth embodiment.

A fourth embodiment will be described in the following referring to the drawings, with a focus on points of difference from the first embodiment. FIG. 11 shows a power supply system of the present embodiment. In FIG. 11, configuration components that are identical to those shown in FIG. 1 above are designated by the same reference numerals as in FIG. 1, for convenience. With the present embodiment, the normal load 21 is a first normal load, the first redundant load 31 is a first A redundant load 31A, and the second redundant load 32 is a second A redundant load 32A.

The first system ES1 includes a first B redundant load 31B. The second system ES2 includes a second normal load 22 and a second B redundant load 32B. With the present embodiment, the first 13 redundant load 31B and the second B redundant load 32B consist of in-vehicle cameras that capture images of the road ahead of the host vehicle. Detection information from the first B redundant load 311B and the second B redundant load 32B is inputted to the controller 500.

The first system ES1 includes first A to C individual switches 301A to 301C. The second system ES2 includes second A to C intra-system switches 202A to 202C and second A to C individual switches 302A to 302C. Each of the switches 301A to 301C, 202A to 202C, and 302A to 302C is constituted by a semiconductor switch such as a relay or a MOS FET, for example. Each of the switches of the systems ES1, ES2 is operated by the controller 500.

Between the inter-system switch 100 and the first intra-system switch 201, the first path ML1 is connected via the first A individual switch 301A to the positive electrode of the first A redundant load 31A, and is connected via the first B individual switch 301B to the positive electrode of the first B redundant load 31B, and also is connected via the first C individual switch 301C to the positive electrode of the first normal load 21.

The second path ML2 is provided with a second A intra-system switch 202A, a second B intra-system switch 202B, and a second C intra-system switch 202C disposed successively from the side closer to the second power output section 12. In the second path ML2, the positive electrode of the second A redundant load 32A is connected between the second A intra-system switch 202A and the second B intra-system switch 202B via the second A individual switch 302A. A part of the second path ML2 that is sandwiched between the second B intra-system switch 202B and the second C intra-system switch 202C is connected to the positive electrode of the second B redundant load 32B via the second B individual switch 302B. A part of the second path ML2 between the inter-system switch 100 and the second C intra-system switch 202C is connected to the positive electrode of the second normal load 22 via the second C individual switch 302C.

The controller 500 in conjunction with the redundant loads 31A, 32A, 31B, 32B constitutes a lane keeping support system. This system recognizes the travel lane of the host vehicle, on the road, from the detection information of the first A redundant load 31A and the first B redundant load 31B, which are in-vehicle cameras, and when the host vehicle is about to depart from the travel lane, steering control is effected by torque assistance of the electric power steering device, for moving the vehicle back to the center of the travel lane. By providing two in-vehicle cameras, even if an abnormality occurs in the first A redundant load 31A or the first B redundant load 31B, the detection information of the other can be used for effecting control, and the host vehicle can be maintained within its travel lane, so that a sudden loss of lane keeping support control can be avoided.

Figure 12:
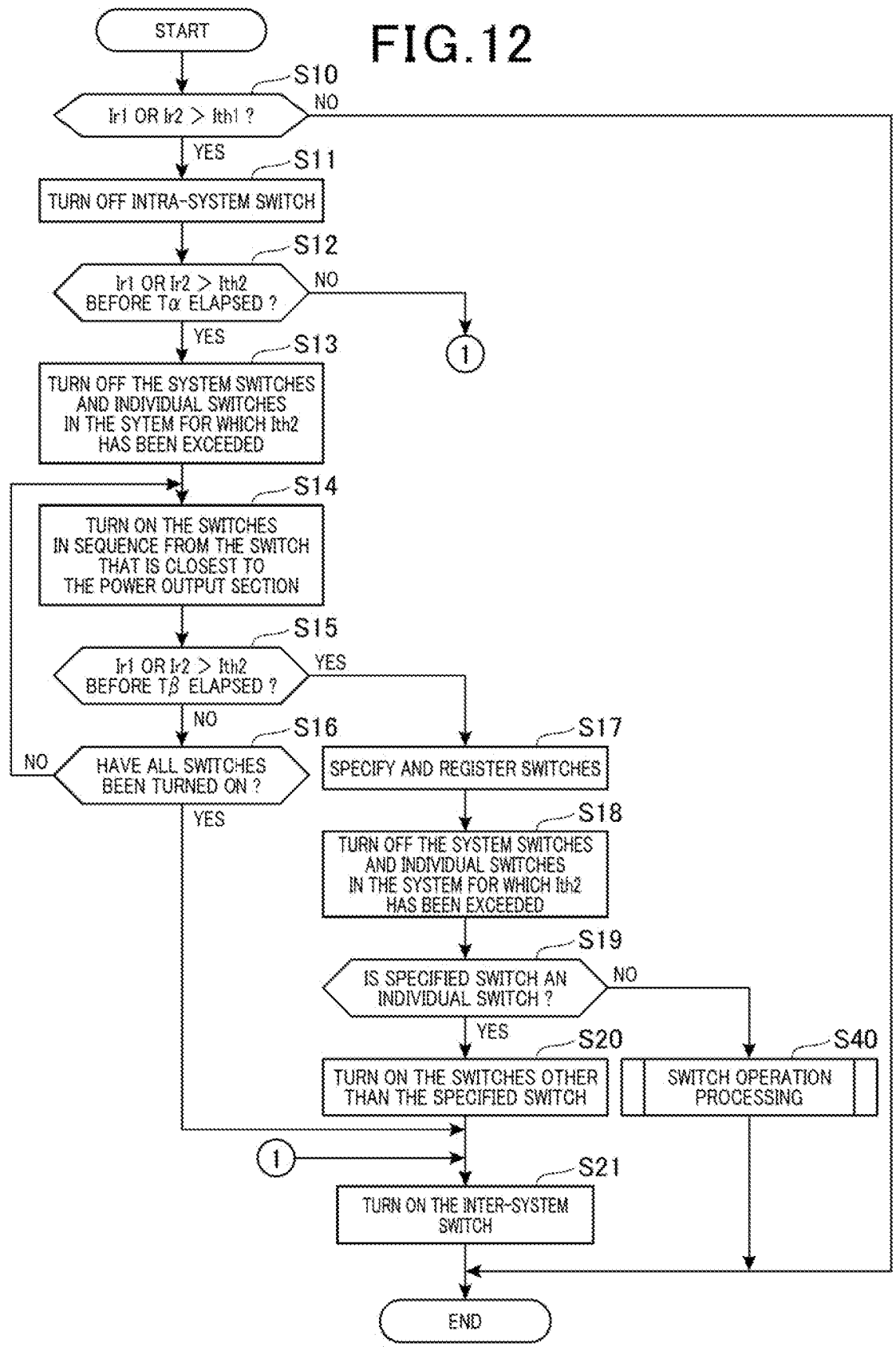
FIG. 12 is a flowchart showing an operating procedure that is executed when an abnormality occurs.

The main points of difference between the abnormal operation processing of the present embodiment and that of the first embodiment will be described in the following referring to FIG. 12. In FIG. 12, processing steps which are identical to those shown in FIG. 3 are designated by the same reference numerals as in FIG. 3, for convenience. A case in which a ground fault occurs in the second system ES2 will be described in the following, as an example.

In step S14, the switches are sequentially turned on, starting from the switch that is closest to the second power output section 12. Specifically, the second A intra-system switch 202A, the second A individual switch 302A, the second B intra-system switch 202B, the second B individual switch 302B, the second C intra-system switch 202C, and the second C individual switch 302C are turned on, in that order.

Figure 13:
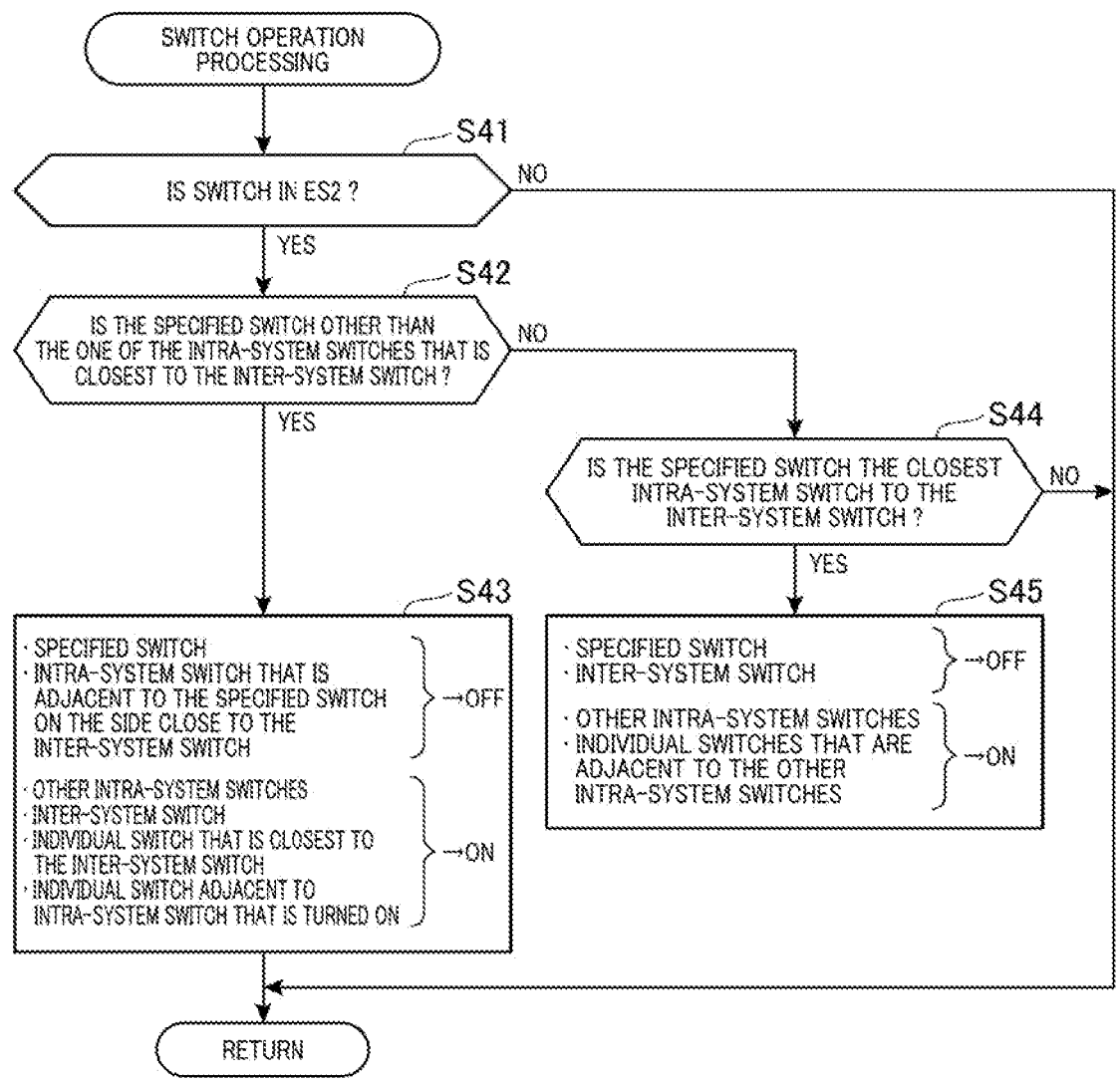
FIG. 13 is a flowchart showing a switch operation processing procedure.

If a negative decision is made in step S19, the processing proceeds to step S40, and the switch operation processing shown in FIG. 13 is performed.

In step S41 a decision is made as to whether the switch specified in step S17 is one of the switches in the second system ES2.

If an affirmative decision is made in step S41, the processing proceeds to step S42, and a decision is made as to whether any of the intra-system switches 202A to 202C has been specified in step S17, other than the second C intra-system switch 202C, which is closest to the inter-system switch 100.

If an affirmative decision is made in step S42, the processing proceeds to step S43, in which the one of the intra-system switches 202A to 202C that has been specified, and one of these intra-system switches that is adjacent to the specified intra-system switch on the inter-system switch 100 side, are maintained turned off. Furthermore, the one of the intra-system switches 202A to 202C that is not maintained turned off, the inter-system switch 100, and the second C individual switch 302C, which is the individual switch closest to the inter-system switch 100, are turned on. In addition, those of the individual switches 302A to 302C that are adjacent to the intra-system switch which has been turned on are also turned on.

For example if the specified intra-system switch is the second A intra-system switch 202A, then the second A intra-system switch 202A and the second B intra-system switch 202B, which are adjacent to the switch 202A, are maintained in the off state, while the second C intra-system switch 202C, the inter-system switch 100, and the second B and C individual switches 302B and 302C, which are respectively adjacent to the second C intra-system switch 202C, are turned on. The second normal load 22 and the second B redundant load 32B can thereby continue to be used, employing the first power output section 11 as a power supply source.

Also, for example, if the specified intra-system switch is the second B intra-system switch 202B, the second B intra-system switch 202B and the second C intra-system switch 202C, which is adjacent to the switch 202B, are maintained in the off state. Furthermore, the second A intra-system switch 202A, the inter-system switch 100, and the second A and C individual switches 302A and 302C are turned on. The second A redundant load 32A can thereby continue to be used, employing the second power output section 12 as a power supply source, and the second normal load 22 can continue to be used, employing the first power output section 11 as a power supply source.

If a negative decision is made in step S42, the processing proceeds to step S44, in which a decision is made as to whether the second C intra-system switch 202C, which is closest to the inter-system switch 100 among the intra-system switches 202A to 202C, has been specified in step S17.

If an affirmative decision is made in step S44, the processing proceeds to step S45, in which the specified second C intra-system switch 202C and the inter-system switch 100 are maintained in the off state. Also, of the switches of the second system ES2, those of the second A and B intra-system switches 202A and 202B that are not being maintained turned off, and the second A and B individual switches 302A and 302B, which are adjacent to the switches 202A and 202B, are turned on. The second A redundant load 32A and the second B redundant load 32B can thereby continue to be used, employing the second power output section 12 as a power supply.

With the embodiment described above, the same effects can be obtained as for the first embodiment.

Modification Example of the Fourth Embodiment

Figure 14:
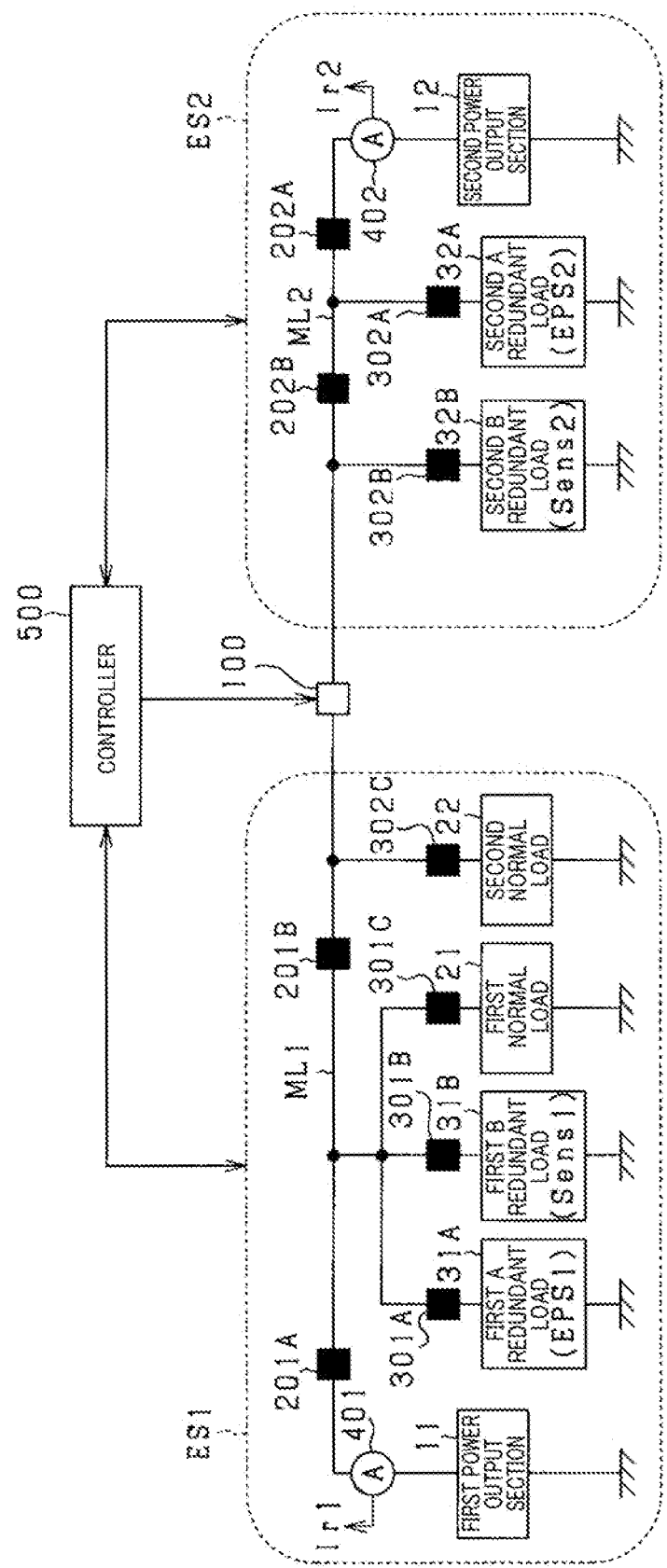
FIG. 14 is an overall configuration diagram of an in-vehicle power supply system according to a modification example of the fourth embodiment.

The position of the inter-system switch 100 in the power supply system is determined by a balance between the capacities of the respective power output sections of the systems ES1, ES2 and the power consumption amounts of the respective loads. Hence, depending on this balance, the position of the inter-system switch 1N) shown in FIG. 11 may be made as shown in FIG. 14, for example. In FIG. 14, components which are identical to components shown in FIG. 11 are designated by the same reference numerals as in FIG. 11, for convenience.

Fifth Embodiment

Figure 15:
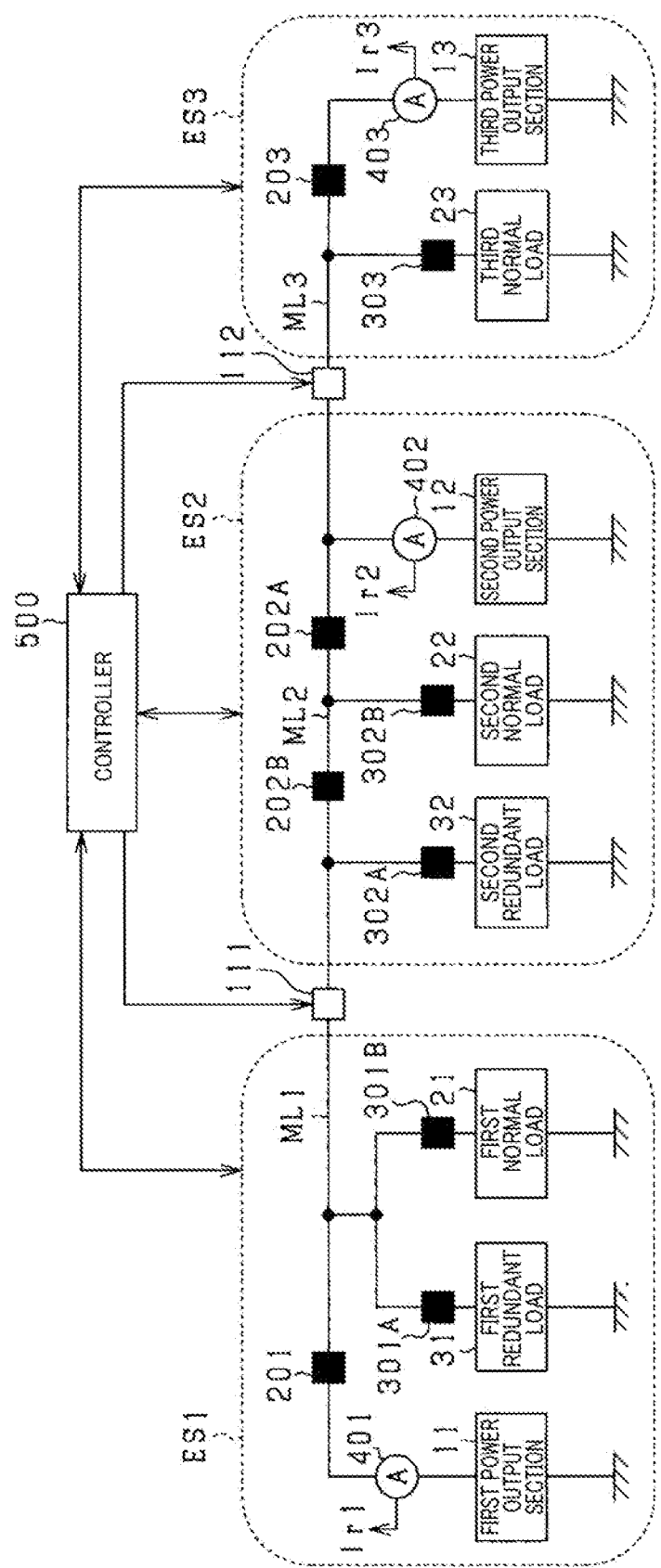
FIG. 15 is an overall configuration diagram of an in-vehicle power supply system according to a fifth embodiment.

The fifth embodiment will be described in the following referring to the drawings, with a focus on points of difference from the first embodiment. With the present embodiment, as shown in FIG. 15, a power supply system includes three power systems consisting of first to third systems ES1 to ES3. In FIG. 15, components which are identical to components shown in FIG. 1, etc., are designated by the same reference numerals as in FIG. 1, for convenience.

The power supply system includes a third path ML3, a first inter-system switch 111, and a second inter-system switch 112. The third system ES3 includes a third intra-system switch 203 and a third individual switch 303. Each of the switches 111, 112, 203, and 303 is configured as a semiconductor switch such as a relay or a MOS FET, for example. Each of the switches 111, 112, 203, 303 is operated by the controller 500.

The second path ML2 is connected to the first path ML1 via the first inter-system switch 111. The third path ML3 is connected to the second path ML2 via the second inter-system switch 112. In the second path ML2, the second A intra-system switch 202A is provided on the second inter-system switch 112 side and the second B intra-system switch 202B is provided on the first inter-system switch 111 side. In the second path ML2, on the side of the first inter-system switch 111, the positive electrode of the second redundant load 32 is connected to the second B intra-system switch 202B via the second A individual switch 302A. The positive electrode of the second normal load 22 is connected to the second path ML2 between the second B intra-system switch 202B and the second A intra-system switch 202A, via the second B individual switch 302B. The positive electrode of the second power output section 12 is connected via the second current detector 402 to the second path ML2 between the second inter-system switch 112 and the second B intra-system switch 202A.

The third system ES3 includes a third power output section 13, and a third current detector 403 which detects the output current of the third power output section 13 as a third output current Ir3. The third output current Ir3 is inputted to the controller 500. The third power output section 13 is, for example, a secondary battery, as for the first and second power output sections 11 and 12. A third intra-system switch 203 is provided in the third path ML3. The positive electrode of the third normal load 23 is connected via the third current detector 403 to the third path ML3, on the second inter-system switch 112 side, via the third individual switch 303. The positive electrode of the third power output section 13 is connected via the third current detector 403 to the third path ML3 on the side opposite the second inter-system switch 112 with respect to the third intra-system switch 203.

The main differences between the abnormal operation processing of the present embodiment and that of the first embodiment will be described in the following. With the present embodiment, the first to third output currents Ir1 to Ir3 are used in the processing executed in steps S10, S12, and S15 of FIG. 3. Specifically, the processing of step S10 is replaced by processing for judging whether any of the first to third output currents Ir1 to Ir3 exceeds the first threshold value of current Ith1. Furthermore, the processing of step S12 is replaced by processing for judging whether any of the first to third output currents Ir1 to Ir3 exceeds the second threshold value of current Ith2. Moreover the processing of step S15 is replaced by processing for judging whether, during the interval from the time at which a switch was turned on in step S14 until the second judgement interval Tβ has elapsed, the output current Ir detected by the one of the first to third current detectors 401 to 403 that is provided in the target system has exceeded the second threshold value of current Ith2.

The present embodiment described above can provide the same effects as those of the first embodiment.

Modification Example 1 of the Fifth Embodiment

It should be noted that a third redundant load, which constitutes the electric power steering device in conjunction with the first and second redundant loads 31 and 32, may be provided in the third system ES3 in place of the third normal load 23. Each system is thereby provided with a redundant load.

Modification Example 2 of the Fifth Embodiment

In the configuration shown in FIG. 15, it would be equally possible to provide a voltage detector that detects the output voltage of each power output section, as in FIG. 6, instead of the current detectors 401 to 403.

Sixth Embodiment

Figure 16:
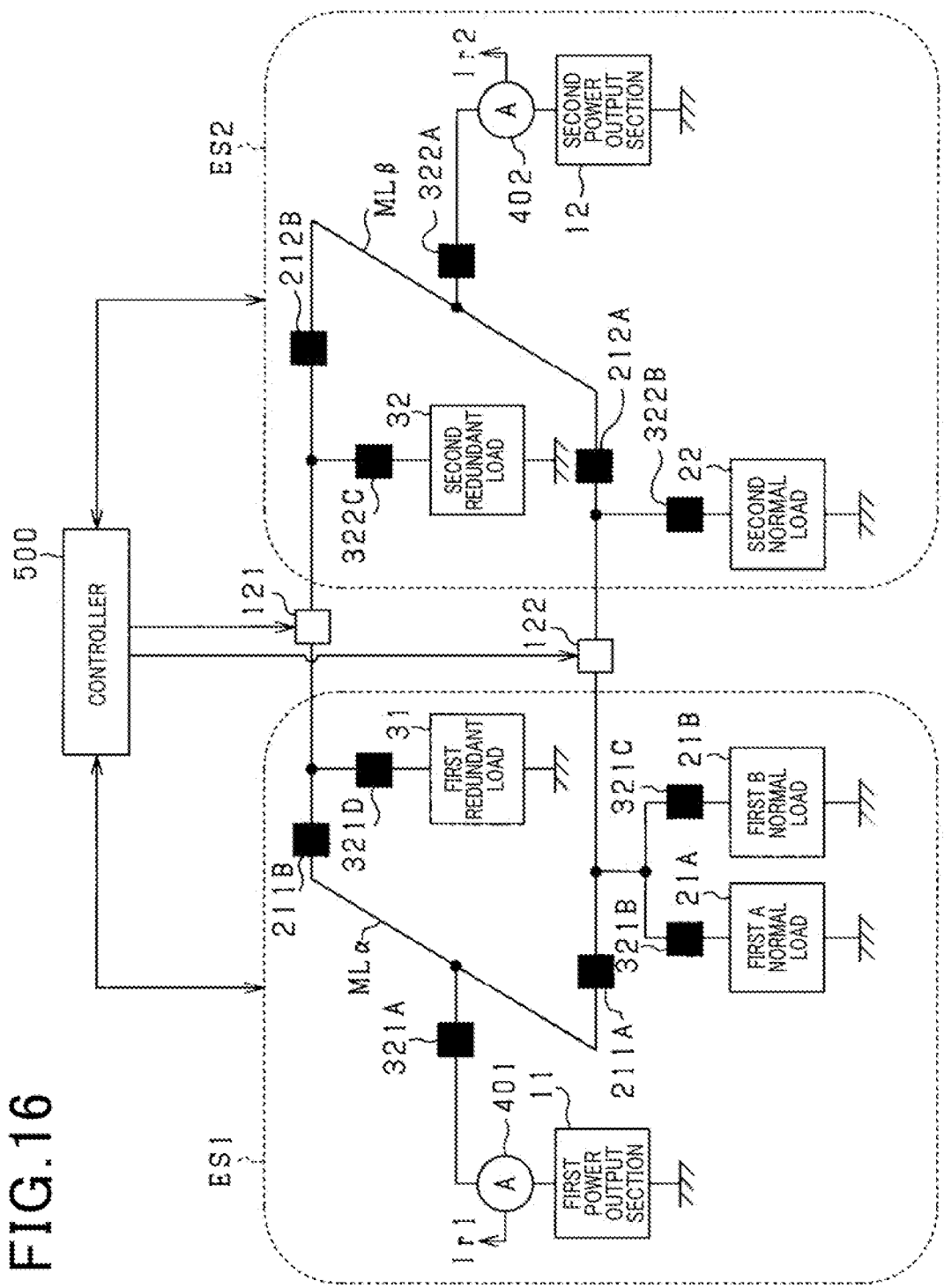
FIG. 16 is an overall configuration diagram of an in-vehicle power supply system according to a sixth embodiment.

A sixth embodiment will be described in the following referring to the drawings, with a focus on points of difference from the first embodiment. With this embodiment, as shown in FIG. 16, the power systems form a ring configuration. In FIG. 16, components which are identical to components shown in FIG. 1, etc., are designated by the same reference numerals as in FIG. 1, etc., for convenience.

A power supply system includes a first path MLα, a second path MLβ, a first inter-system switch 121, and a second inter-system switch 122. A first end of the second path MLβ is connected to a first end of the first path MLα via the first inter-system switch 121. The second end of the second path MLβ is connected to the second end of the first path MLα via the second inter-system switch 122. As a result, the power system has the form of a ring.

The first system ES1 includes first A and B intra-system switches 211A and 211B, first A to D individual switches 321A to 321D, first A and B normal loads 21A and 21B, and a first redundant load 31. In the first path MLα, a first B intra-system switch 211B is provided on the first inter-system switch 121 side, and a first A intra-system switch 211A is provided on the second inter-system switch 122 side. The positive electrode of the first redundant load 31 is connected via the first D individual switch 321D to the part of the first path MLα that is between the first inter-system switch 121 and the first B intra-system switch 211B. The positive electrode of the first power output section 11 is connected via the first A individual switch 321A and the first current detector 401 to the part of the first path MLα that is between the first B intra-system switch 211B and the first A intra-system switch 211A. The positive electrodes of the first A normal load 21A and the first B normal load 21B are connected via the first B individual switch 321B and the first C individual switch 321C to the part of the first path MLα between the second inter-system switch 122 and the first intra-A system switch 211A.

The second system ES2 includes second A and B intra-system switches 212A and 212B, second A to C individual switches 322A to 322C, a second normal load 22, and a second redundant load 32. In the second path MLβ, the second B intra-system switch 212 is provided on the first inter-system switch 121 side, and the second-A intra-system switch 212 is provided on the second inter-system switch 122 side. The positive electrode of the second redundant load 32 is connected via the second C individual switch 322C to the part of the second path MLβ between the first inter-system switch 121 and the second B intra-system switch 212B. The positive electrode of the second power output section 12 is connected via the second A individual switch 322A and the second current detector 402 to the part of second path MLβ that is between the second B intra-system switch 212B and the second A intra-system switch 212A. In the second path MLβ, the positive electrode of the second normal load 22 is connected between the second inter-system switch 122 and the second A intra-system switch 212A via a second B individual switch 322B.

With the present embodiment described above, since the power systems form a ring configuration, the location where a ground fault occurs can be readily distinguished.

Seventh Embodiment

Figure 17:
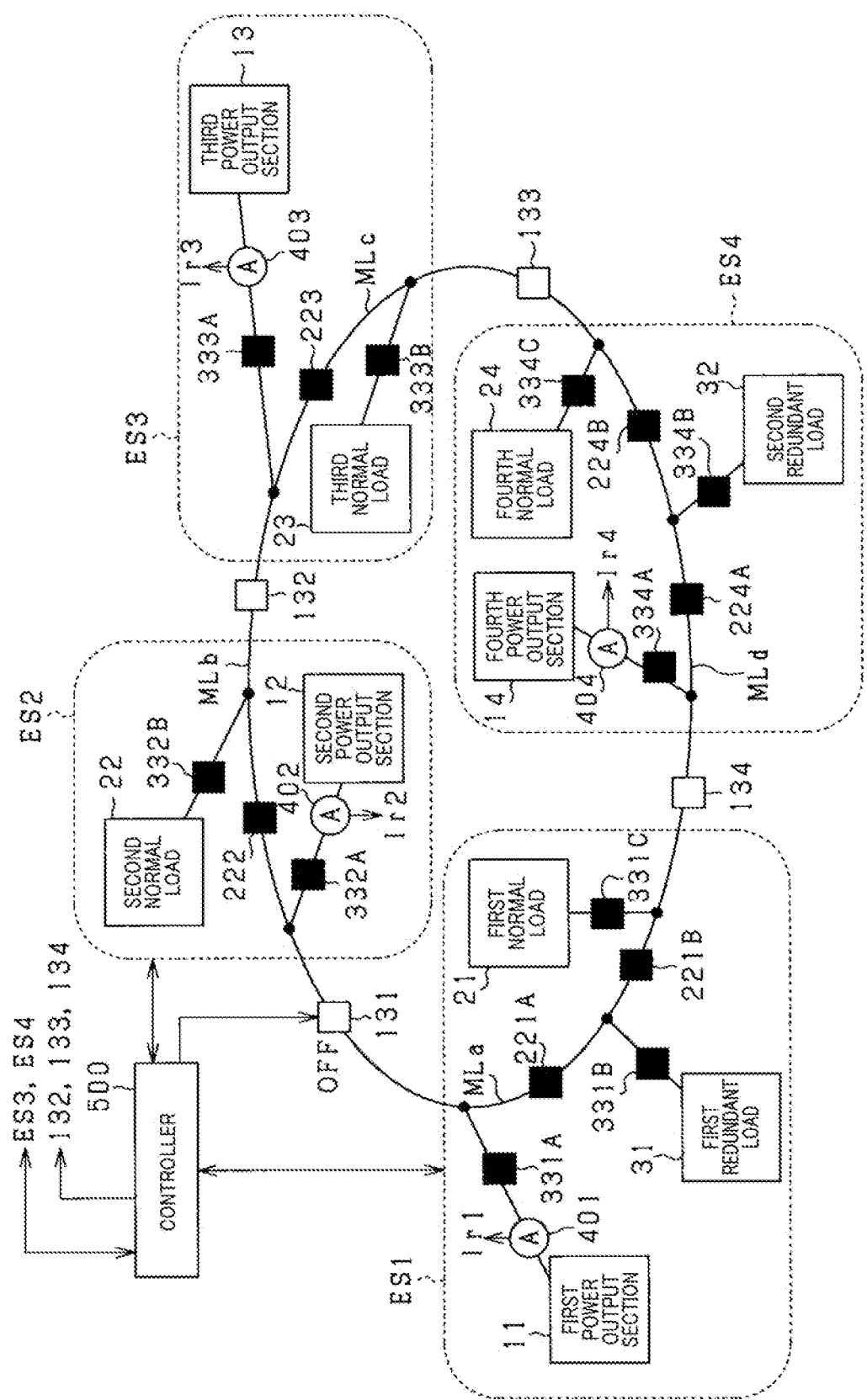
FIG. 17 is an overall configuration diagram of an in-vehicle power supply system according to a seventh embodiment.

A seventh embodiment will be described in the following referring to the drawings, with a focus on points of difference from the sixth embodiment. With this embodiment, as shown in FIG. 17, the power systems form a ring configuration. In FIG. 17, components which are identical to components shown in FIG. 16, etc., are designated by the same reference numerals as in FIG. 16, etc., for convenience.

A power supply system includes first to fourth paths MLa to MLd and first to fourth inter-system switches 131 to 134.

The first end of the second path MLb is connected to the first end of the first path MLa via the first inter-system switch 131. The first end of the third path MLc is connected to the second end of the second path MLb via the second inter-system switch 132. The first end of the fourth path MLd is connected to the second end of the third path MLc via the third inter-system switch 133. The first end of the first path MLa is connected to the second end of the fourth path MLd via the fourth inter-system switch 134. The power systems thus have the form of a ring.

The first system ES1 includes first A and B intra-system switches 221A and 221B, and first A to C individual switches 331A to 331C. In the first path MLa, the first A intra-system switch 221A is provided on the side of the first inter-intra-system switch 131, and the first B intra-system switch 221B is provided on the side of the fourth inter-intra-system switch 134. The positive electrode of the first power output section 11 is connected via the first A individual switch 331A and the first current detector 401 to the first path MLa on the first inter-intra-system switch 131 side of the first A intra-system switch 221A. The positive electrode of the first redundant load 31 is connected via the first B individual switch 331B to the first path MLa between the first A intra-system switch 221A and the first B intra-system switch 221B. The positive electrode of the first normal load 21 is connected via the first C individual switch 331C to the first path MLa between the fourth inter-intra-system switch 134 and the first intra-B intra-system switch 221B.

The second system ES2 includes a second intra-system switch 222 and second A and B individual switches 332A and 332B. In the second path MLb, the positive electrode of the second power output section 12 is connected to the first inter-system switch 131 side of the second intra-system switch 222 via the second A individual switch 332A and the second current detector 402. In the second path MLb, the positive electrode of the second normal load 22 is connected to the second inter-system switch 132 side of the second intra-system switch 222 via the second B individual switch 332B.

The third system ES3 includes a third intra-system switch 223 and third A and B individual switches 333A and 333B. The positive electrode of the third power output section 13 is connected via the third A individual switch 333A and the third current detector 403 to the third path MLc on the second inter-system switch 132 side of the third intra-system switch 223. The positive electrode of the third normal load 23 is connected via the third B individual switch 333B to the third path MLc on the third inter-system switch 133 side of the third intra-system switch 223.

The fourth system ES4 includes fourth A and B intra-system switches 224A and 224B, and fourth A to C individual switches 334A to 334C. In the fourth path MLd, a fourth A intra-system switch 224A is provided on the fourth inter-system switch 134 side, and a fourth B intra-system switch 224B is provided on the third inter-system switch 133 side. The positive electrode of the fourth power output section 14 is connected via the fourth A individual switch 334A and the fourth current detector 404 to the fourth path MLd between the fourth inter-system switch 134 and the fourth A intra-system switch 224A. The fourth current detector 404 detects the output current of the fourth power output section 14, as the fourth output current Ir4. The fourth output current Ir4 is inputted to the controller 500. The fourth power output section 14 is, for example, a secondary battery, as for the first to third power output sections 11 to 13. The positive electrode of the second redundant load 32 is connected via the fourth B individual switch 334B to the fourth path MLd between the fourth A intra-system switch 224A and the fourth B intra-system switch 224B. The positive electrode of the fourth normal load 24 is connected via the fourth C individual switch 334C to the fourth path MLd between the fourth intra-inter-system switch 224B and the third inter-system switch 133.

The operation processing executed when an abnormality occurs with the present embodiment will be described in the following.

Figure 18:
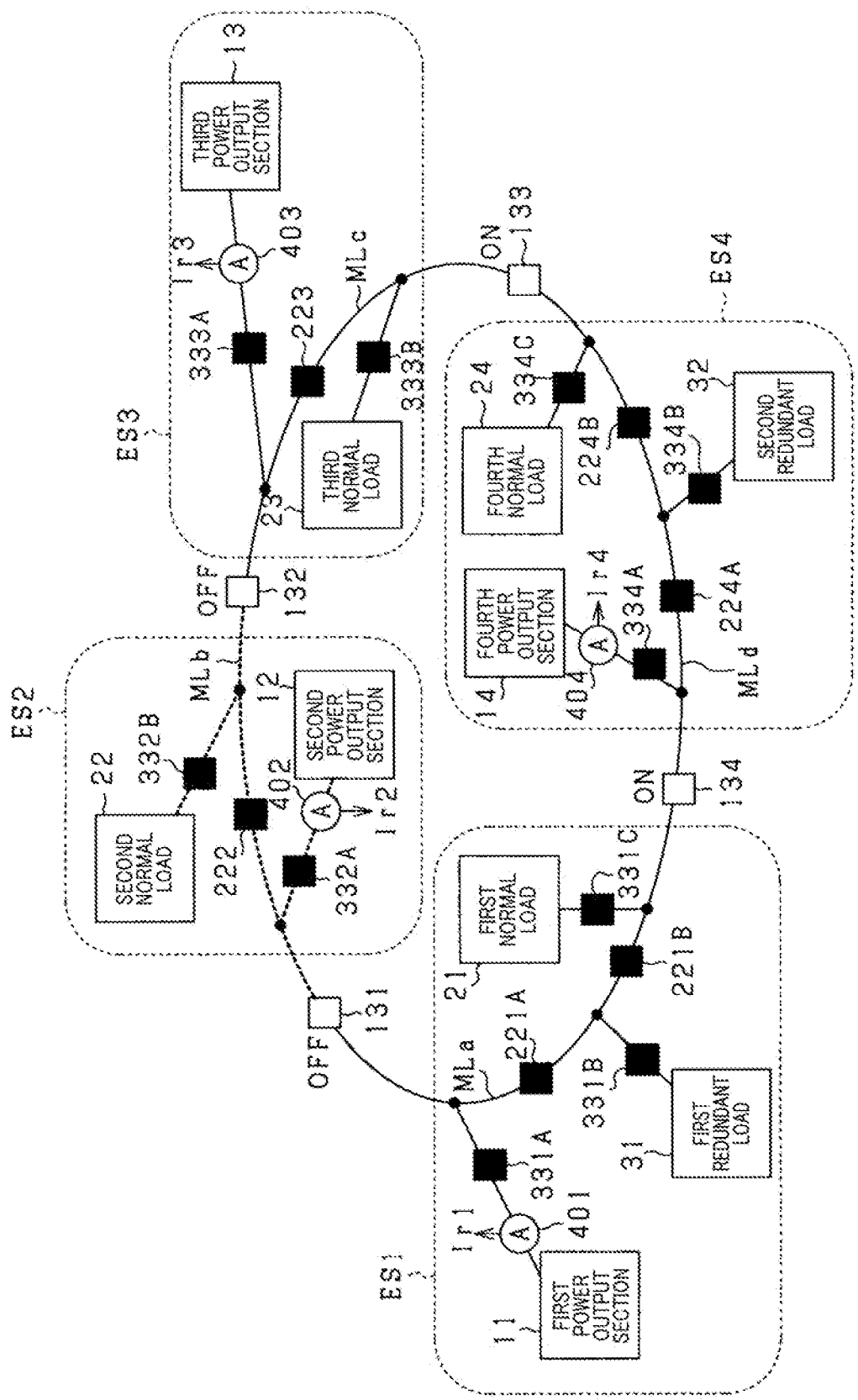
FIG. 18 is a diagram showing a condition in which a second system is disconnected.

When for example a ground fault occurs in the second path MLb, the controller 500 turns off the first to fourth inter-system switches 131 to 134. Thereafter, the controller 500 judges that, except for the second system ES2 which is the target system, the systems ES1 to ES4 of the systems ES1, ES3, and ES4 can be brought into a conductive state via the inter-system switches 133 and 134. As a result, as shown in FIG. 18, the controller 500 maintains the first inter-system switch 131 and the second inter-system switch 132 in the off state, and turns on the third inter-system switch 133 and the fourth inter-system switch 134. The second system ES2, in which the ground fault has occurred, can thereby be disconnected from the first, third and fourth system ES1, ES3, ES4.

With the present embodiment described above, the same effects can be obtained as for the sixth embodiment.

Modification Example 1 of the Seventh Embodiment

A first B redundant load 31D which constitutes a vehicle-mounted camera may be provided in the second system ES2, with the first redundant load 31 which constitutes an electric power steering device being omitted. Furthermore, a second B redundant load 32B which constitutes a vehicle-mounted camera may be provided in the third system ES3, with the second redundant load 32 which constitutes an electric power steering device being omitted. Since the devices used for effecting lane keeping support control as common control are disposed distributed among the systems ES1 to ES4 respectively, the reliability of lane keeping support control can be improved.

Modification Example 2 of the Seventh Embodiment

Figure 19:
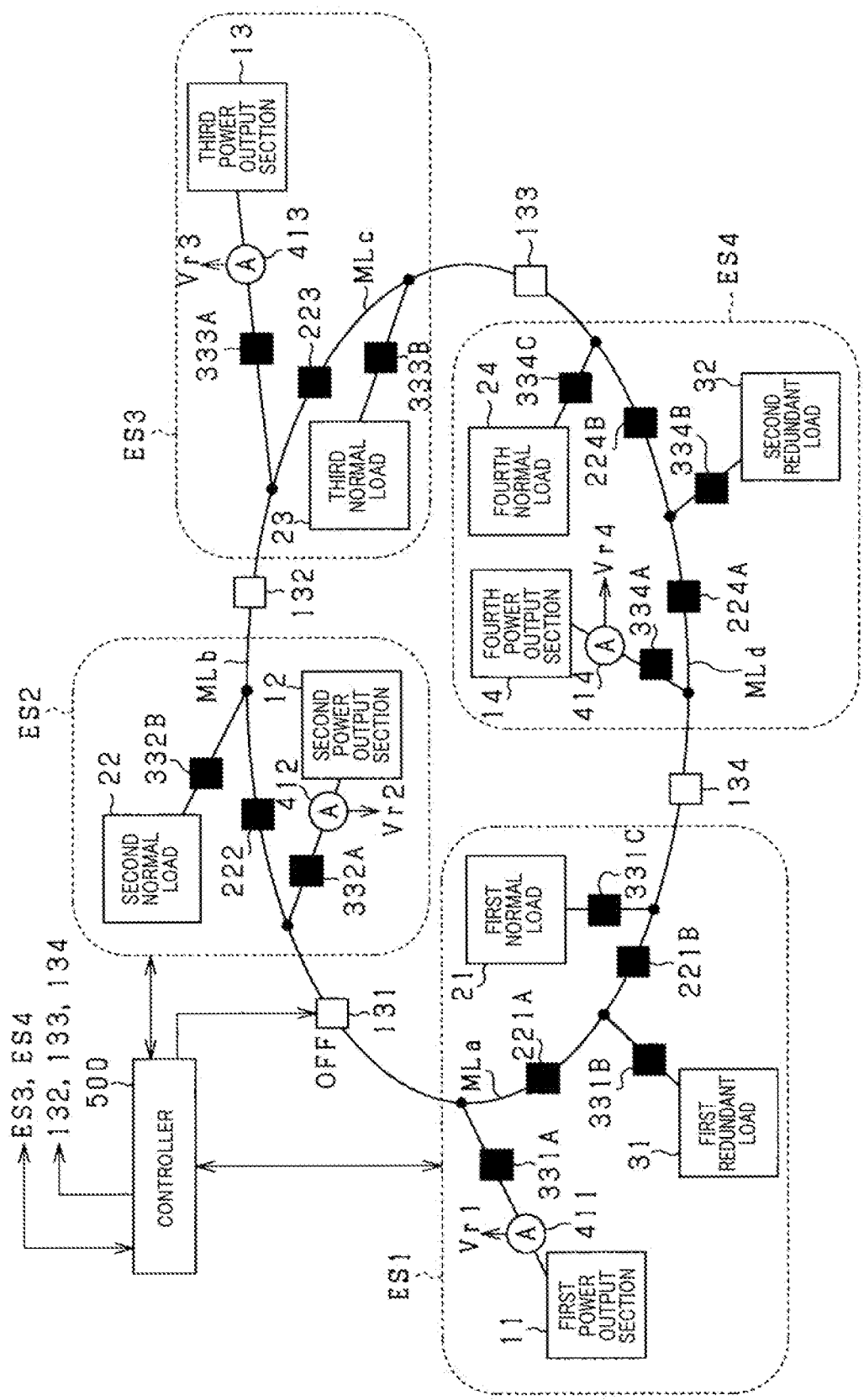
FIG. 19 is an overall configuration diagram of an in-vehicle power supply system according to Modification Example 2 of the seventh embodiment.

As shown in FIG. 19, first to fourth voltage detectors 411 to 414 that detect the output voltages of the first to fourth power output sections 11 to 14 may be provided in place of the first to fourth current detectors 401 to 404 of the configuration shown in FIG. 17. With this configuration also, for example as shown in FIG. 18, a system in which a ground fault has occurred can be disconnected from the other systems.

Eighth Embodiment

Figure 20:
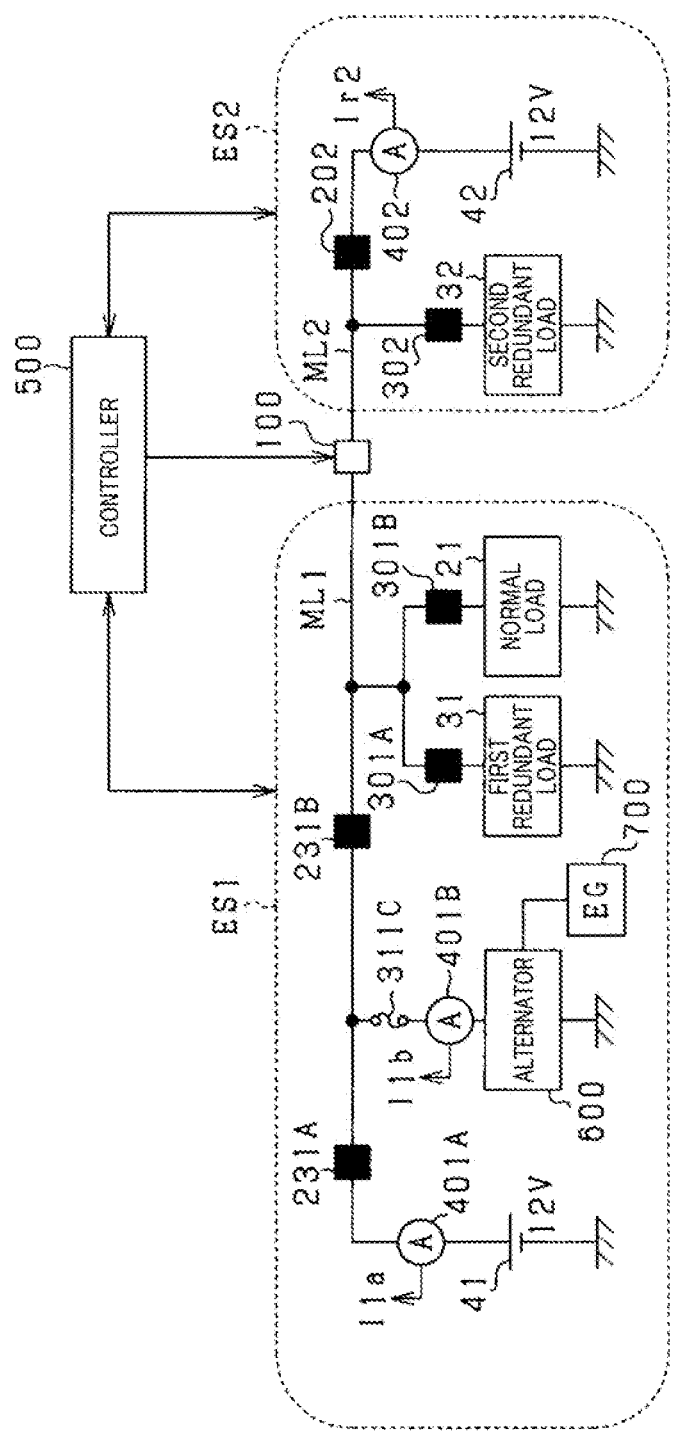
FIG. 20 is an overall configuration diagram of an in-vehicle power supply system according to an eighth embodiment.

An eighth embodiment will be described in the following referring to the drawings, with a focus on points of difference from the first embodiment. With the present embodiment, as shown in FIG. 20, the first system ES1 is provided with a storage battery and an alternator as power supplies. In FIG. 20, components which are identical to components shown in FIG. 1 etc., above, are designated by the same reference numerals as in FIG. 1 etc., for convenience.

The first system ES1 includes a first storage battery 41 as a first power output section, an alternator 600, first A and B intra-system switches 231A and 231B, and first A and B current detectors 401A and 401B. The first A current detector 401A detects the output current from the first storage battery 41 as the first A output current I1a. The first B current detector 401B detects the output current from the alternator 600 as the first B output current I1b. The first A and B output currents I1a and I1b are inputted to the controller 500. The second system ES2 includes a second storage battery 42 as a second power output section. With the present embodiment, the storage batteries 41 and 42 have the same rated voltage (for example 12V). Each storage battery 41, 42 is, for example, a lead-acid storage battery.

A first B intra-system switch 231B is provided in the first path ML1, on the inter-system switch 100 side, and a first A intra-system switch 231A is provided in the first path ML1n on the opposite side from the inter-system switch 100. The output side of the alternator 600 is connected to the first path ML1 between the first A system switch 231A and the first B system switch 231B, via the fuse 311C and the first B current detector 401B. The positive electrode of the first storage battery 41 is connected via the first A current detector 401A to the first path ML1 at the opposite side of the first A intra-system switch 231A from the first B intra-system switch 231B.

The alternator 600 performs electrical generation by being supplied with power from the output shaft of the engine 700 that is mounted on the vehicle, and outputs current. The output current of the alternator 600 can charge the first storage battery 41 and the second storage battery 42, and can supply power to the loads 21, 31, 32. With the present embodiment, power generation by the alternator 600 is controlled by the controller 500.

The main points of difference of the abnormal operation processing of the present embodiment from that of the first embodiment will be described in the following.

The first A and B output currents I1a and I1b and the second output current Ir2 are used in steps S10, S12, and S15 of FIG. 3.

The case in which a ground fault has occurred in the first system ES1 will be described as an example. In step S4, the first A intra-system switch 231A and the first B intra-system switch 231B are successively turned on, in that order. One of the first A and B individual switches 301A and 301B is subsequently turned on, and then the other is turned on.

The present embodiment described above can provide the same effects as those of the first embodiment.

Ninth Embodiment

Figure 21:
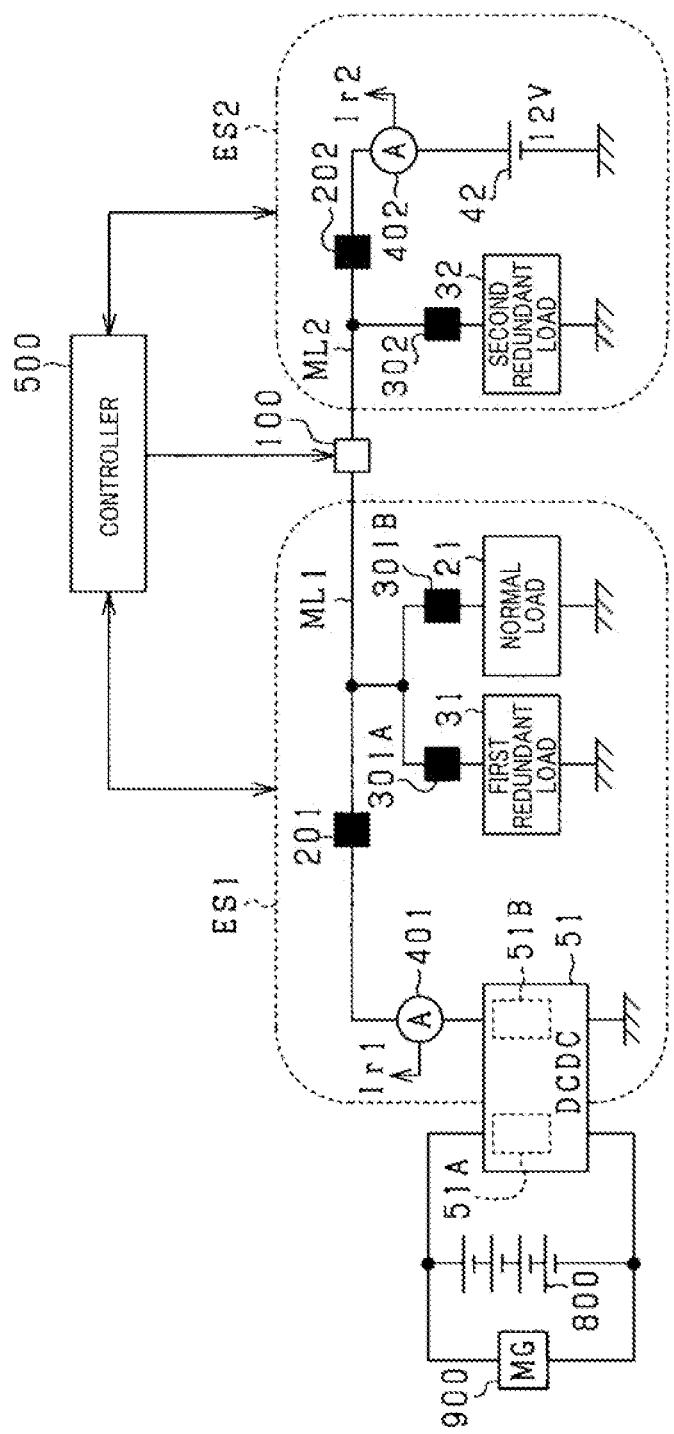
FIG. 21 is an overall configuration diagram of an in-vehicle power supply system according to a ninth embodiment.

A ninth embodiment will be described in the following referring to the drawings, with a focus on points of difference from the first embodiment. With the present embodiment, as shown in FIG. 21, the first system ES1 is provided with a DC-DC converter 51 that outputs power from an in-vehicle high voltage storage battery 800, as a power supply. The high voltage storage battery 800 corresponds to a high-voltage side storage device, and the second storage battery 42 corresponds to a low-voltage side storage device. In FIG. 21, components which are identical to components shown in FIGS. 1 and 20 are designated by the same reference numerals, for convenience.

The high voltage storage battery 800 has a higher rated voltage (for example, several hundred volts) than the second storage battery 42, and is, for example, a lithium-ion storage battery. A rotary electrical machine 900 is connected to the high voltage storage battery 800. The rotary electrical machine 900 is a main in-vehicle machine, which is supplied with electrical power from the high voltage storage battery 800 and transmits mechanical power to drive the read wheels.

A power supply system includes a DC-DC converter 51. The DC-DC converter 51 includes a first connection section 51A and a second connection section 51B. The first connecting portion 51A is connected in parallel with the high voltage storage battery 800. to the positive electrode side of the second connection section 51B is connected via the first current detector 401 to the first path ML1, and the negative electrode side, is connected to ground. The DC-DC converter 51 has a voltage step-down function of stepping down the DC voltage that is inputted from the first connection section 51A and outputting that DC voltage from the second connection section 51B, and a voltage boosting function of stepping up the DC voltage that is inputted from the second connection section 51B and outputting that DC voltage from the first connection section 51A. The DC-DC converter 51 is controlled by the controller 500. It should be noted that even after the power supply on the first system ES1 side has become disconnected, it would be possible for the control power supply of the DC-DC converter 51 to receive power from the high voltage storage battery 800 side that has been separately stepped down in voltage, or to receive power from the power system on the second system ES2 side, etc.

The embodiment described above can provide the same effects as those of the first embodiment.

Tenth Embodiment

Figure 22:
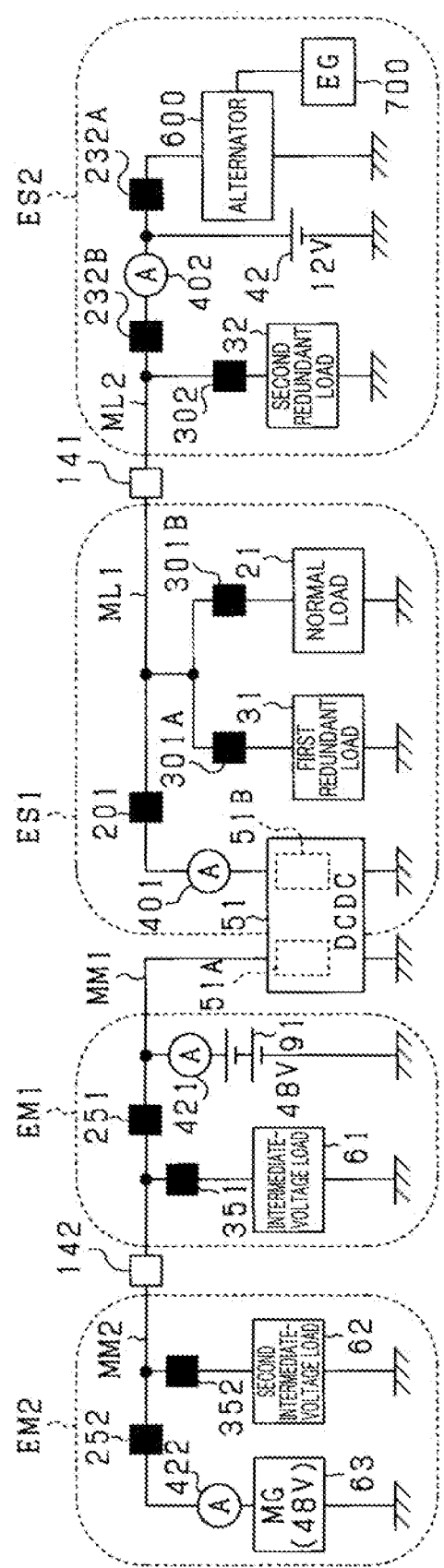
FIG. 22 is an overall configuration diagram of an in-vehicle power supply system according to a tenth embodiment.

A tenth embodiment will be described in the following referring to the drawings, with a focus on points of difference from the ninth embodiment. With the present embodiment, the configuration of a power supply system is changed as shown in FIG. 22. In FIG. 22, components which are identical to components shown in FIG. 21, etc., are designated by the same reference numerals as in FIG. 21, etc., for convenience. In the following, the controller 500 is omitted from the drawings.

The second system ES2 includes an alternator 600. The second path ML2 is connected to the output side of the alternator 600. The first path ML1 is connected to the second path ML2 via a first inter-system switch 141. The positive electrode of the second storage battery 42 is connected to the part of the second path ML2 that is between a second A intra-system switch 232A and a second B intra-system switch 232B.

The power supply system includes a first intermediate-voltage system EM1 and a second intermediate-voltage system EM2, as power systems. The power supply system includes a first intermediate-voltage path MM1 and a second intermediate-voltage path MM2, as electrical paths.

The first intermediate-voltage system EM1 includes a first intermediate-voltage intra-system switch 251, a first intermediate-voltage individual switch 351, an intermediate-voltage storage battery 91 as a power output section, an intermediate-voltage load 61 as an electrical load, and a first intermediate-voltage current detector 421. The intermediate-voltage storage battery 91 has a higher value of rated voltage (for example, 48 V) than the second storage battery 42. The first intermediate-voltage current detector 421 detects the output current of the intermediate-voltage storage battery 91 and outputs the value of that current to the controller 500. With the present embodiment, the intermediate-voltage storage battery 91 corresponds to a high-voltage side storage device, and the second storage battery 42 corresponds to a low-voltage side storage device.

The second intermediate-voltage system EM2 includes a second intermediate-voltage intra-system switch 252, a second intermediate-voltage individual switch 352, a second intermediate-voltage load 62, an intermediate-voltage rotary electrical machine 63 as a power output section, and a second intermediate-voltage current detector 422. The intermediate-voltage rotary electrical machine 63 generates electric power by being supplied with power from the output shaft of the engine 700, and outputs a current. The output current of the intermediate-voltage rotary electrical machine 63 can charge the intermediate-voltage storage battery 91, or can supply power to each of the intermediate-voltage loads 61 and 62. Furthermore, the intermediate-voltage rotary electrical machine 63 can be driven as an electric motor by being supplied with power. The second intermediate-voltage current detector 422 detects the output current of the intermediate-voltage rotary electrical machine 63, and outputs the value of the current to the controller 500.

The second intermediate-voltage path MM2 is connected to the first intermediate-voltage path MM1 via the second inter-system switch 142. The first intermediate-voltage intra-system switch 251 is provided in the first intermediate-voltage path MM1. The part of the first intermediate-voltage path MM1 that is on the opposite side of the first intermediate-voltage intra-system switch 251 from the second inter-system switch 142 is connected via the first intermediate-voltage current detector 421 to the positive electrode of the intermediate-voltage storage battery 91, and is connected to the first connection portion 51A. The negative electrode of the intermediate-voltage storage battery 91 is connected to ground. Power can be exchanged between the first intermediate-voltage system EM1 and the first system ES1 via the DC-DC converter 51. The positive electrode of the first intermediate-voltage load 61 is connected via the first intermediate-voltage individual switch 351 to the first intermediate-voltage path MM1 between the second inter-system switch 142 and the first intermediate-voltage intra-system switch 251.

The second intermediate-voltage intra-system switch 252 is provided in the second intermediate-voltage path MM2.

The output side of the intermediate-voltage rotary electrical machine 63 is connected via the second intermediate-voltage current detector 422 to the second intermediate-voltage path MM2, on the opposite side of the second intermediate-voltage intra-system switch 252 from the second inter-system switch 142.

The positive electrode of the second intermediate-voltage load 62 is connected via the second intermediate-voltage individual switch 352 to the second intermediate-voltage path MM2 between the second inter-system switch 142 and the second intermediate-voltage intra-system switch 252.

The main points of difference of the abnormal operation processing of the present embodiment from that of the first embodiment will be described in the following. Output currents that are detected by the current detectors 401, 402, 421, and 422 are used in steps S10, S12, and S15 of FIG. 3.

With this embodiment, even if a ground fault occurs in the first intermediate-voltage system EM1 or in the second intermediate-voltage system EM2, for example, the system in which the ground fault has occurred can be disconnected from the other systems.

Modification Example of the Tenth Embodiment

Figure 23:
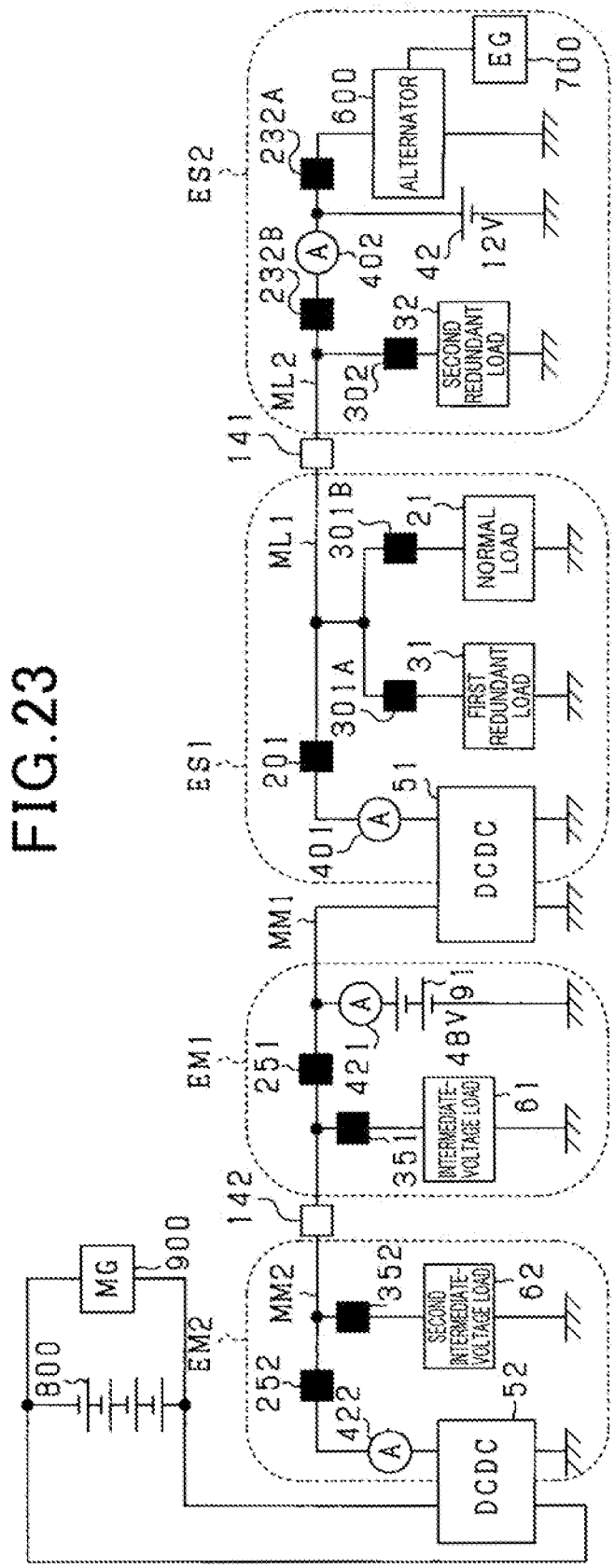
FIG. 23 is an overall configuration diagram of an in-vehicle power supply system according to a modification example of the tenth embodiment.

As shown in FIG. 23, a high voltage storage battery 800 may be connected via a second DC-DC converter 52, provided as a power output section, to the second intermediate-voltage path MM2 on the opposite side of the second intermediate-voltage intra-system switch 252 from the second inter-system switch 142. The second DC-DC converter 51 has a voltage step-down function of stepping down the DC voltage that is outputted from the high voltage storage battery 800, and supplying the stepped-down DC voltage to the second intermediate-voltage system EM2, and a voltage boost function of boosting the DC voltage outputted from the intermediate-voltage storage battery 91 and supplying the boosted DC voltage to the high voltage storage battery 800. With this embodiment, electric power can be supplied from the high voltage storage battery 800 to the second intermediate-voltage system EM2 via the second DC-DC converter 52.

It should be noted that in FIG. 23, with respect to the relationship between the second storage battery 42 and the intermediate-voltage storage battery 91, the intermediate-voltage storage battery 91 corresponds to a high-voltage side storage device, and the second storage battery 42 corresponds to a low-voltage side electrical device. Moreover, with respect to the relationship between the intermediate-voltage storage battery 91 and the high voltage storage battery 800, the high voltage storage battery 800 corresponds to a high-voltage side storage device, and the intermediate-voltage storage battery 91 corresponds to a low-voltage side storage device.

Eleventh Embodiment

Figure 24:
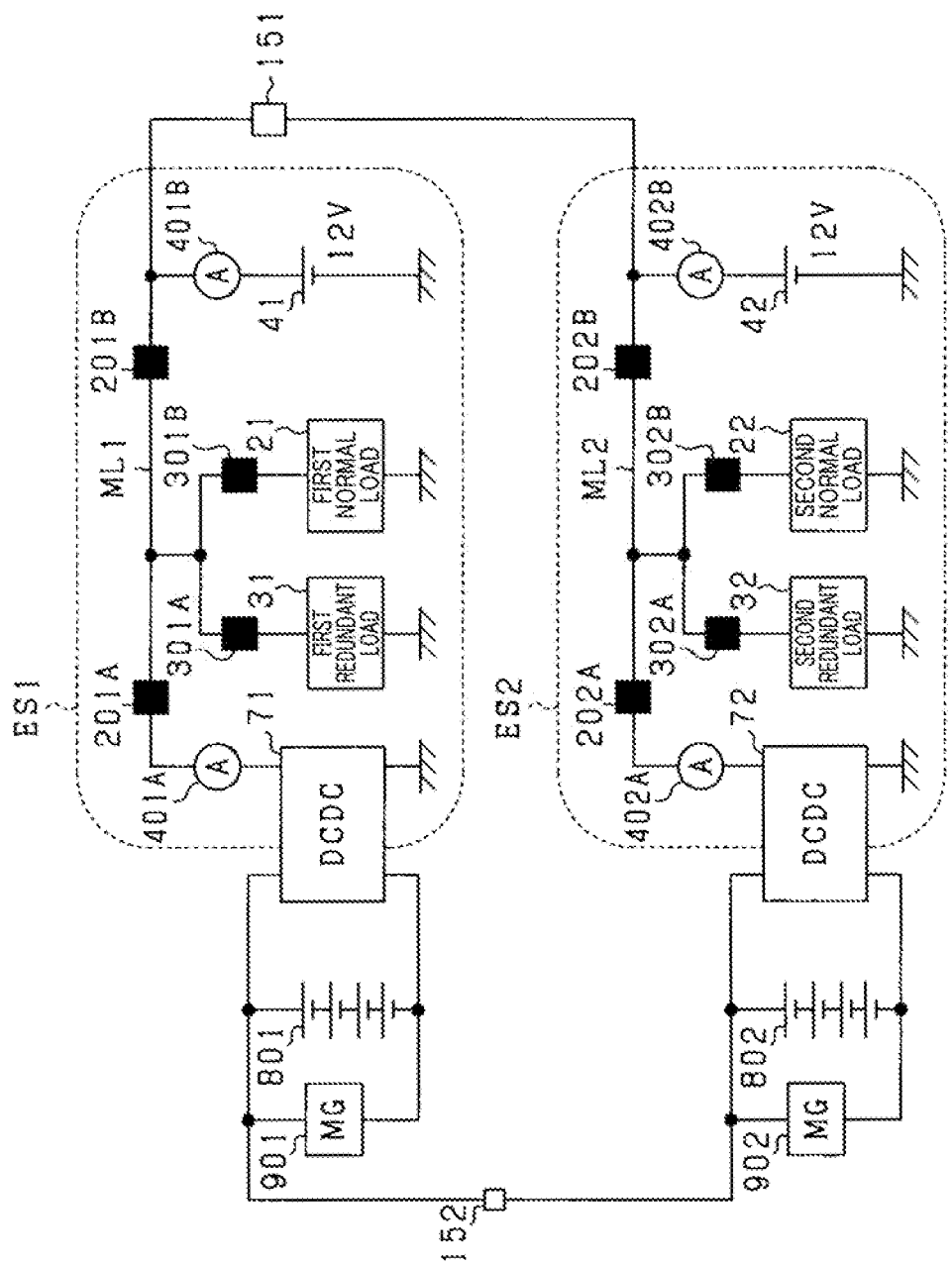
FIG. 24 is an overall configuration diagram of an in-vehicle power supply system according to an eleventh embodiment.

An eleventh embodiment will be described in the following referring to the drawings, with a focus on points of difference from the ninth embodiment. With the present embodiment, the configuration of a power supply system is changed as shown in FIG. 24. In FIG. 24, components which are identical to components shown in FIG. 21, etc., are designated by the same reference numerals as in FIG. 21, etc., for convenience.

The power supply system includes a first high voltage storage battery 801, a first rotary electrical machine 901, a second high voltage storage battery 802, and a second rotary electrical machine 902. The high voltage storage batteries 801 and 802 have the same rated voltage, and have a higher rated voltage (for example, several hundred volts) than the first and second storage batteries 41 and 42. Each of the high voltage storage batteries 801 and 802 is, for example, a lithium-ion storage battery. A first rotary electrical machine 901 is connected to the first high voltage storage battery 801. The first rotary electrical machine 901 is driven by being supplied with power from the first high voltage storage battery 801. A second rotary electrical machine 902 is connected to the second high voltage storage battery 802. The second rotary electrical machine 902 is driven by being supplied with power from the second high voltage storage battery 802. The power system that is provided with the first high voltage storage battery 801 constitutes a first high-voltage system, and the power system that is provided with the second high voltage storage battery 802 constitutes a second high-voltage system.

The power supply system includes a first inter-system switch 151 and a second inter-system switch 152. A second path MU is connected to the first path ML1 via a first inter-system switch 151. The positive electrode of the second high voltage storage battery 802 is connected to the positive electrode of the first high voltage storage battery 801 via the second inter-system switch 152. The first inter-system switch 151 and the second inter-system switch 152 are operated by the controller 500.

The first system ES1 includes first A and B intra-system switches 201A and 201B, first A and B individual switches 301A and 301B, a first redundant load 31, and a first normal load 21. The first system ES1 includes a first storage battery 41, a first DC-DC converter 71, and first A and B current detectors 401A and 401B. The first DC-DC converter 71 has a voltage step-down function for stepping down the DC voltage that is outputted from the first high voltage storage battery 801 and outputting the stepped-down voltage to the first system ES1, and has a voltage boosting function for boosting the DC voltage that is outputted from the first storage battery 41 and outputting the boosted voltage to the first high voltage storage battery 801. The first A current detector 401A detects the output current of the first DC-DC converter 71 during the step-down operation, and outputs the detected current value to the controller 500. The first B current detector 401B detects the output current of the first storage battery 41 and outputs the detected current value to the controller 500.

The second system ES2 includes second A and second B intra-system switches 202A and 202B, second A and second B individual switches 302A and 302B, a second redundant load 32, and a second normal load 22. The second system ES2 includes a second storage battery 42, a second DC-DC converter 72, and second A and B current detectors 402A and 402B. The second DC-DC convener 72 has a voltage step-down function for stepping down the DC voltage that is outputted from the second high voltage storage battery 802 and outputting the stepped-down voltage to the second system ES2, and has a voltage boosting function for boosting the DC voltage that is outputted from the second storage battery 42 and outputting the boosted voltage to the second high voltage storage battery 802. The second A current detector 402A detects the output current of the second DC-DC converter 72 during the step-down operation, and outputs the detected current value to the controller 500. The second B current detector 402B detects the output current of the second storage battery 42 and outputs the detected current value to the controller 500.

With the present embodiment, the first system ES1 and the first high-voltage system are connected by the first DC-DC converter 71, and the second system ES1 and the second high-voltage system are connected by the second DC-DC converter 72. As a result, the first system ES1, the first high voltage system, the second high voltage system and the second system ES2 form a ring configuration. It is thereby made possible to readily specify the location where a ground fault is occurring.

It should be noted that intra-system switches may be provided in the first and second high-voltage systems. Specifically, for example, an intra-system switch may be provided in the electrical path that connects the positive electrode of the first high voltage storage battery 801 to the first connection section of the first DC-DC converters 71, and in the electrical path that connects the positive electrode of the second high voltage storage battery 802 to the first connection section of the second DC-DC converter 72.

Modification Example of the Eleventh Embodiment

Figure 25:
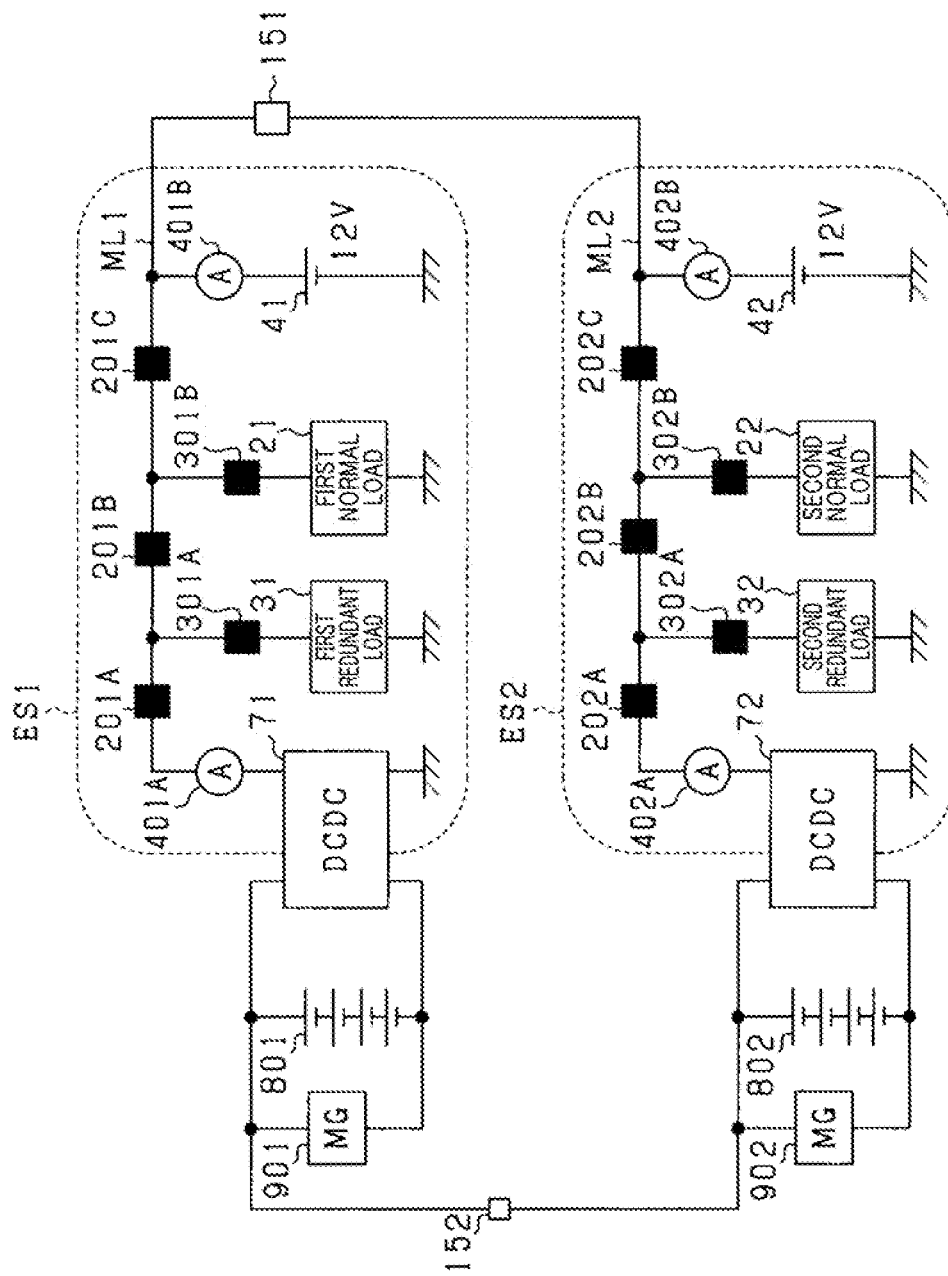
FIG. 25 is an overall configuration diagram of an in-vehicle power supply system according to a modification example of the eleventh embodiment.

The manner of installing the intra-system switches in the first system ES1 may be changed as shown in FIG. 25. FIG. 25 illustrates intra-system switches 201A, 201B, 201C which are in the first system ES1. Furthermore, the manner of installing the intra-system switches in the second system ES2 may be changed as shown in FIG. 25. FIG. 25 illustrates intra-system switches 202A, 202B, 202C which are in the second system ES2.

Twelfth Embodiment

Figure 26:
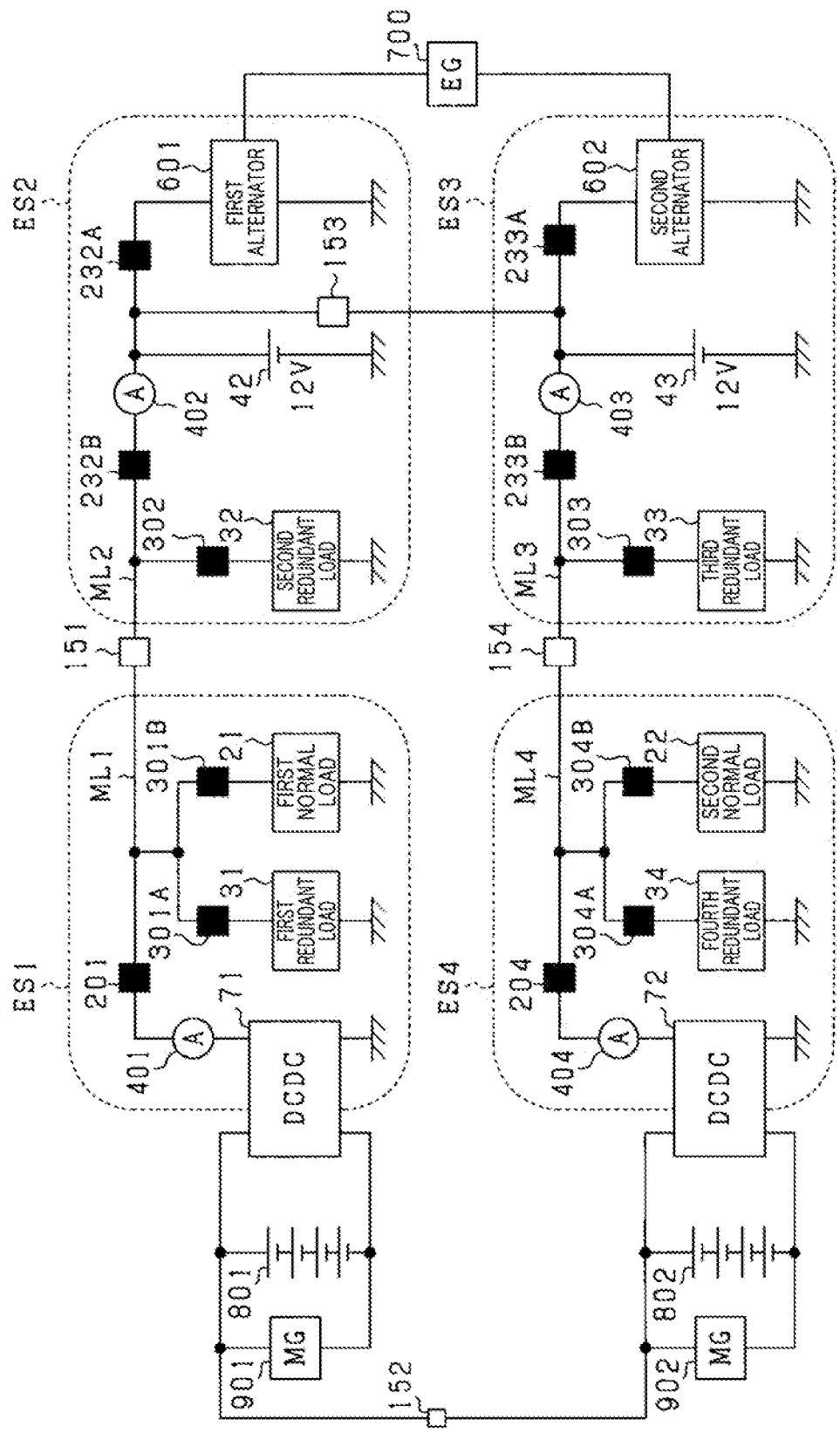
FIG. 26 is an overall configuration diagram of an in-vehicle power supply system according to a twelfth embodiment.

A twelfth embodiment will be described in the following referring to the drawings, with a focus on points of difference from the eleventh embodiment. With the present embodiment, the configuration of a power supply system is changed as shown in FIG. 26. In FIG. 26, components which are identical to components shown in FIG. 24, etc., are designated by the same reference numerals as in FIG. 24, etc., for convenience.

The power supply system includes first to fourth paths ML1 to MIA and first to fourth inter-system switches 151 to 154. The third path ML3 is connected to the second path ML2 via the third inter-system switch 153. The fourth path ML4 is connected to the third path ML3 via the fourth inter-system switch 154.

The second system ES2 includes second A and B intra-system switches 232A and 232B, a second individual switch 302, a second redundant load 32, a second storage battery 42, a second current detector 402, and a first alternator 601. The first alternator 601 generates electric power by being supplied with power from the output shaft of the engine 700, and outputs a current. A second current detector 402 is provided in the second path ML2. The positive electrode of the second storage battery 42 is connected to the second path ML2, and the second current detector 402 is disposed between the first inter-system switch 151 and the second storage battery 42. Furthermore, the output side of the first alternator 601 is connected to the second path ML2 via the second A intra-system switch 232A, on the opposite side from the first inter-system switch 151 with respect to the second current detector 402.

The third system ES3 includes third A and B inter-system switches 233A and 233B, a third individual switch 303, a third redundant load 33, a third storage battery 43, a third current detector 403, and a second alternator 602. The third storage battery 43 has the same rated voltage as the second storage battery 42. The second alternator 602 generates electric power by being supplied with when power from the output shaft of the engine 700, and outputs a current. A third current detector 403 is provided in the third path ML3. The positive electrode of the third storage battery 43 is connected to the third path ML3 between the third inter-system switch 153 and third current detector 403. Furthermore, the output side of the second alternator 602 is connected to the third path MU via the third A intra-system switch 233A between the third inter-system switch 153 and the third current detector 403.

The fourth system ES4 includes a fourth intra-system switch 204, fourth A and B individual switches 304A and 304B, a second normal load 22, a fourth redundant load 34, a fourth current detector 404, and a second DC-DC converter 72. The second DC-DC converter 72 has a voltage step-down function for stepping down the DC voltage that is outputted from the second high voltage storage battery 802 and outputting the stepped-down voltage to the fourth system ES4, and has a voltage boosting function for boosting the DC voltage that is outputted from the fourth system ES4 side and outputting the boosted voltage to the second high voltage storage battery 802. The fourth current detector 404 detects the output current of the second DC-DC converter 72 during the step-down operation.

With this embodiment, the output currents detected by each of the current detectors 401 to 404 may be used in steps S11, S12, and S15 of FIG. 3, for example.

It should be noted that it would be equally possible for the second system ES2 and the third system ES3 to be provided with normal loads.

Thirteenth Embodiment

Figure 27:
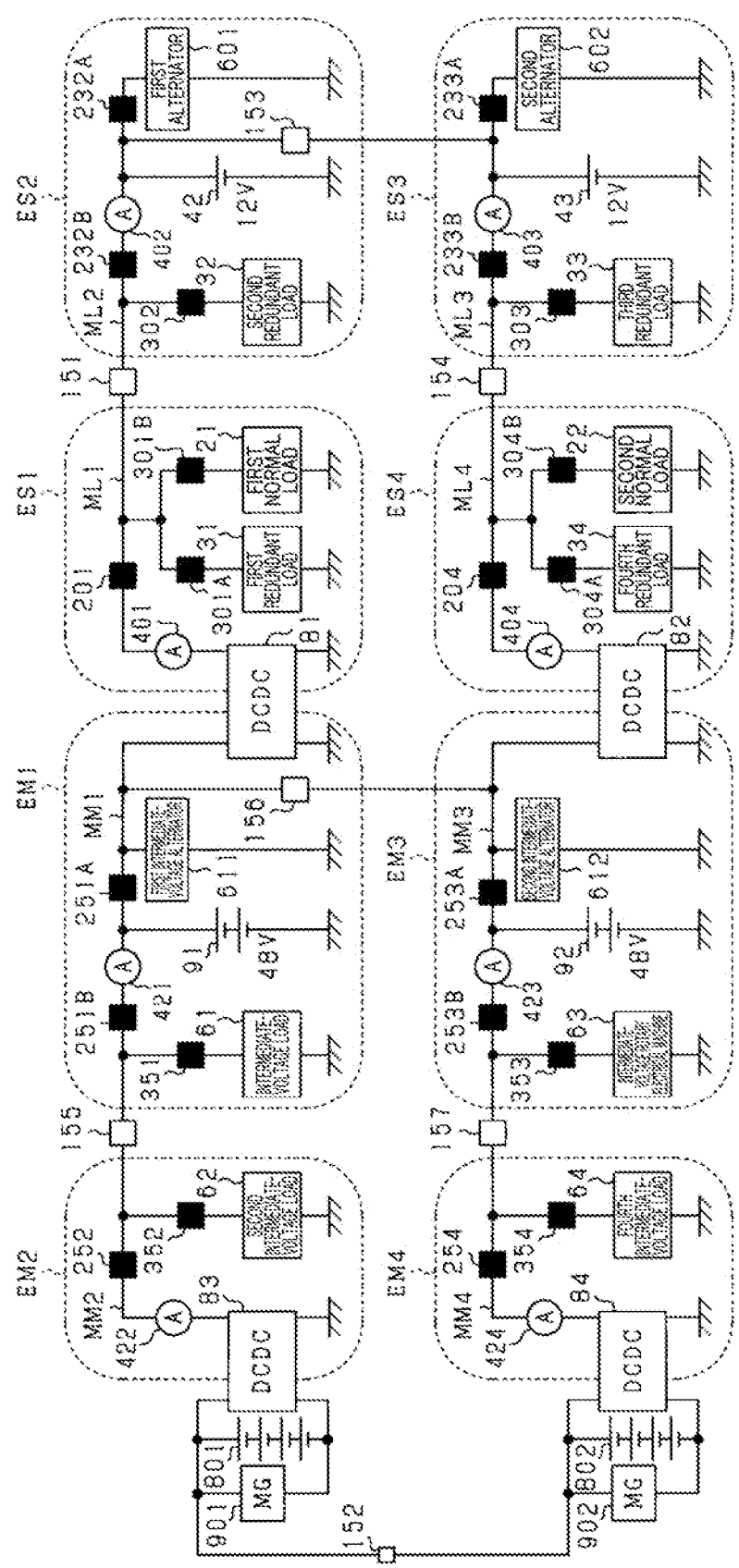
FIG. 27 is an overall configuration diagram of an in-vehicle power supply system according to a thirteenth embodiment.

A thirteenth embodiment will be described in the following referring to the drawings with a focus on points of difference from the twelfth embodiment. With this embodiment, the configuration of a power supply system is changed as shown in FIG. 27. In FIG. 27, components which are identical to components shown in FIG. 26 are designated by the same reference numerals as in FIG. 26, for convenience. Illustration of the engine 700 is omitted from FIG. 27.

The first system ES1 includes a first DC-DC converter 81. The first DC-DC converter 81 has a voltage step-down function for stepping down the DC voltage that is outputted from the first intermediate-voltage system EM1 side and outputting the DC voltage to the first system ES1, and has a voltage boosting function for boosting the DC voltage that is outputted from the first system ES1 and outputting the voltage to the first intermediate-voltage system EM1 side. The first current detector 401 detects the output current of the first DC-DC converter 81 during the step-down operation.

The fourth system ES4 includes a second DC-DC converter 82. The second DC-DC converter 82 has a voltage step-down function for stepping down the DC voltage that is outputted from the third intermediate-voltage system EM3 side and outputting the DC voltage to the fourth system ES4 side, and has a voltage boosting function for boosting the DC voltage that is outputted from the fourth system ES4 and outputting the voltage to the third intermediate-voltage system EM3 side. The fourth current detector 404 detects the output current of the second DC-DC converter 82 during the step-down operation.

The power supply system includes first to fourth intermediate-voltage systems EM1 to EM4, fifth to seventh inter-system switches 155 to 157, and first to fourth intermediate-voltage paths MM1 to MM4.

The first intermediate-voltage system EM1 includes first A and B intermediate-voltage intra-system switches 251A and 251B, a first intermediate-voltage individual switch 351, a first intermediate-voltage storage battery 91, a first intermediate-voltage alternator 611, and a first intermediate-voltage current detector 421. The first intermediate-voltage storage battery 91 has a rated voltage which is lower than that of the high voltage storage batteries 801 and 802 and is higher than that of the second and third storage batteries 42 and 43. The first intermediate-voltage alternator 611 generates electric power from power that is supplied from the output shaft of engine 700, and outputs a current. The first intermediate-voltage alternator 611 has a higher rated output voltage than that of the first and second alternators 601 and 602.

The first intermediate-voltage path MM1 is provided with first A and B intermediate-voltage intra-system switches 251A and 251B. The second intermediate-voltage path MM2 is connected via the fifth inter-system switch 155 to one side of the first intermediate-voltage path MM1, and the first connection section of the first DC-DC converter 81 is connected to the other side of the first intermediate-voltage path MM1. The positive electrode of the first intermediate-voltage load 61 is connected via the first intermediate-voltage individual switch 351 to the second intermediate-voltage path MM2 between the fifth inter-system switch 155 and the first B intermediate-voltage intra-system switch 251B. In the second intermediate-voltage path MM2, the positive electrode of the first intermediate-voltage storage battery 91 is connected between the first A intermediate-voltage intra-system switch 251A and the first B intermediate-voltage intra-system switch 251B. The output side of the first intermediate-voltage alternator 611 is connected to the second intermediate-voltage path MM1 between the first DC-DC converter 81 and the first A intermediate-voltage intra-system switch 251A. A first intermediate-voltage current detector 421 is provided in the second intermediate-voltage path MM2, on the first B intermediate-voltage intra-system switch 251B side, on the opposite side from the connection point with the first intermediate-voltage storage battery 91.

The second intermediate-voltage system EM2 includes a second intermediate-voltage intra-system switch 252, a second intermediate-voltage individual switch 352, a second intermediate-voltage load 62, a third DC-DC converter 83, and a second intermediate-voltage current detector 422. A second intermediate-voltage intra-system switch 252 is provided in the second intermediate-voltage path MM2. The positive electrode of the second intermediate-voltage load 62 is connected via the second intermediate-voltage individual switch 352 to the second intermediate-voltage path MM2 between the fifth inter-system switch 155 and the second intermediate-voltage intra-system switch 252. The second connection section of the third DC-DC converter 83 is connected via the second intermediate-voltage path MM2 to the second intermediate-voltage intra-system switch 252, on the side opposite the fifth inter-system switch 155. The third DC-DC converter 83 has a voltage step-down function for stepping down the DC voltage that is outputted from the first high voltage storage battery 801 and outputting the DX voltage to the second intermediate-voltage system EM2 side, and has a voltage boosting function for boosting the DC voltage that is outputted from the second intermediate-voltage system EM2 and outputting the voltage to the first high voltage storage battery 801. The second intermediate-voltage current detector 422 detects the output current of the third DC-DC converter 83 during the step-down operation.

The third path MM3 is connected via the sixth inter-system switch 156 to the first DC-DC converter 81 side of the first intermediate-voltage path MM1

The third intermediate-voltage system EM3 includes third A and B intermediate-voltage intra-system switches 253A and 253B a third intermediate-voltage individual switch 353, a second intermediate-voltage storage battery 92, a second intermediate-voltage alternator 612, and a third intermediate-voltage current detector 423. The second intermediate-voltage storage battery 92 has the same rated voltage as the first intermediate-voltage storage battery 91. The second intermediate-voltage alternator 612 generates electric power from power that is supplied from the output shaft of engine 700, and outputs a current. The second intermediate-voltage alternator 612 has the same rated output voltage as the first intermediate-voltage alternator 611.

Third A and B intermediate-voltage intra-system switches 253A and 253B are provided in the third intermediate-voltage path MM3. A fourth intermediate-voltage path MM4 is connected to the third intermediate-voltage path MM3, on the side opposite the connection point with the sixth inter-system switch 156, via a seventh inter-system switch 157. The positive electrode of the third intermediate-voltage load 63 is connected to the third intermediate-voltage path MM3 between the seventh inter-system switch 157 and the third B intermediate-voltage intra-system switch 253B, via the third intermediate-voltage individual switch 353. In the third intermediate-voltage path MM3, the positive electrode of the second intermediate-voltage storage battery 92 is connected between the third A intermediate-voltage intra-system switch 253A and the third B intermediate-voltage intra-system switch 253B. The positive electrode of the second intermediate-voltage storage battery 92 is connected to the third intermediate-voltage path MM3 on the side of the connection point the third A intermediate-voltage intra-system switch 253A and the sixth intersystem switch 156. The output side of the second intermediate-voltage alternator 612 is connected to the third intermediate-voltage path MM3 between the second DXC-DC converter 82 and the third A intermediate-voltage intra-system switch 253A. A third intermediate-voltage current detector 423 is provided in the third intermediate-voltage path MM3, on the side of the connection point between the third B intermediate-voltage intra-system switch 253B and the second intermediate-voltage storage battery 92.

The fourth intermediate-voltage system EM4 includes a fourth intermediate-voltage intra-system switch 254, a fourth intermediate-voltage individual switch 354, a fourth intermediate-voltage load 64, a fourth DC-DC converter 84, and a fourth intermediate-voltage current detector 424. The fourth intermediate-voltage intra-system switch 254 is provided in the fourth intermediate-voltage path MM4. The positive electrode of the fourth intermediate-voltage load 64 is connected via the fourth intermediate-voltage individual switch 354 to the seventh inter-system switch 157 between the fourth intermediate-voltage path MM4 and the fourth intermediate-voltage intra-system switch 254. The second connection section of the fourth DC-DC converter 84 is connected in the fourth intermediate-voltage path MM4, on the side that is opposite the seventh inter-system switch 157, with respect to the fourth intermediate-voltage intra-system switch 254. The fourth DC-DC converter 84 has a voltage step-down function for stepping down the DC voltage that is outputted from the second high voltage storage battery 802 and supplying the voltage to the fourth intermediate-voltage system EM4 side, and has a voltage boosting function for boosting the DC voltage of the fourth intermediate-voltage system EM4 and supplying the voltage to the second high voltage storage battery 802. The fourth intermediate-voltage current detector 424 detects the output current of the fourth DC-DC converter 84 during the step-down operation.

With present embodiment, it would be equally possible to use the output currents that are detected by the current detectors 401 to 404 and 421 to 424 in steps S10, S12, and S15 of FIG. 3, for example.

It should be noted that at least two of the intermediate-voltage systems EM1 to EM4 may be provided with redundant loads.

Modification Example of Thirteenth Embodiment

Figure 28:
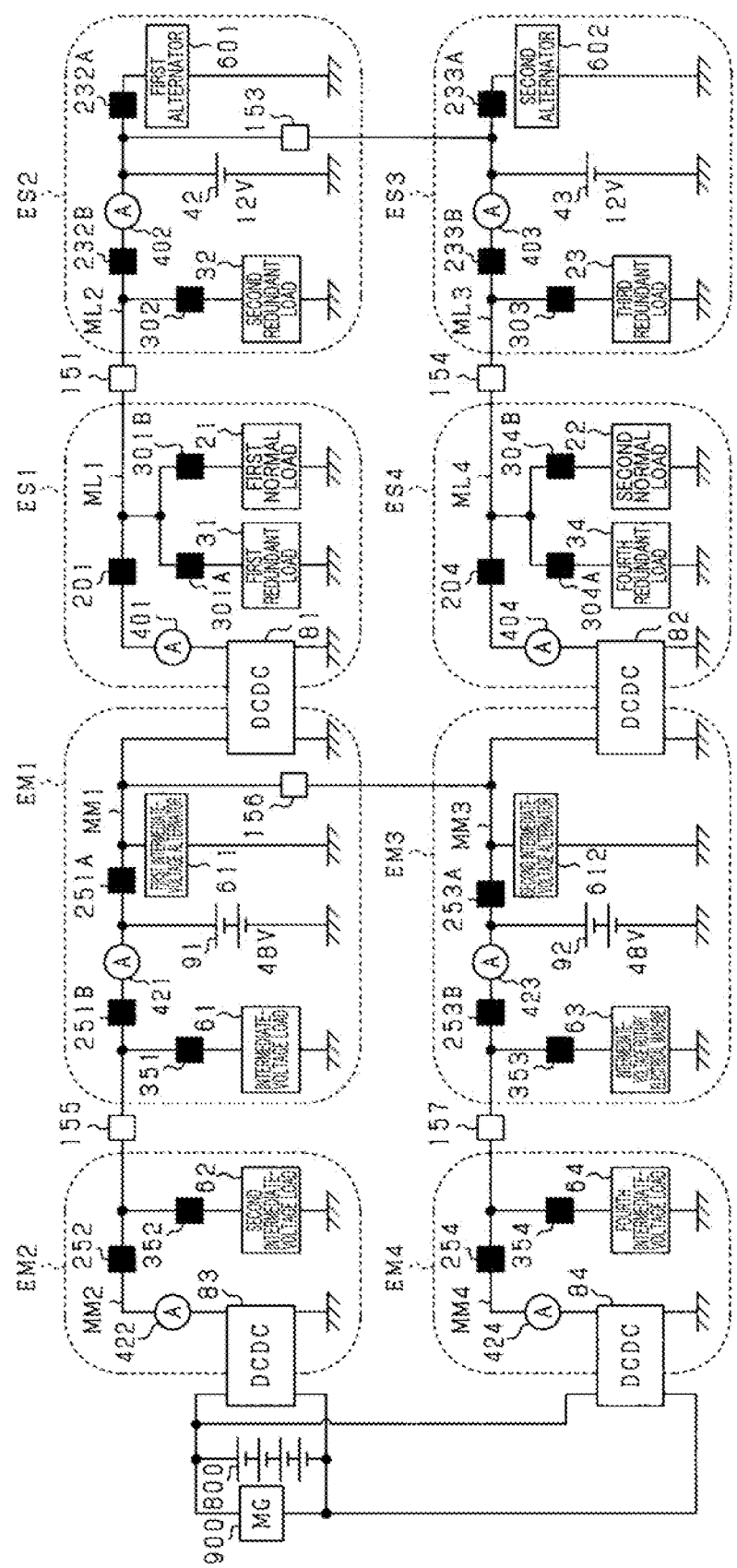
FIG. 28 is an overall configuration diagram of an in-vehicle power supply system according to a modification example of the thirteenth embodiment.

As shown in FIG. 28, the third DC-DC converter 83 and the fourth DC-DC convener 84 may be made capable of exchanging electric power with the common high voltage storage battery 800.

Fourteenth Embodiment

Figure 29:
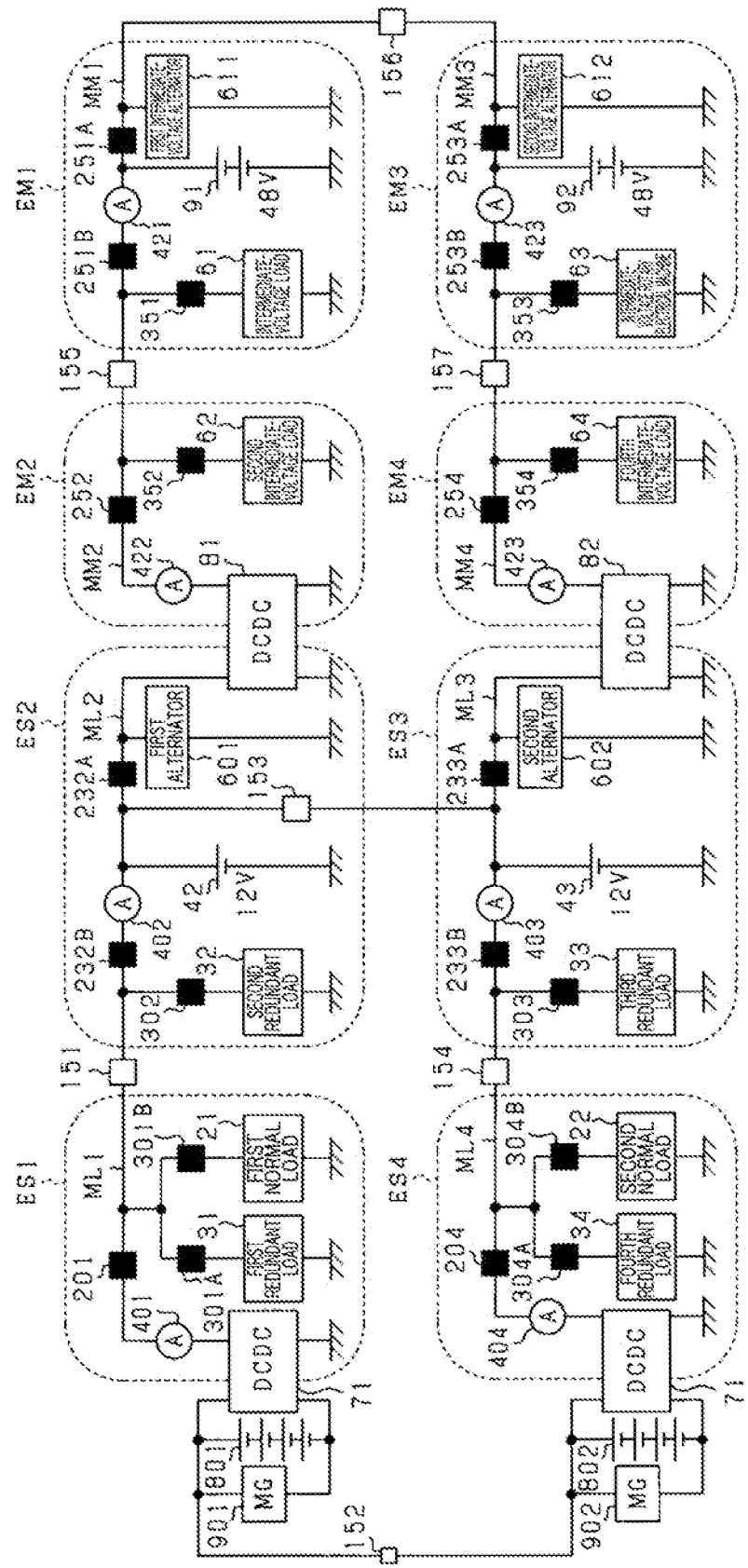
FIG. 29 is an overall configuration diagram of an in-vehicle power supply system according to a fourteenth embodiment.

A fourteenth embodiment will be described in the following referring to the drawings, with a focus on points of difference from the twelfth embodiment. With this embodiment, the configuration of a power supply system is changed as shown in FIG. 29. In FIG. 29, components which are identical to components shown in FIGS. 26, 27, etc., are designated by the same reference numerals as in FIGS. 26, 27, etc., for convenience.

The second system ES2 and the second intermediate-voltage system EM2 can exchange power via the first DC-DC converter 81. The third system ES3 and the fourth intermediate-voltage system EM4 can exchange power via the second DC-DC converter 82.

The same effects as those of the twelfth embodiment can be obtained with the present embodiment described above.

Fifteenth Embodiment

Figure 30:
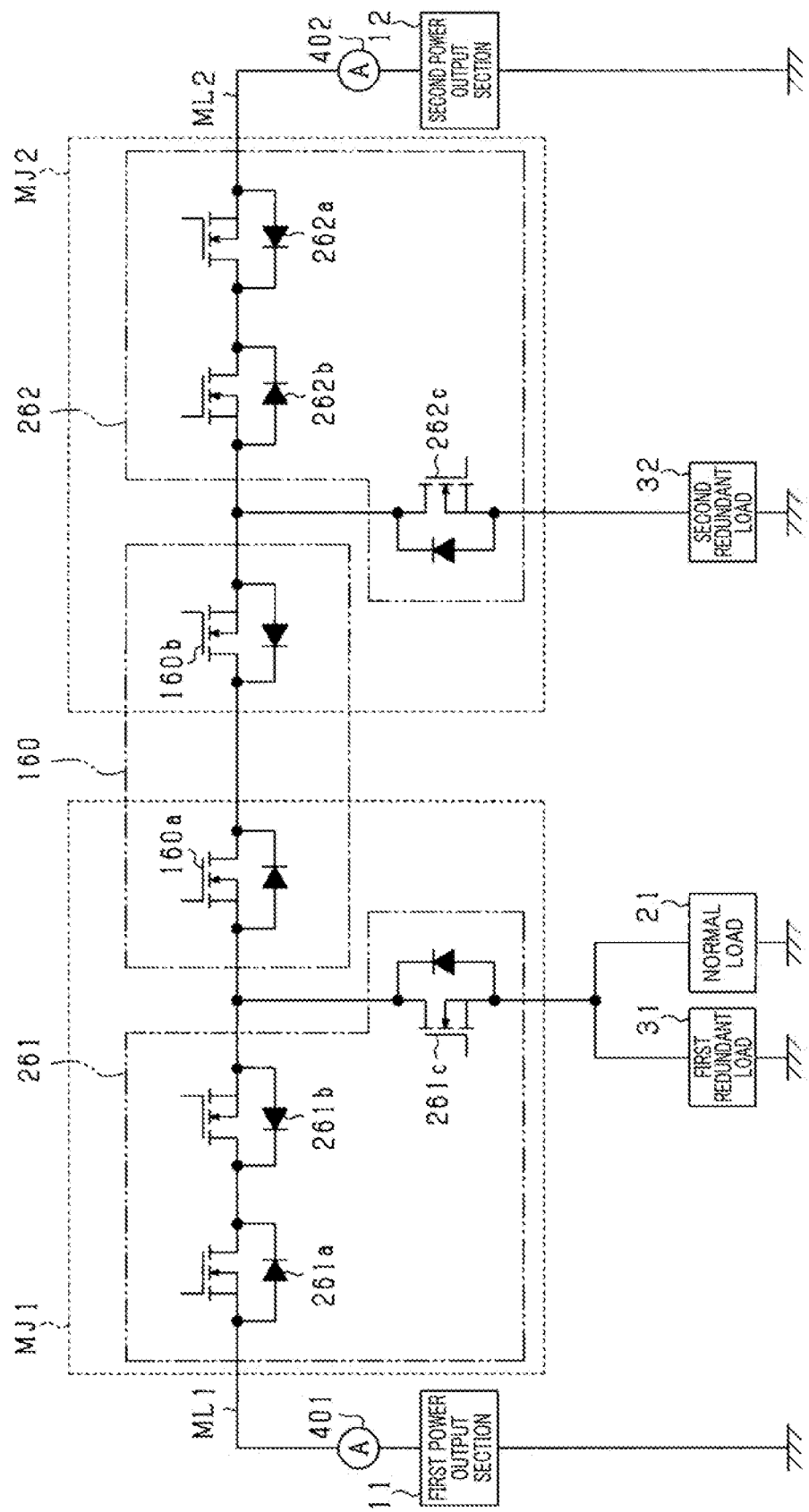
FIG. 30 is an overall configuration diagram of an in-vehicle power supply system according to a fifteenth embodiment.

A fifteenth embodiment will be described in the following referring to the drawings, with a focus on points of difference from the first embodiment. With this embodiment, the configuration of the inter-system switches and the intra-system switches is changed, as shown in FIG. 30. In FIG. 30, components which are identical to components shown in FIG. 1, etc., are designated by the same reference numerals as in FIG. 1, etc., for convenience A power supply system includes a first module MJ1 and a second module MJ2. The first module MJ1 includes first A to C switches 261a to 261c and a first intermediate switch 160a. Each of the switches 261a to 261c and 160a is an N-channel MOS FET. The drain of the first A switch 261a is connected to the drain of the first B switch 261b. The source of the first B switch 261b is connected to the drain of the first C switch 261c and to the source of the first intermediate switch 160a. The positive electrodes of the first redundant load 31 and the normal load 21 are connected to the source of the first C switch 261c. The first A switch 261a and the first B switch 261b are provided in the first path ML1.

The second module MJ2 includes second A to second C switches 262a to 262c and a second intermediate switch 160b. Each of the switches 262a to 262c and 160b is an N-channel MOS FET. The drain of the second B switch 262b is connected to the drain of the second A switch 262a. The source of the second B switch 262b is connected to the drain of the second C switch 262c and the source of the second intermediate switch 160b. The positive electrode of the second redundant load 32 is connected to the source of the second C switch 262c. The drain of the first intermediate switch 160a is connected to the drain of the second intermediate switch 160b. The second A switch 262a and the second B switch 262b are provided in the second path ML2. With the present embodiment, the configurations of the first and second modules MJ1 and MJ2 are identical.

With the present embodiment, the first intermediate switch 160a and the second intermediate switch 160b constitute an inter-system switch 160. Furthermore, the first A to first C switches 261a to 261c constitute a first module switch 261, and the first module switch 261 constitutes an intra-system switch and an individual switch of the first system ES1. Furthermore, the second A to second C switches 262a to 262c constitute a second module switch 272, and the second module switch 272 constitutes an intra-system switch and an individual switch of the second system ES2.

The first and second intermediate switches 160a and 160b constituting the inter-system switch 160 are operated in the same manner as the inter-system switch 100 in FIG. 1. Since the drains of the first and second intermediate switches 160a and 160b are connected to one another, bidirectional current flow is prevented when a switch is turned off.

The first A and B switches 261a and 261b are operated in the same manner as the first intra-system switch 201 in Fig. 1. Since the drains of the first A and B switches 261a and 261b are connected to one another, bidirectional current flow is prevented when a switch is turned off. The first C switch 261c is operated in the same manner as the first A individual switch 301A or the first B individual switch 301B in FIG. 1.

The second A and B switches 262a and 262b are operated in the same manner as the second intra-system switch 202 in FIG. 1. The second C switch 262c is operated in the same manner as the second individual switch 302 in FIG. 1.

According to the first A switch 261a, even if a ground fault occurs in the first power output section 11, overcurrent flow can be prevented by turning off the first A switch 261a. Furthermore, according to the second A switch 262a, even if a ground fault occurs in the second power output section 12, overcurrent flow can be prevented by turning off the second A switch 262a.

Sixteenth Embodiment

Figure 31:
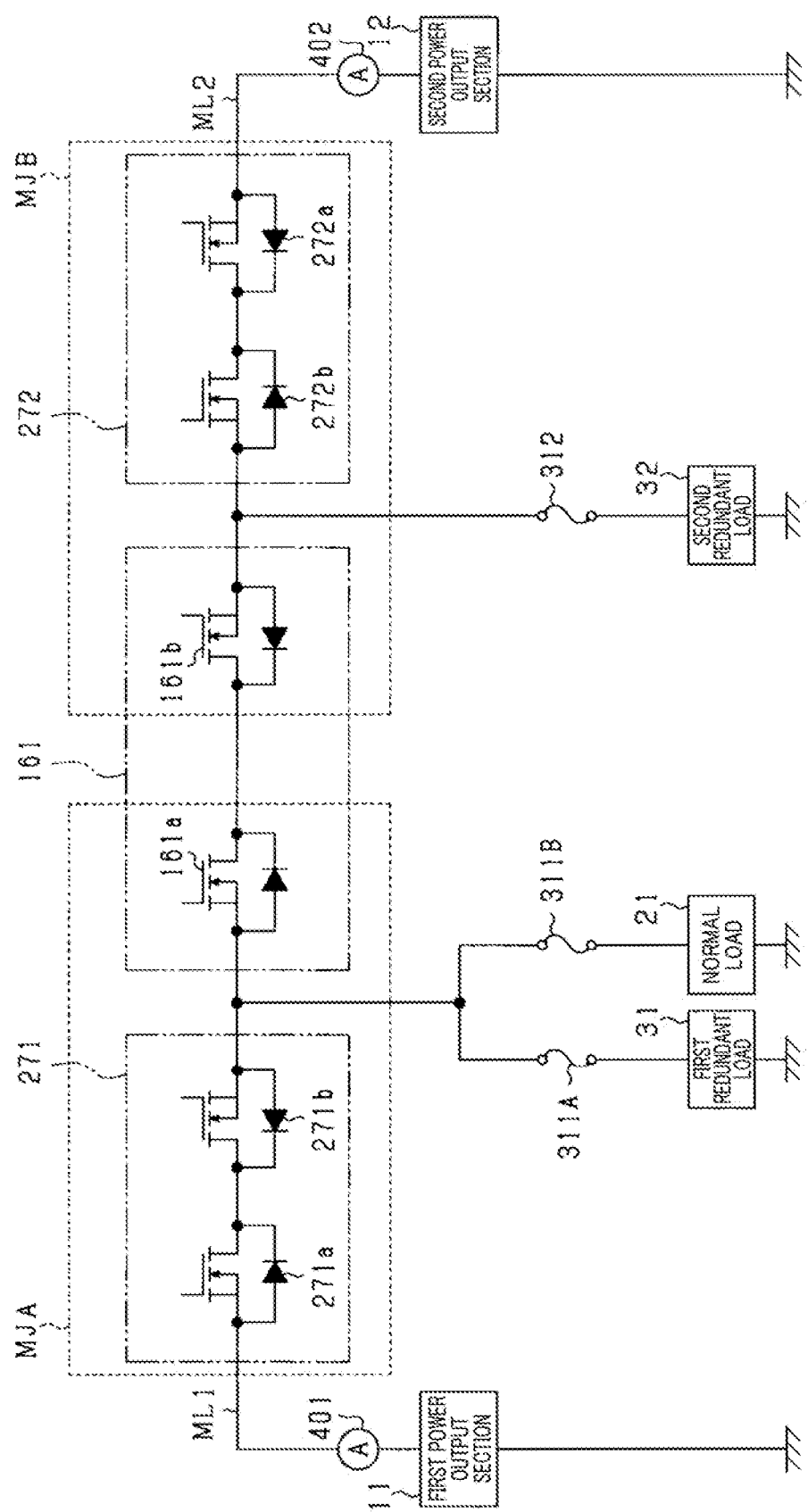
FIG. 31 is an overall configuration diagram of an in-vehicle power supply system according to a sixteenth embodiment.

A sixteenth embodiment will be described in the following referring to the drawings, with a focus on points of difference from the fifteenth embodiment. With this embodiment the configuration of the inter-system switches and the intra-system switches is changed, as shown in FIG. 31. In FIG. 31, components which are identical to components shown in FIG. 8, etc., are designated by the same reference numerals as in FIG. 8, etc., for convenience A power supply system includes a first module MJA and a second module MJB. The first module MJA includes a first A switch 271a and first B switch 271b, and a first intermediate switch 161a. Each of the switches 271a, 271b and 161a is an N-channel MOS FET. The drain of the first B switch 271b is connected to the drain of the first A switch 271a. The source of the first B switch 271b is connected to the source of the first intermediate switch 161a and to a first A fuse 311A and a first B fuse 311B. The first A switch 271a and the first B switch 271b are provided in the first path ML1.

The second module MJB includes a second A switch 272a and second B switch 272b, and a second intermediate switch 161b. Each of the switches 272a, 272b and 161b is an N-channel MOS FET. The drain of the second B switch 272b is connected to the drain of the second A switch 272a. The source of the second intermediate switch 161b and the second fuse 312 are connected to the source of the second B switch 272b. The drain of the first intermediate switch 161a is connected to the drain of the second intermediate switch 161b. The second A switch 272a and the second B switch 272b are provided in the second path ML2. The first and second modules MJA and NUB of the present embodiment have an identical configuration.

With the present embodiment, the first intermediate switch 161a and the second intermediate switch 161b constitute an inter-system switch 161. Furthermore, the first A and B switches 271a and 271b constitute a first intra-system switch 271 of the first system ES1. Moreover, the second A and B switches 272a and 272b constitute a second intra-system switch 272 of the second system ES2.

The first and second intermediate switches 161a and 161b which constitute the inter-system switch 161 are operated in the same manner as the inter-system switch 100 in FIG. 3. The first A and B switches 271a and 271b are operated in the same manner as the first intra-system switch 201 in FIG. 1. The second A and B switches 272a and 272b are operated in the same manner as the second intra-system switch 202 in FIG. 1.

Seventeenth Embodiment

Figure 32:
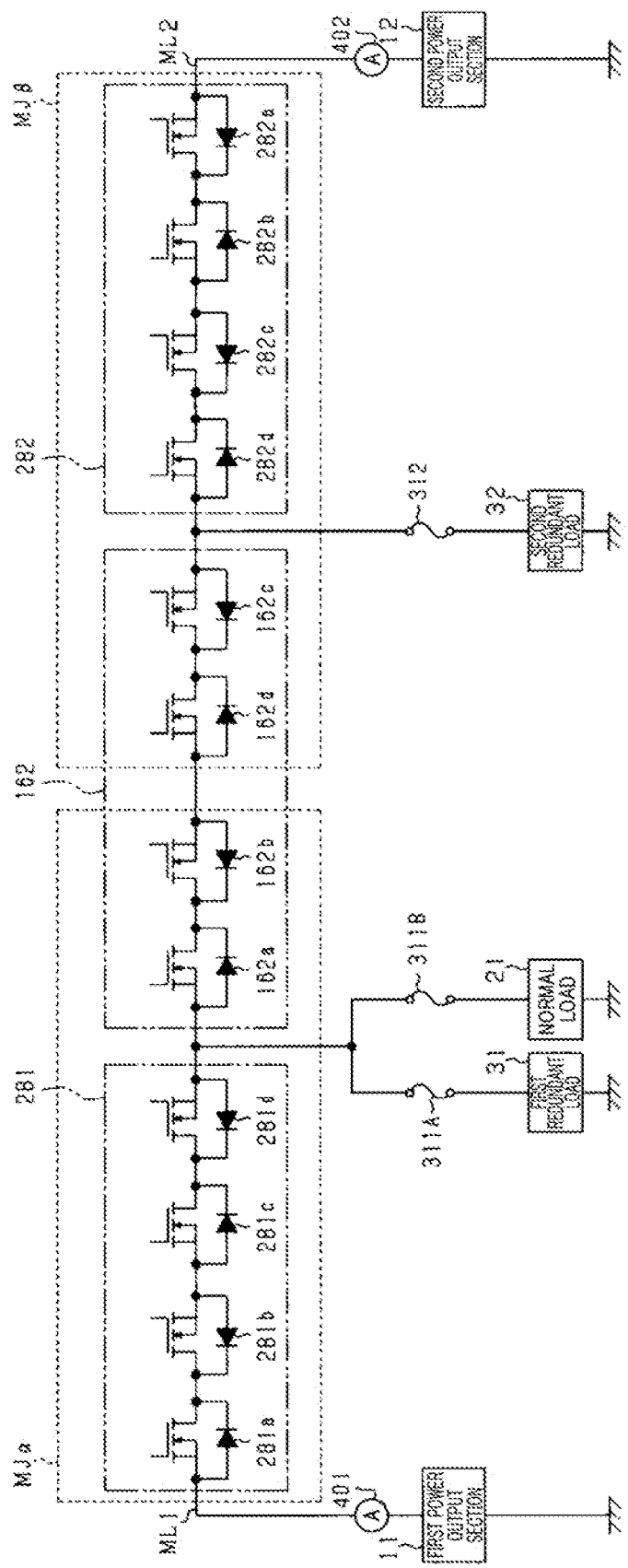
FIG. 32 is an overall configuration diagram of an in-vehicle power supply system according to a seventeenth embodiment.

A seventeenth embodiment will be described in the following referring to the drawings, with a focus on points of difference from the sixteenth embodiment. With this embodiment, the configuration of the inter-system switches and the intra-system switches is changed, as shown in FIG. 32. In FIG. 32, components which are identical to components shown in FIG. 31, etc., are designated by the same reference numerals as in FIG. 31, etc., for convenience.

A power supply system includes a first module MJα and a second module MJβ. The first module MJα includes first A to first D switches 281a to 281d, a first intermediate switch 162a and a second intermediate switch 162b. Each of the switches 281a to 281d, 162a, 162b is an N-channel MOS FET. The drains of the first A switch 281a and the first B switch 281b are connected to one another, and the drains of the first C switch 281c and the first D switch 281d are connected to one another. The source of the first C switch 281c is connected to the source of the first B switch 281b. The source of the first intermediate switch 162a and a first A fuse 311A and first B fuse 311B are connected to the source of the first D switch 281d. The first A to first D switches 281a to 281d are provided in the first path MlA.

The second module MJβ includes second A to second D switches 282a to 282d, a third intermediate switch 162c, and a fourth intermediate switch 162d. Each of the switches 282a-282d, 162c and 162d is an N-channel MOS FET. The drains of the second A switch 282a and the second B switch 282b are connected to one another, and the drains of the second C switch 282c and the second D switch 282d are connected to one another. The source of the second C switch 282c is connected to the source of the second B switch 282b. The source of the second intermediate switch 162c and a second fuse 312 are connected to the source of the second D switch 282d. The second A to second D switches 282a to 282d are provided in the second path ML2. With the present embodiment, the first and second modules MJα and MJβ have an identical configuration.

The drains of the first intermediate switch 162a and the second intermediate switch 162b are connected to one another, and the drains of the third intermediate switch 162c and the fourth intermediate switch 162d are connected to one another. The source of the fourth intermediate switch 162d is connected to the source of the second intermediate switch 162b.

With the present embodiment, the first to fourth intermediate switches 162a to 162d constitute the inter-system switch 162. The first A to first D switches 281a to 281d constitute the first intra-system switch 281 of the first system ES1. The second A to second D switches 282a to 282d constitute the second intra-system switch 282 of the second system ES2.

The first to fourth intermediate switches 162a to 162d which constitute the inter-system switch 162 are operated in the same manner as the inter-system switch 100 in FIG. 1. The first to first D switches 281a to 281d are operated in the same manner as the first intra-system switch 201 of FIG. 1. The second A to second D switches 282a to 282d are operated in the same manner as the second intra-system switch 202 in FIG. 1.

With the present embodiment described above, each of the switches 162, 281, and 282 includes two sets of N-channel MOS FETs, with the drains of the MOS FETs connected to one another. As a result, even if a short-circuit occurs in any of the N-channel MOS FETs constituting a switch, the function of preventing bidirectional current flow is maintained when the switch is turned off.

It should be noted that it would be equally possible to for each of the modules MJα and MJβ to include three sets of N-channel MOS FETs, with the sources of the MOS FETs connected to one another, instead of the N-channel MOS FET's with drains connected to one another.

Eighteenth Embodiment

Figure 33:
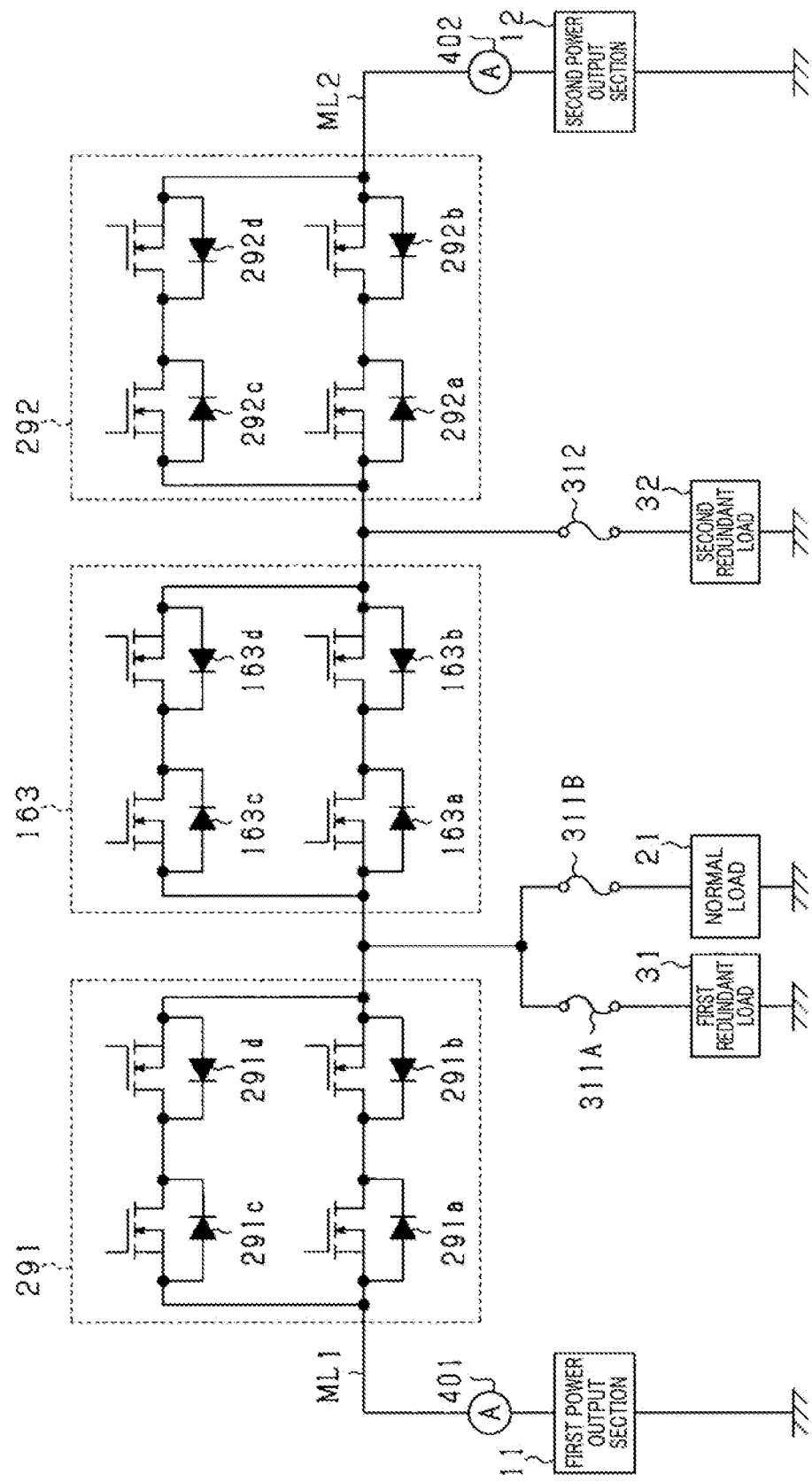
FIG. 33 is an overall configuration diagram of an in-vehicle power supply system according to an eighteenth embodiment.

An eighteenth embodiment will be described in the following referring to the drawings, with a focus on points of difference from the seventeenth embodiment. With this embodiment, the configuration of the inter-system switches and the intra-system switches is changed, as shown in FIG. 33. In FIG. 33, components which are identical to components shown in FIG. 32, etc., are designated by the same reference numerals as in FIG. 32, etc., for convenience.

A power supply system includes a first module 291, a second module 292, and an intermediate module 163. The first module 291 corresponds to an intra-system switch of the first system ES1, the second module 292 corresponds to an intra-system switch of the second system ES2, and the intermediate module 163 corresponds to an inter-system switch. With the present embodiment, the modules 291, 292, and 163 have an identical configuration.

The first module 291 includes first A to first D switches 291a to 291d. Each of the switches 291a to 291d is an N-channel MOS FET. The drains of the first A switch 291a and the first B switch 291b are connected to one another, and the drains of the first C switch 291c and the first D switch 291d are connected to one another. The series connection body formed of the first C switch 291c and the first D switch 291d is connected in parallel with the series connection body formed of the first A switch 291a and the first B switch 291b. The first A fuse 311A and the first B fuse 311B are connected to the sources of the first B and first D switches 291b and 291d. The first A to first D switches 291a to 291d are provided in the first path ML1.

The second module 292 includes second A to second D switches 292a to 292d. Each of the switches 292a to 292d is an N-channel MOS FET. The second A to second D switches 292a to 292d are provided in the second path ML2. The intermediate module 163 includes first to fourth intermediate switches 163a to 163d. Each of the switches 163a to 163d is an N-channel MOS FET. The sources of the second A and C switches 292a and 292c are connected to the sources of the second and fourth intermediate switches 163b and 163d. The sources of the first B and first D switches 291b and 291d are connected to the sources of the first and third intermediate switches 163a and 163c.

With the present embodiment, each of the modules 291, 292, and 163 is configured as a parallel connection of bodies that are each formed of N-channel MOS FETs whose drains are connected to one another. This configuration is provided in view of the case in which either of the N-channel MOS FETs constituting a switch becomes short-circuited. That is, even when a MOS FET is short-circuited, the short-circuited MOS FET will have a resistance value that is greater than the on-state resistance value of a MOS FET that has been turned on. Hence, since each module is configured as a parallel connection of a pair of bodies formed of series-connected MOS FETs, even if a short circuit failure occurs in one of the series-connected MOS FET bodies of a module, a high level of current can flow through the series-connected MOS FET body in which a short-circuit failure has not occurred. As a result, the generation of heat by MOS FETs in which a short circuit failure has occurred can be suppressed.

It should be noted that each of the modules 163, 291 and 292 may include two sets of N-channel MOS FETs whose sources are connected, instead of the N-channel MOS FETs whose drains are connected. Furthermore, in each of the modules 163, 291 and 292, three or more series-connected MOS FET bodies may be connected in parallel.

Nineteenth Embodiment

Figure 34:
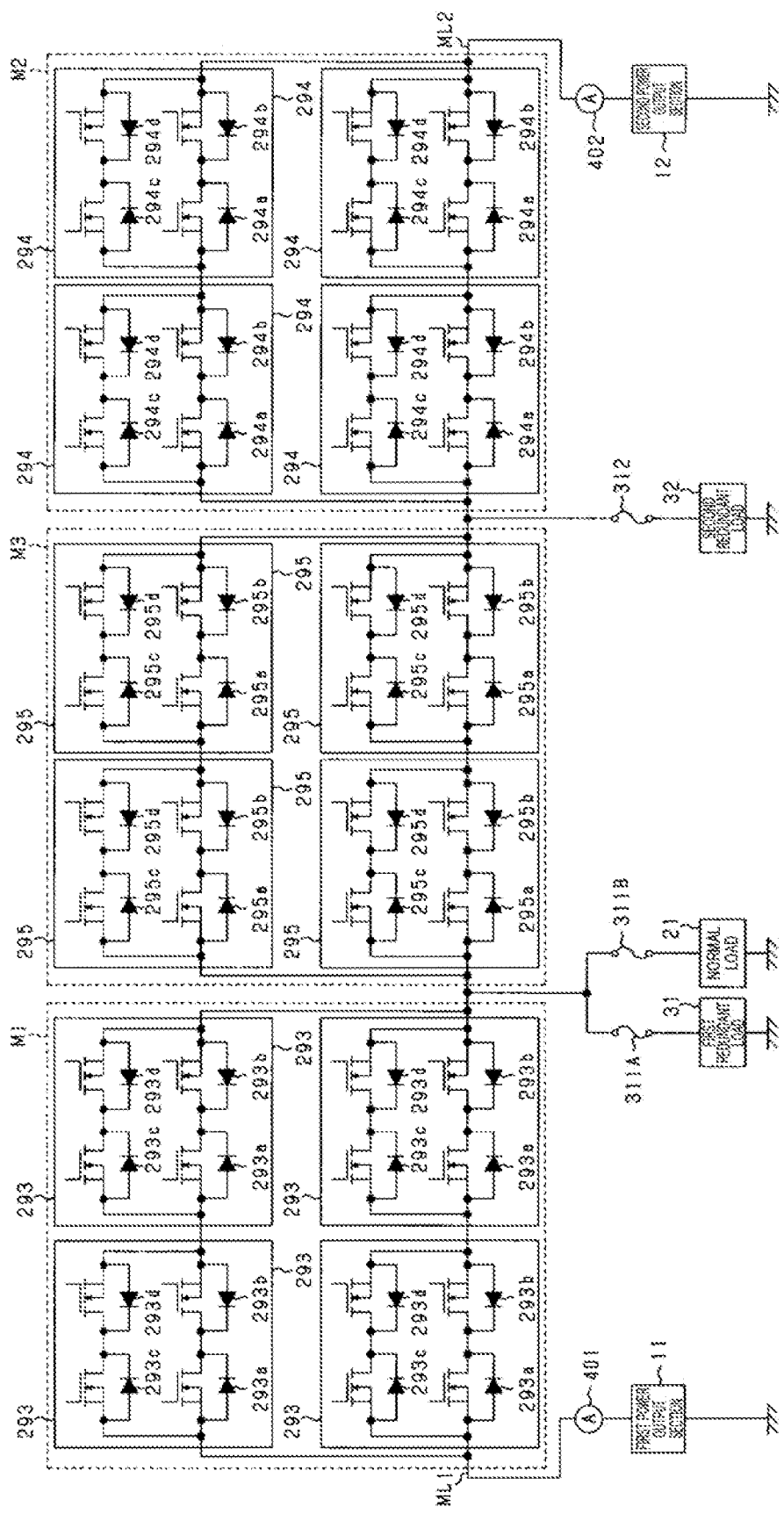
FIG. 34 is an overall configuration diagram of an in-vehicle power supply system according to a nineteenth embodiment.

A nineteenth embodiment will be described in the following referring to the drawings, with a focus on points of difference from the eighteenth embodiment. With this embodiment, the configuration of the inter-system switches and the intra-system switches is changed, as shown in FIG. 34. In FIG. 34, components which are identical to components shown in FIG. 33, etc., are designated by the same reference numerals as in FIG. 33, etc., for convenience.

A power supply system includes first to third modules M1 to M3. The first module M1 corresponds to an intra-system switch of the first system ES1, the second module M2 corresponds to an intra-system switch of the second system ES2, and the third module M3 corresponds to an inter-system switch. With the present embodiment, the modules M1 to M3 have an identical configuration.

The first module M1 includes four first element groups 293. The first module M1 is configured by connecting series connection bodies, each formed of two first element groups 293, in parallel with one another. The second module M2 includes four second element groups 294, and the third module M3 includes four third element groups 295.

With the present embodiment, each of the element groups 293 to 295 has a configuration in which, as for the modules 291, 292, and 163 shown in FIG. 33, two N-channel MOS FET series connection bodies are connected in parallel. As a result, each of the first to third modules M1 to M3 includes 16 MOS FETs. The same effects as those of the seventeenth and eighteenth embodiments can be obtained with this embodiment.

Twentieth Embodiment

Figure 35:
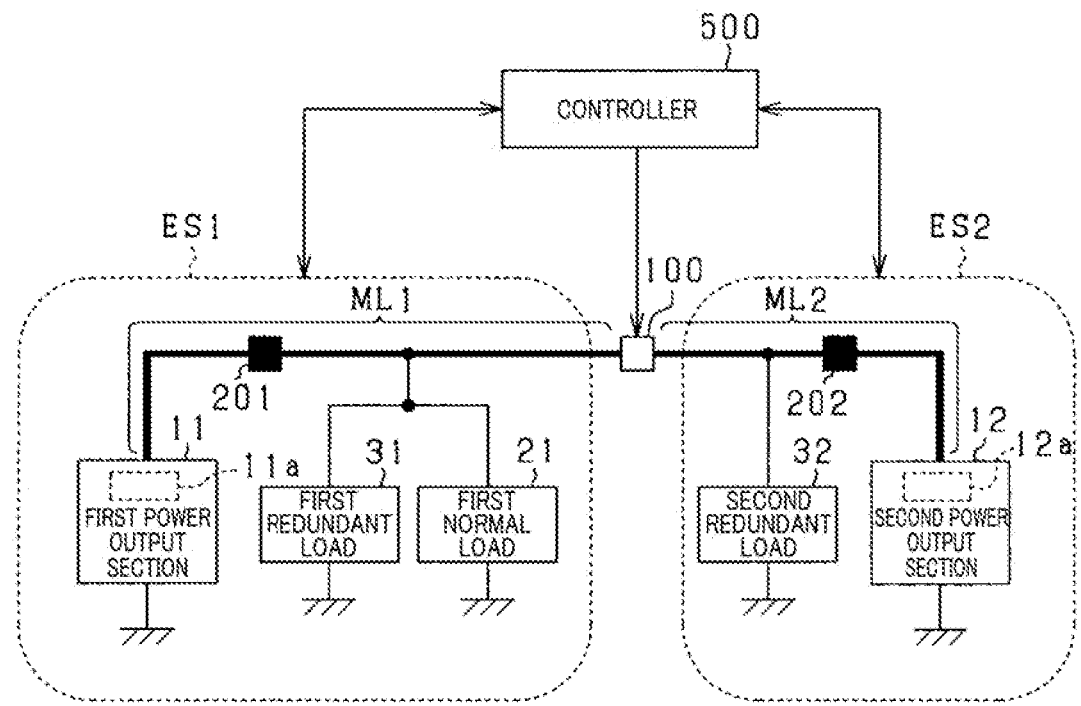
FIG. 35 is an overall configuration diagram of an in-vehicle power supply system according to a twentieth embodiment.

A twentieth embodiment will be described in the following referring to the drawings, with a focus on points of difference from the first embodiment. With the present embodiment, as shown in FIG. 35, the first A individual switch 301A, the first B individual switch 301B, and the second individual switch 302 of the configuration shown in FIG. 1 are omitted. As a result, the first redundant load 31 and the normal load 21 are connected to the first path ML1 without using individual switches, and the second redundant load 32 is connected to the second path ML2 without using an individual switch. In FIG. 35, components which are identical to components shown in FIG. 1 are designated by the same reference numerals as in FIG. 1, for convenience.

Figure 36:
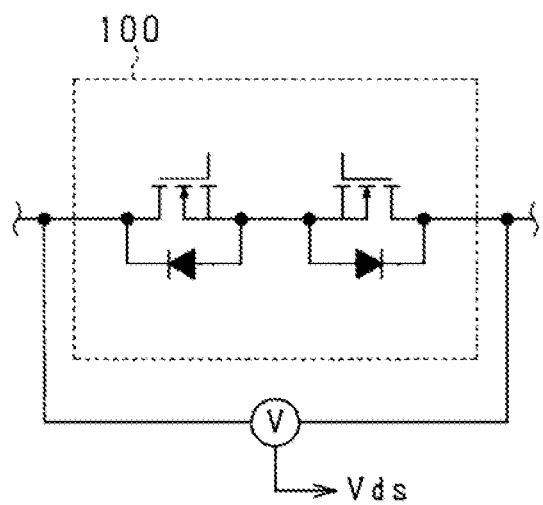
FIG. 36 is a diagram illustrating a function for detecting switch current.

A power supply system does not include the first current detector 401 or the second current detector 402. With the present embodiment, the inter-system switch 100, the first intra-system switch 201, and the second intra-system switch 202 constitute a current detector. As a result, it becomes unnecessary to provide a current sensor or a shunt resistor, etc. The inter-system switch 100 will be described as an example. As shown in FIG. 36, the inter-system switch 100 consists of two N-channel MOS FETs whose sources are connected together. The voltage Vds between the terminals of the inter-system switch 100 is detected by the controller 500. The controller 500 detects the magnitude and direction of the current flowing through the inter-system switch 100 based on the detected inter-terminal voltage Vds.

Figure 37:
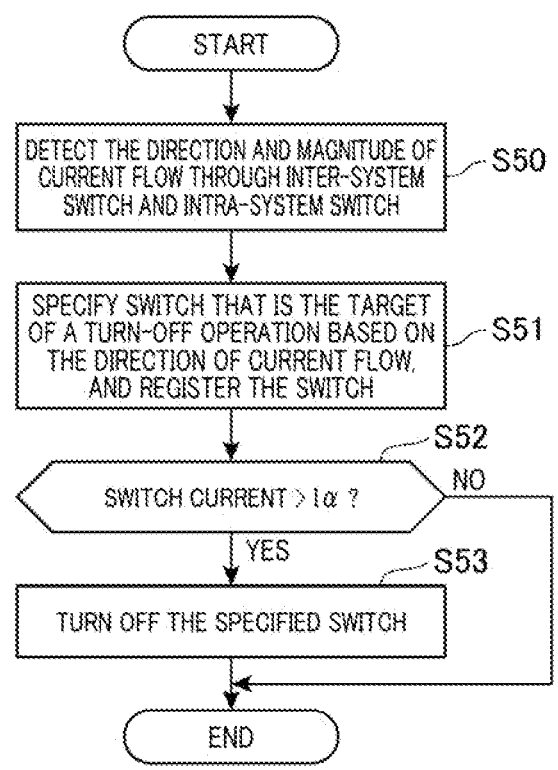
FIG. 37 is a flowchart showing an operating procedure that is executed when an abnormality occurs.

FIG. 37 describes operation processing that is executed when an abnormality occurs with the present embodiment. This processing is executed by the controller 500.

In step S50, the flow direction and magnitude of the respective currents flowing through each of the inter-system switch 100, the first intra-system switch 201 and the second intra-system switch 202 are detected, by the detection method described above. With the present embodiment, the processing of step S50 corresponds to a direction detection section.

In step S51, a switch that is to be turned off is specified, from among the inter-system switch 100, the first intra-system switch 201 and the second intra-system switch 202, based on the detected directions of current flow through the inter-system switch 100, the first intra-system switch 201 and the second intra-system switch 202. The processing of step S51 corresponds to a switch group specifying section and a target switch specifying section. This specifying method will be described in the following referring to FIGS. 38 and 39.

Figures 38, 39:
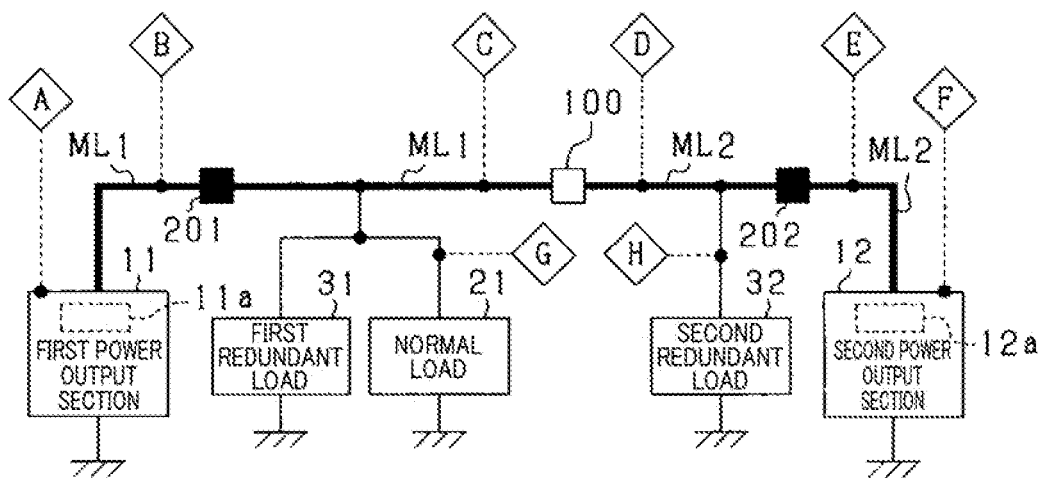
FIG. 38 is a diagram illustrating an example of a ground fault occurrence location.
FIG. 39 is a diagram showing the relationship between the location of occurrence of a ground fault, the flow directions and magnitudes of the currents that flow through the switches, and the switch that is specified as the target of a turn-off operation.

A to H shown in FIG. 38 are examples of ground fault occurrence locations. A is the first power output section 11, B is a part of the first path ML1 that is between the first intra-system switch 201 and the first power output section 11, and C is a part of the first path ML1 that is between the first intra-system switch 201 and the inter-system switch 100. D is a part of the second path ML2 that is the between the inter-system switch 100 and the second intra-system switch 202, and F is a part of the second path ML2 that is the between the second intra-system switch 202 and the second power output section. 12, and F is the second power output section 12. G is an electrical path that connects the first path ML1 to the positive electrodes of the normal load 21 and the first redundant load 31, and connects the normal load 21 to the first redundant load 31. H is an electrical path that connects the second path ML2 to the positive electrode of the redundant load 32, or the redundant load 32.

FIG. 39 shows the relationship between the location where a ground fault occurs, the directions and magnitudes of current flow through the inter-system switch 100, the first intra-system switch 201 and the second intra-system switch 202, and the switch that is specified to be turned off in step S51.

If no ground fault has occurred in the power supply system, as shown in row (a) of FIG. 39, none of the inter-system switch 100, the first intra-system switch 201 or the second intra-system switch 202 is specified to be turned off. In row of (a) of FIG. 39, as an example, the directions of current flow through all of the inter-system switch 100, the first intra-system switch 201, and the second intra-system switch 202 are from the first power output section 11 to the second power output section 12.

When the ground fault occurrence location is A or B, then as shown in the row (b) of FIG. 39, it is judged that all of the current flow directions of the inter-system switch 100, the first intra-system switch 201 and the second intra-system switch 202 are identical. In that case, among the inter-system switch 100, the first intra-system switch 201, and the second intra-system switch 202, the first intra-system switch 201 (corresponding to the target switch), which is the switch that is the most downstream with respect to the current flow direction, is specified to be turned off.

When the ground fault occurrence location is C or G as shown in row (c) of FIG. 39, the first intra-system switch 201 and the inter-system switch 100 (corresponding to a switch group), which are a group of the switches that are adjacent to one another among the inter-system switch 100, the first intra-system switch 201 and the second intra-system switch 202, and whose detected current flow directions are opposite to one another, are specified as the targets for turn-off operation.

When a ground fault occurs, a high level of current flows from the power output sections 11 and 12 toward the ground fault occurrence location. Hence, among the inter-system switch 100 and the intra-system switches 201 and 202, the directions of current flow through the switches in the group that are disposed in the first and second paths ML1 and ML2, adjacent to the ground fault occurrence location, become opposite to one another. As a result, it is possible to specify the ground fault occurrence location, by specifying such a switch group.

When the ground fault occurrence location is D or H, as shown in row (d) of FIG. 39, then the inter-system switch 100 and the second intra-system switch 202 (corresponding to a switch group) are specified as the turn-off operation targets, these being the switches which are adjacent among the inter-system switch 100, the first intra-system switch 201 and the second intra-system switch 202, and whose directions of current flow are opposite to one another.

When the ground fault occurrence location is E or F, then as shown in row (e) of FIG. 39, it is judged that the directions of current flow in the inter-system switch 100, the first intra-system switch 201 and the second intra-system switch 202 are each identical. In that case, the second intra-system switch 202 (corresponding to the target switch) is specified as the turn-off operation target, that switch being the one which is the most downstream, with respect to the current flow direction, among the inter-system switch 100, the first intra-system switch 201 and the second intra-system switch 202.

The switch specified in step S51 is registered in a storage device such as a memory, provided in the controller 500.

Returning to the description of FIG. 37, in step S52, if a plurality of switches are specified in step S51, then a decision is made as to whether the current flowing in at least one of these switches exceeds a threshold value of current Iα. With the present embodiment, a decision is made as to whether the current flowing through all of the plurality of switches specified in step S51 exceeds the threshold value of current Iα. The processing of step S52 serves to judge whether a ground fault has occurred. The threshold value of current Iα is set, for example, as the maximum value that can be attained for the output current if no ground fault has occurred in the power supply system.

Furthermore, if a single switch is specified in step S51, then a decision is made in step S52 as to whether the level of current flowing through that switch exceeds the threshold value of current Iα.

If a negative decision is made in step S52, the inter-system switch 100, the first intra-system switch 201, and the second intra-system switch 202 are maintained turned on.

On the other hand, if an affirmative decision is made in step S52, the processing proceeds to step S53, and the switch specified in step S53 is turned off. The processing of step S53 corresponds to a changeover operation section. A specific example of the processing of step S53 will be described in the following.

When the ground fault occurrence location is A or B, the first intra-system switch 201 is turned off. In that way, the first electric power output section 11, and the part of the first path ML1 between the first electric power output section 11 and the first intra-system switch 201 can be disconnected from the power supply system.

When the ground fault occurrence location is C or G, the first intra-system switch 201 and the inter-system switch 100 are turned off. In that way, the first path ML1, the normal load 21, the first redundant load 31, and the first power output section 11 can be disconnected from the power supply system.

When the ground fault occurrence location is D or H, the inter-system switch 100 and the second intra-system switch 202 are turned off. In that way, the part of the second path ML2 that is between the inter-system switch 100 and the second intra-system switch 202, and the second redundant load 32, can be disconnected from the power supply system.

When the ground fault occurrence location is E or F, the second intra-system switch 202 is turned off. In that way, the part of the second path ML2 between the second electric power output section 12 and the second intra-system switch 202, and the second electric power output section 12 can be disconnected from the power supply system.

Twenty-First Embodiment

Figure 40:
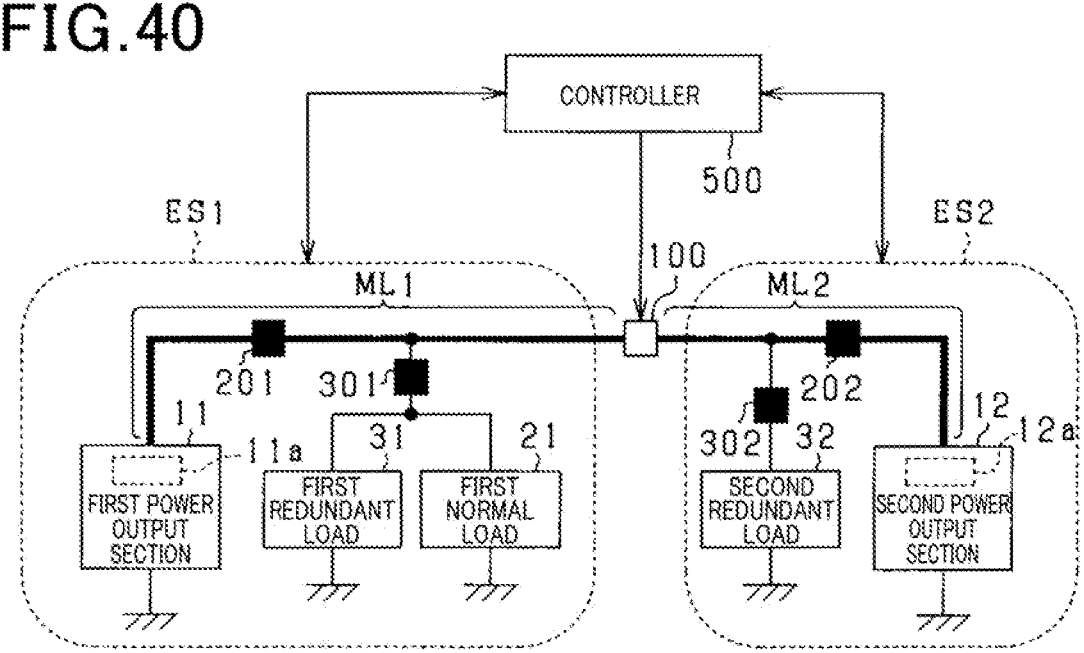
FIG. 40 is an overall configuration diagram of an in-vehicle power supply system according to a twenty-first embodiment.

A twenty-first embodiment will be described in the following referring to the drawings, with a focus on points of difference from the twentieth embodiment. With the present embodiment, as shown in FIG. 40, a first individual switch 301 and a second individual switch 302 are provided. The first individual switch 301 is disposed in the electrical path that connects the respective positive electrodes of the normal load 21 and the first redundant load 31 to the first path ML1. The first individual switch 301 and the second individual switch 302 are operated by the controller 500. The first individual switch 301 and the second individual switch 302 may for example be formed of individual N-channel MOS FETs, as with the switches indicated by reference numerals 261c and 262c in FIG. 30 above. In FIG. 40, components which are identical to components shown in FIG. 35 above are designated by the same reference numerals as in FIG. 35, for convenience.

Figure 41:
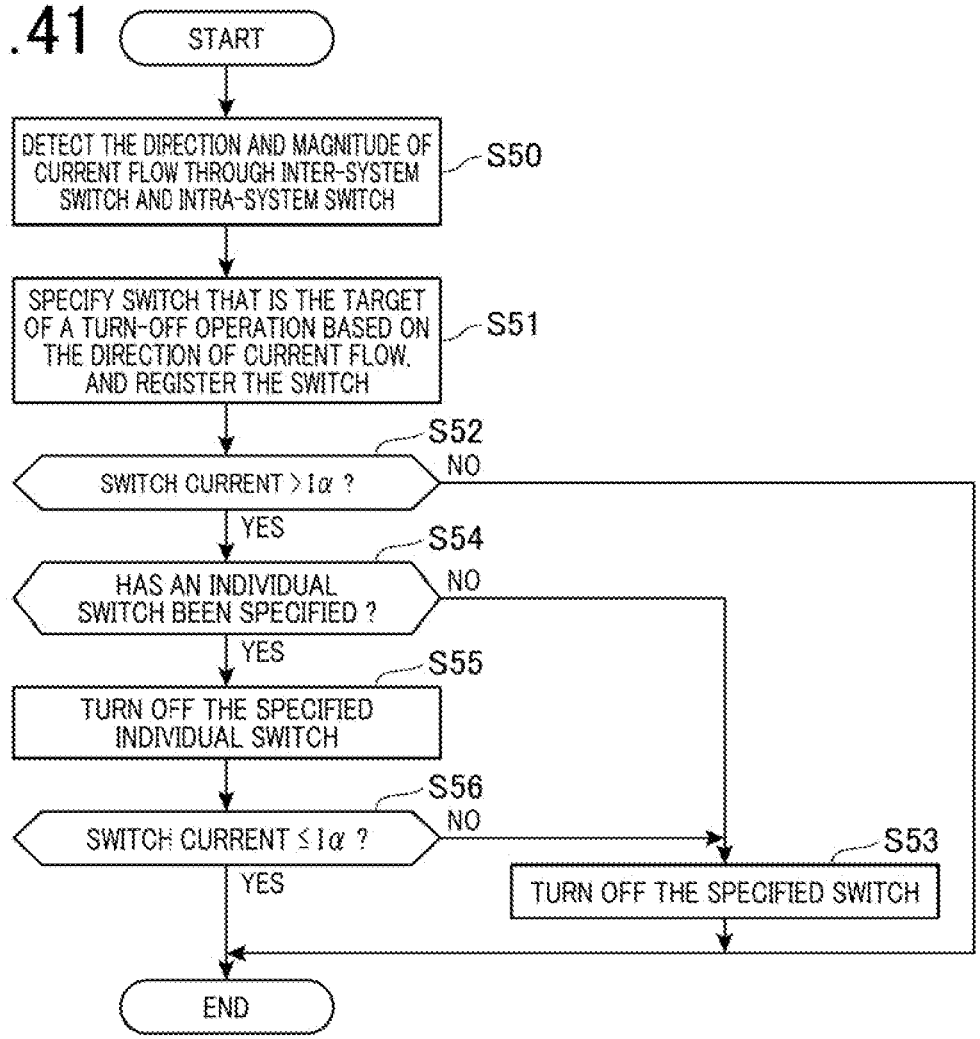
FIG. 41 is a flowchart showing an operating procedure that is executed when an abnormality occurs.

FIG. 41 describes the operation processing executed when an abnormality occurs with the present embodiment. This processing is executed by the controller 500. In FIG. 41, components which are identical to components shown in FIG. 37 above are designated by the same reference numerals as in FIG. 37, for convenience.

In step S51, a switch that is to be turned off is specified, from among the inter-system switch 100, the first intra-system switch 201, and the second intra-system switch 202, based on the detected directions of current flow in the inter-system switch 100, the first intra-system switch 201, and the second intra-system switch 202. The processing of step S51 corresponds to an individual switch specifying section. This specifying method is described in the following referring to FIGS. 42 and 43. The ground fault occurrence locations shown in FIG. 42, which are different from the ground fault occurrence locations shown in FIG. 38 above, consist of G, H, C, and D, where: G is a path that is part of the electrical paths that connect the positive electrodes of the normal load 21 and the first redundant load 31 to the first path ML1, and is between the normal load 21 and the first redundant load 31 and the first individual switch 301, or is the normal load 21, or the first redundant load 31; H is a part of the electrical path that connects the second path ML2 to the positive electrode of the second redundant load 32 and is between the second redundant load 32 and the second individual switch 302, or is the second redundant load 32; C is the part of the first path ML1 that is sandwiched between the first intra-system switch 201 and the inter-system switch 100, or is the part of the electrical path which connects the positive electrodes of the normal load 21 and the first redundant load 31 to the first path ML1 and is between the first path ML1 and the first individual switch 301; and D is the part of the second path ML2 that is sandwiched between the inter-system switch 100 and the second intra-system switch 202, or is the part of the electrical path that connects the second path ML2 to the positive electrode of the second redundant load 32 and is between the second path ML2 and the individual switch 302.

Figures 42, 43:
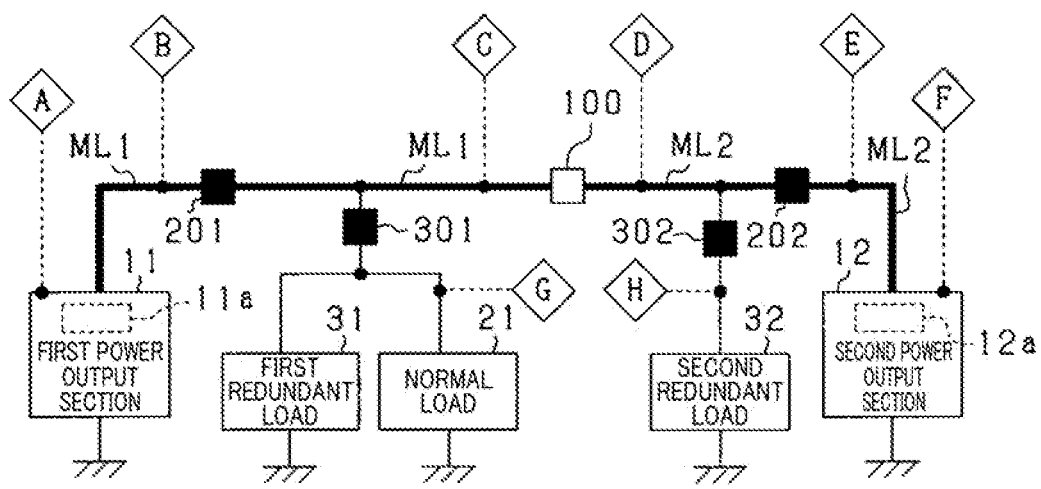
FIG. 42 is a diagram illustrating an example of a ground fault occurrence location.
FIG. 43 is a diagram showing the relationship between the location of occurrence of a ground fault, the flow directions and magnitudes of the currents that flow through the switches, and the switch that is specified as the target of a turn-off operation.

When the ground fault occurrence location is C or G, then in addition to the first intra-system switch 201 and the inter-system switch 100, the first individual switch 301 is specified as a target to be turned off, as shown in row (c) of FIG. 43. The first individual switch 301 is connected to a part of the first and second paths ML1 and ML2 sandwiched between the first intra-system switch 201 and the inter-system switch 100.

When the ground fault occurrence location is D or H, then as shown in row (d) of FIG. 43, in addition to the inter-system switch 100 and the second intra-system switch 202, the second individual switch 302 is specified as a turn-off operation target.

Returning to the description of FIG. 41, if an affirmative decision is made in step S52, the processing proceeds to step S54. In step S54, a decision is made as to whether an individual switch is included in the switches specified in step S51. If a negative decision is made in step S54, it is judged that no individual switch is specified as a turn-off operation target, and the processing proceeds to step S53. In step S53, all of the switches specified in step S51 are turned off.

On the other hand, if it is judged in step S54 that the first individual switch 301 or the second individual switch 302 has been specified as a turn-off operation target, the processing proceeds to step S55. In step S55, the individual switch specified in step S51 is turned off.

In step S56, a decision is made as to whether all of the currents flowing through the inter-system switch 100, the first intra-system switch 201, and the second intra-system switch 202 are equal to or less than the threshold value of current Iα. If a negative decision is made in step S56, the processing proceeds to step S53.

If an affirmative decision is made in step S56, then of all the switches specified in step S51, only the individual switches turned off in step S55 are maintained in the off state.

With the present embodiment described above, even when a ground fault occurs in a power supply system, it is made possible to determine the part of the power supply system which is unusable due to the ground fault, as closely as possible.

Twenty-Second Embodiment

Figure 44:
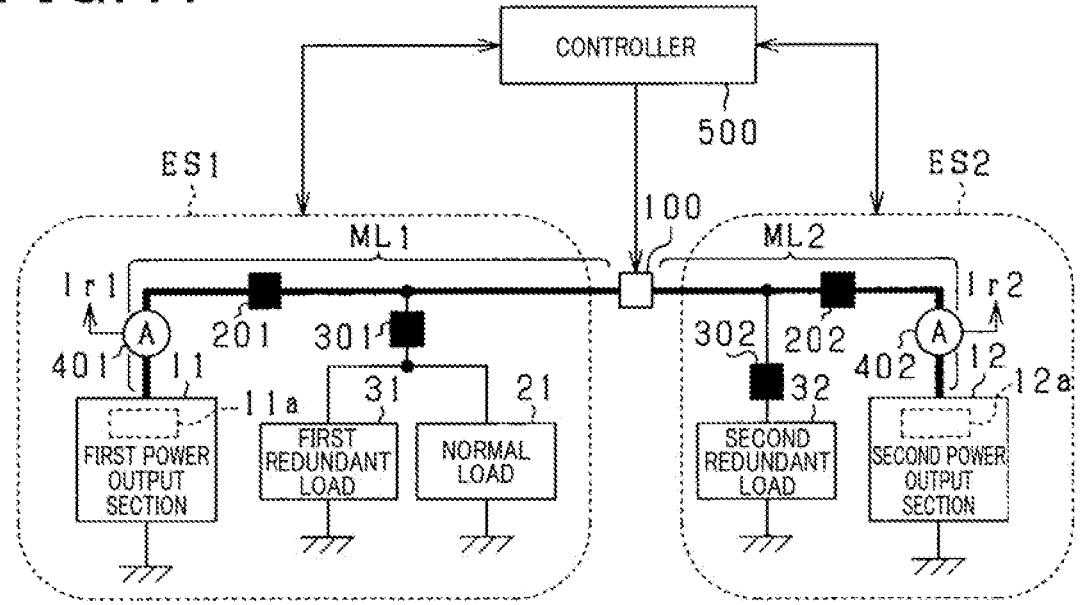
FIG. 44 is an overall configuration diagram of an in-vehicle power supply system according to a twenty-second embodiment.

A twenty-second embodiment will be described in the following referring to the drawings, with a focus on points of difference from the twenty-first embodiment. With the present embodiment as shown in FIG. 44, a first current detector 401 and second current detector 402 are provided, having the configuration shown in FIG. 40 above. In FIG. 44, configuration parts which are identical to parts shown in FIG. 40 and FIG. 1 above are designated by the same reference numerals as in FIG. 40 and FIG. 1, for convenience.

Figure 45:
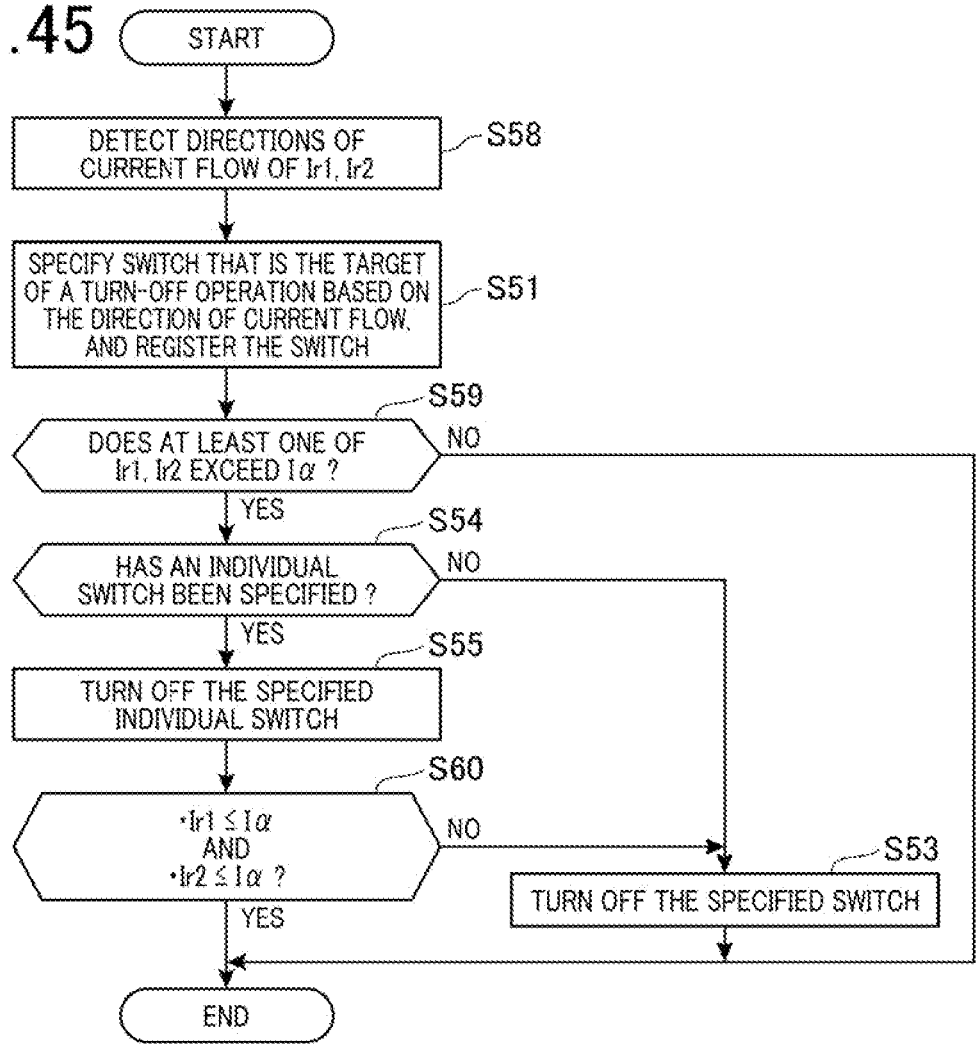
FIG. 45 is a flowchart showing an operating procedure that is executed when an abnormality occurs.

FIG. 45 is a diagram for describing operation processing that is executed when an abnormality occurs with the present embodiment. This processing is executed by the controller 500. In FIG. 45, processing steps which are identical to these shown in FIG. 41 are above are designated by the same reference numerals as in FIG. 41, for convenience.

In step S58, the first output current Ir1 and the second output current Ir2 are detected. Furthermore, in step S58, the respective directions of current flow in the inter-system switch 100, the first intra-system switch 201 and the second intra-system switch 202 are detected. The inter-system switch 100 will be described as an example. With the present embodiment, the current flow direction of the inter-system switch 100 is detected based on the magnitude relationship between the voltages at each of the ends of the inter-system switch 100. For example, if the voltage at the end of the inter-system switch 100 that is on the side of the first path MIA is higher than the voltage at the end of the inter-system switch 100 which is on the side of the second path ML2, then it is judged that the direction of current flow in the inter-system switch 100 has changed to a direction oriented from the first path ML1 side toward the second path ML2 side. When the processing of step S58 is completed, the processing proceeds to step S51.

After step S51 is completed, in step S59, a decision is made as to whether at least one of the first output current Ir1 and the second output current Ir2 detected in step S58 exceeds the threshold value of current Iα. With the present embodiment a decision is made as to whether both the first output current Ir1 and the second output current Ir2 exceed the threshold value of current Iα.

If a negative decision is made in step S59, the turned-on state of the inter-system switch 100, the first intra-system switch 201, and the second intra-system switch 202 is maintained. On the other hand, if an affirmative decision is made in step S59, the processing proceeds to step S54.

After step S60 is completed, the processing proceeds to step S60. In step S60, a decision is made as to whether both the condition that the first output current Ir1 is equal to or smaller than the threshold value of current Iα and also the condition that the second output current Ir2 is equal to or smaller than the threshold value of current Iα are satisfied. If a negative decision is made in step S60, the processing proceeds to step S53.

With the present embodiment described above, the same effects as those of the twenty-second embodiment can be obtained.

Twenty-Third Embodiment

A twenty-third embodiment will be described in the following referring to the drawings, with a focus on points of difference from the twenty-first embodiment. With the present embodiment, the first current detector 401 and the second current detector 402 are omitted from the configuration shown in FIG. 1 above.

The controller 500 detects the respective magnitudes of current flow and directions of current flow in the inter-system switch 100, the first intra-system switch 201, the second intra-system switch 202, the first A individual switch 301A, the first B individual switch 301B, and the second individual switch 302, based on the detected inter-terminal voltage Vds.

Figures 46, 47:
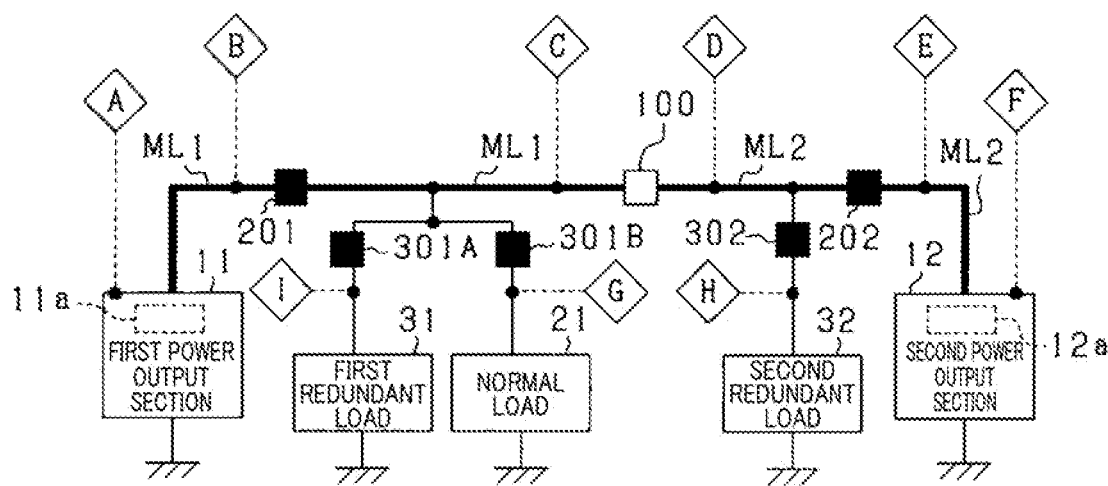
FIG. 46 is a diagram illustrating an example of a ground fault occurrence location according to a twenty-third embodiment.
FIG. 47 is a diagram showing a relationship between the location of occurrence of a ground fault, the flow directions and magnitudes of the currents that flow through the switches, and the switch that is specified as the target of a turn-off operation.

FIG. 46 shows ground fault occurrence locations for this embodiment. The ground fault occurrence locations shown in FIG. 46 that are different from those in FIG. 42 above are as follows. G is an electrical path connecting the first B individual switch 301B and the positive electrode of the normal load 21, or is the normal load 21. I is an electrical path connecting the first A individual switch 301A and the positive electrode of the first redundant load 31, or is the first redundant load 31. C is a part of the first path ML1 that is sandwiched between the first intra-system switch 201 and the inter-system switch 100, or is an electrical path connecting the first A individual switch 301A and the first B individual switch 301B to the first path ML1.

The operation processing executed with this embodiment when an abnormality occurs will be described in the following. The controller 500 specifies a plurality of individual switches which are connected to the parts of the first and second paths ML1 and ML2 that are enclosed by the switch group specified in step S51 of FIG. 41. If the controller 500 makes positive decisions in steps S52 and S54 of FIG. 41, then in step S55, those of the specified plurality of individual switches for which the level of current flow exceeds the threshold value of current Iα are turned off, while maintaining the intra-system switches that were specified in step S51, and the inter-system switch 100, in the turned-on state.

Specifically, if the controller 500 specified the inter-system switch 100 and the first intra-system switch 201 as turn-off operation targets in step S51, then the first A individual switch 301A and the first B individual switch 301B, which are connected to the part of the first path ML1 that is sandwiched between the inter-system switch 100 and the first intra-system switch 201, are specified. If the controller 500 subsequently makes an affirmative decision in steps S52 and S54, then in step S55 the controller 500 turns off the one of the first A individual switch 301A and first B individual switch 301B for which the current flow exceeds the threshold value of current Iα. This processing serves to accurately specify the location where a ground fault occurs. The method of specifying will be described in the following referring to FIG. 47. In FIG. 47, "HIGH" indicates that the level of current flow exceeds the threshold value of current Iα, and "LOW" indicates that the level of current flow is equal to or less than the threshold value of current Iα.

When the ground fault occurrence location is C, G, or I, the inter-system switch 100 and the first intra-system switch 201 are specified as the turn-off operation targets. When the ground fault occurrence location is I, then if the respective levels of current flowing in the inter-system switch 100 as shown in row (b) of FIG. 47, the first intra-system switch 201, and the first A individual switch 301A exceed the threshold value of current Iα, the controller 500 judges that the level of current flow through the first B individual switch 301B is equal to or less than the threshold value of current Iα. In that case, in step S51, of the first A individual switch 301A and the first B individual switch 301B, only the first A individual switch 301A is turned off.

When the ground fault occurrence location is G, then as shown in row (c) of FIG. 47, if the respective levels of current flow through the inter-system switch 100, the first intra-system switch 201, and the first B individual switch 301B exceed the threshold value of current Iα, the controller 500 judges that the level of current flowing through the first A individual switch 301A is equal to or less than the threshold value of current Iα. In that case, of the first A individual switch 301A and the first B individual switch 301B, only the first B individual switch 301B is turned off in step S51.

When the ground fault occurrence location is C, then as shown in the row (a) of FIG. 47, if the respective levels of current flow through the through the inter-system switch 100 and the first intra-system switch 201 exceed the threshold value of current Iα, the controller 50) judges that the respective levels of current flow through the first A individual switch 301A and the first B individual switch 301B are equal to or less than the threshold value of current Iα. In that case, the first A individual switch 301A and the first B individual switch 301B are turned off in step S51. It should be noted that it is not essential for the first A individual switch 301A and the first B individual switch 301B to be turned off, and these may be maintained in the turned-on state.

If an affirmative decision is subsequently made in step S56, then of all the switches that have been specified in step S51, only the individual switches that were turned off in step S55 are maintained in the turned-on state.

With the present embodiment described above, a ground fault occurrence location can be reliably disconnected from the power supply system, even with a configuration in which each electrical load is connected to a main path via a dedicated individual switch.

Twenty-Fourth Embodiment

Figure 48:
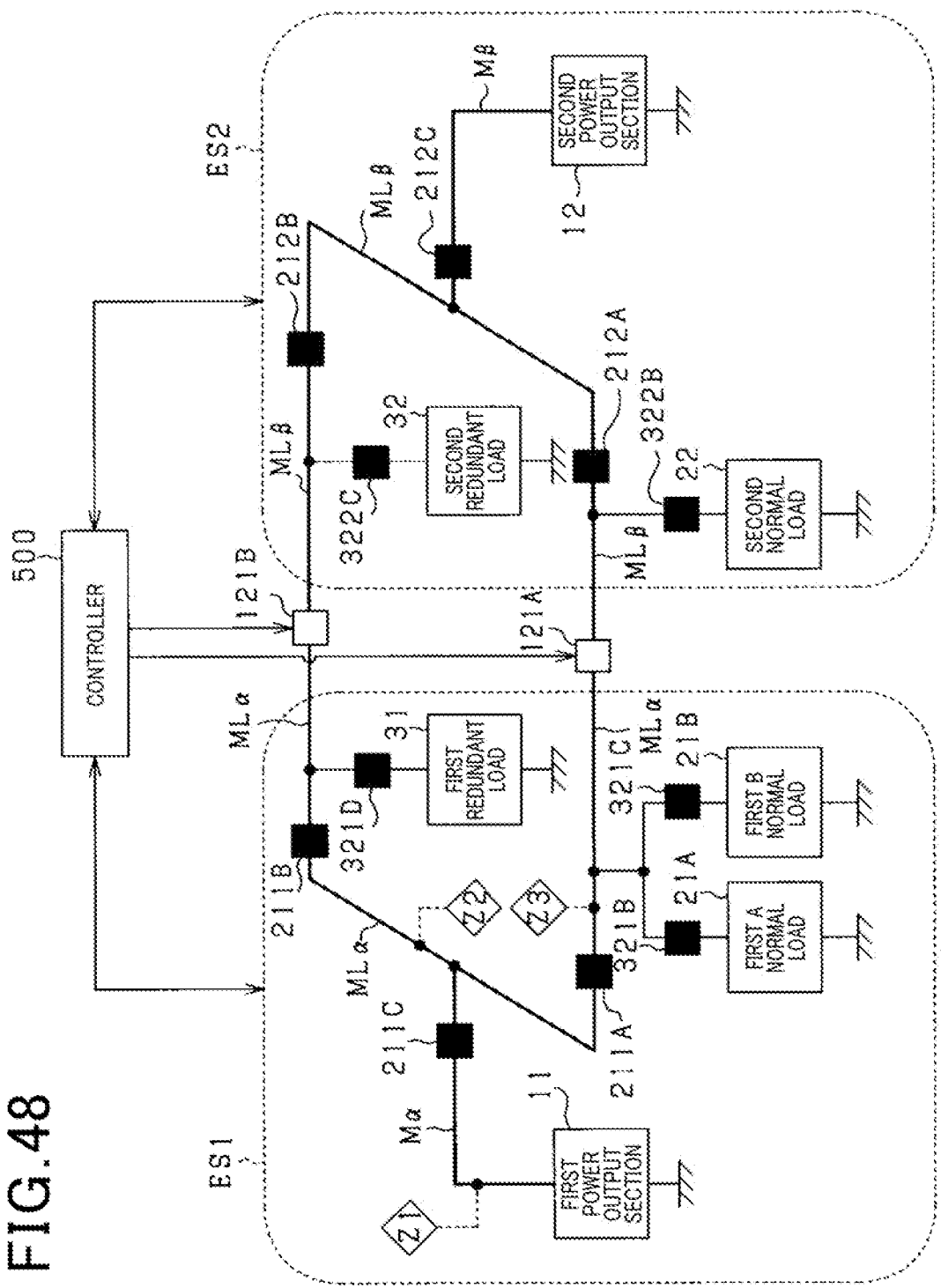
FIG. 48 is an overall configuration diagram of an in-vehicle power supply system according to a twenty-fourth embodiment.

A twenty-fourth embodiment will be described in the following referring to the drawings, with a focus on points of difference from the twenty-first to twenty-third embodiments. With the present embodiment, the configuration shown in FIG. 48 is used for a power supply system. In FIG. 48, configuration parts which are identical to parts shown in FIG. 16 are designated by the same reference numerals as in FIG. 16, for convenience.

With the present embodiment, the second inter-system switch 122 in FIG. 16 is designated as a first inter-system switch 121A and the first inter-system switch 121 in FIG. 16 is designated as a second inter-system switch 121B. Furthermore, the path that connects the positive electrode of the first power output section 11 to the part of the first path MLα which is enclosed between the first A intra-system switch 211A and the first B intra-system switch 211B is designated as the first power supply path Ma. In addition, the path that connects the positive electrode of the second power output section 12 to the part of the second path MLβ which is enclosed between the second A system switch 212A and the second B system switch 212B is designated as the second power supply path Mβ.

The first power supply path Ma is provided with a first C intra-system switch 211C, and the second power supply path Mβ is provided with a second C intra-system switch 212C. The first C intra-system switch 211C and the second C intra-system switch 212C are operated by the controller 500.

Furthermore, with the present embodiment also, a ground fault occurrence location can be disconnected from the power supply system by operation processing executed when an abnormality occurs, as described for the twentieth to twenty-third embodiments. In FIG. 48, Z1 to Z3 show examples of ground fault occurrence locations. Z1 is a part of the first power supply path Ma that is sandwiched between the first power supply intra-system switch 211C and the positive electrode of the first power output section 11. Z2 is a part of the first power supply path MLα that is sandwiched between the first A intra-system switch 211A and the first B intra-system switch 211B. Z3 is a part of the first power supply path MLα that is sandwiched between the first inter-system switch 121A and the first A intra-system switch 211A.

FIG. 49 shows the relationship between the ground fault occurrence locations Z1 to Z3, the respective directions and magnitudes of current flow through the switches 211C, 211A, 211B, 121A, 121B, 212A, 212B, and 212C, and the inter-system switches and intra-system switches that are specified as turn-off targets in step S51 of FIG. 41.

When the ground fault occurrence location is Z1, as shown in row (a) of FIG. 49, it is judged that the directions of current flow in the respective switches 211C, 211A, 211B, 121A, 121B, 212A, 212B, 212C are each identical. In that case, the first C intra-system switch 211C (corresponding to the target switch), which is the switch that is the most downstream among the switches 211C, 211A, 211B, 121A, 121B, 212A, 212B, and 212C, with respect to the current flow direction, is specified as the turn-off target switch. Row (a) of FIG. 49 shows the case in which the levels of current flowing through each of the switches 211C, 211A, 211B, 121A, 121B, 212A, 212B, and 212C exceed the threshold value of current Iα.

When the ground fault occurrence location is Z2, then as shown in row (b) of FIG. 49, it is judged that the direction of current flow through the first C intra-system switch 211C is opposite the direction of current flow through each of the other switches 211A, 211B, 121A, 121B, 212A, 212B, 212C. In addition, it is judged that the levels of current flow exceed the threshold value of current Iα in each of the switches 211C and 211A, 211B, which have been judged to have opposite directions of current flow. In that case the first C intra-system switch 211C, and the first A intra-system switch 211A and first B intra-system switch 211B, which have opposite direction of current flow and for which the detected levels of current flow exceed the threshold value of current Iα, are specified as turn-off operation targets (with the first C system switch 211C, first A system switch 211A and first B system switch 211B corresponding to a switch group).

When the ground fault occurrence location is Z3, as shown in row (c) of FIG. 49, it is judged that the direction of current flow through the first C intra-system switch 211C and the first A intra-system switch 211A is opposite the direction of current flow through the first inter-system switch 121A, the second A intra-system switch 212A and the second C intra-system switch 212C. Furthermore, it is judged that the levels of current in each of the switches 211A and 121A, for which it has been judged that the respective directions of current flow are opposite one another, exceeds the threshold value of current Iα. In that case, the first intra-system switch 211A and the first intra-system switch 121A (corresponding to a switch group) in which the detected directions of current flow are opposite to one another and in which the level of current flow exceeds the threshold value of current Iα, are specified as turn-off operation targets.

When the ground fault occurrence location is Z3, then as shown in row (d) in FIG. 49, unlike row (c) in FIG. 49, current may flow through the first B intra-system switch 211B, the second inter-system switch 121B and the second B intra-system switch 212B. Row (c) in FIG. 49 shows an example in which the current flow directions through the second inter-system switch 121B and the second B intra-system switch 212B are opposite one another. In that case, the second inter-system switch 121B and the second B intra-system switch 212B are specified as turn-off operation targets. With the present embodiment, of a group of switches whose directions of current flow have been judged to be opposite one another, only the switches for which it is judged that the direction of current flow exceeds the threshold value of current Iα are targeted for turn-off operation. As a result, it is possible to prevent switches from being erroneously specified as turn-off operation targets.

It should be noted that with the present embodiment, the abnormality occurrence operation processing described for the twenty-first and twenty-third embodiments may be applied when there is an individual switch connected to a part of a main path which is sandwiched between an inter-system switch and an intra-system switch.

With the present embodiment described above, it is possible to accurately specify a switch as a turn-off operation target, in a configuration whereby the main paths are formed in a ring.

Twenty-Fifth Embodiment

Figure 50:
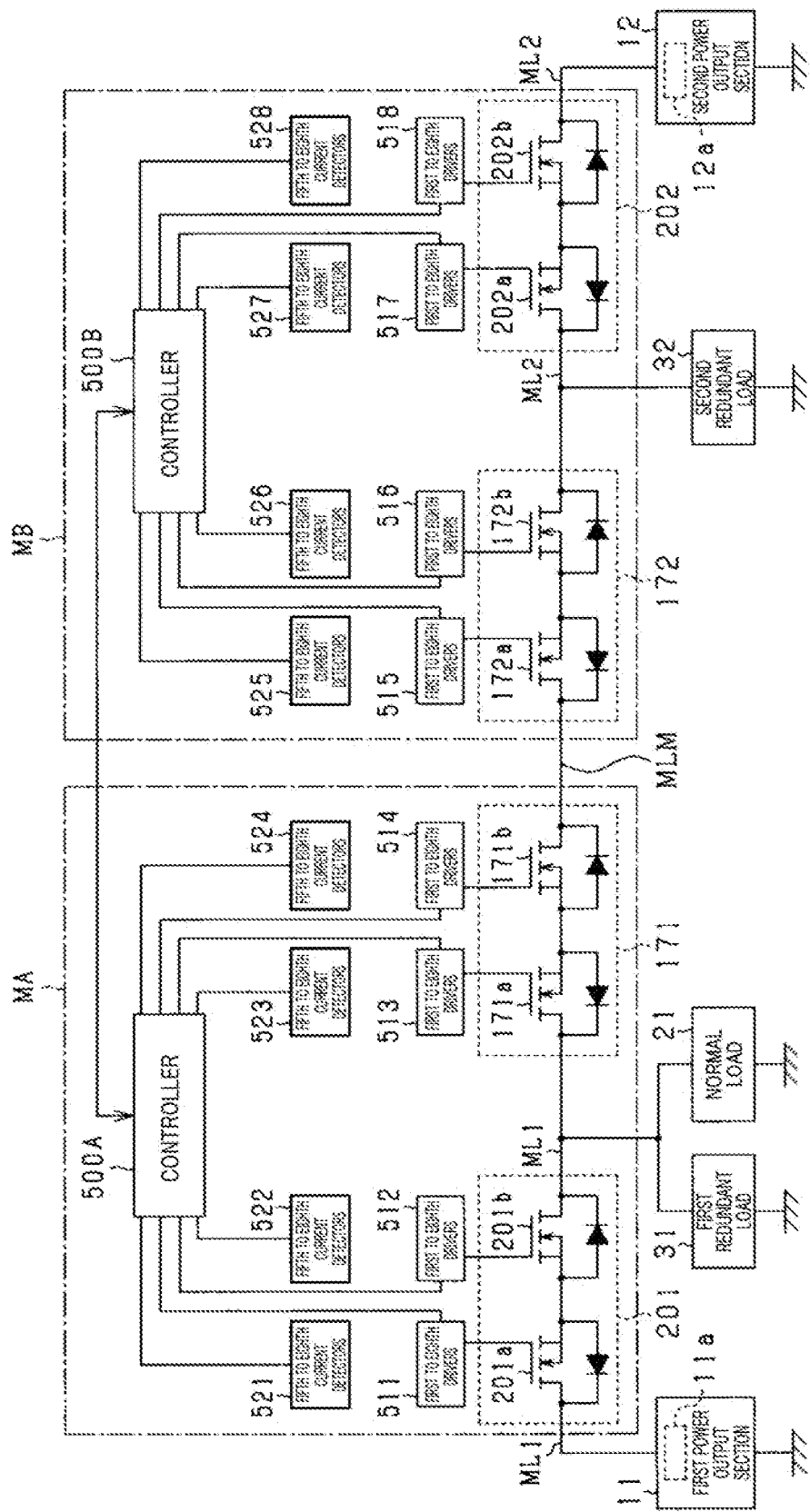
FIG. 50 is an overall configuration diagram of an in-vehicle power supply system according to a twenty-fifth embodiment.

A twenty-fifth embodiment will be described in the following referring to the drawings, with a focus on points of difference from the twenty-first embodiment. With the present embodiment, a power supply system has the configuration shown in FIG. 50. In FIG. 50, components that are identical to components shown in FIG. 35 are designated by the same reference numerals as in FIG. 35, for convenience.

The power supply system includes a first module MA and a second module MB. The first module MA includes a first intra-system switch 201, a first inter-system switch 171 and a first controller 500A. The second module MB includes a second intra-system switch 202, a second inter-system switch 172, and a second controller 500B. The first module MA corresponds to the first system ES1, and the second module MB corresponds to the second system ES2.

The first intra-system switch 201 includes a first A intra-system switch 201a and a first B intra-system switch 201b. The first A intra-system switch 201a and the first B intra-system switch 201b are N-channel MOS FETs. The first power output section 11 is connected to the drain of the first A intra-system switch 201a via the first path ML1. The source of the first B intra-system switch 201b is connected to the source of the first A intra-system switch 201a.

The first inter-system switch 171 includes a first A inter-system switch 171a and a first B inter-system switch 171b. The first A inter-system switch 171a and the first B inter-system switch 171b are N-channel MOS FETs. The drain of the first A intra-system switch 171a is connected to the drain of the first B intra-system switch 201b via the first path ML1.

The second intra-system switch 202 includes a second A intra-system switch 202a and a second B intra-system switch 202b. The second A intra-system switch 202a and the second B intra-system switch 202b are N-channel MOS FETs. The second power output section 12 is connected to the drain of the second B intra-system switch 202b via the second path ML2.

The second inter-system switch 172 includes a second A inter-system switch 172a and a second B inter-system switch 172b. The second A inter-system switch 172a and the second B inter-system switch 172b are N-channel MOS FETs. The drain of the second B inter-system switch 172b is connected to the source of the second A intra-system switch 202a via the second path ML2. The drain of the second A inter-system switch 172a is connected to the drain of the first B inter-system switch 171b via a central path MLM, which is provided as a main path of the power supply system.

The first module MA includes first to fourth drivers 511 to 514 and first to fourth current detectors 521 to 524. The first driver 511 operates the first A intra-system switch 201a in response to commands received from the first controller 500A. The second driver 512 operates the first B intra-system switch 201b in response to commands received from the first controller 500A. The third driver 513 operates the first A inter-system switch 171a in response to commands received from the first controller 500A. The fourth driver 514 operates the first B intra-system switch 171b in response to commands received from the first controller 500A.

The first current detector 521 detects the current flowing through the first A intra-system switch 201a. The second current detector 522 detects the current flowing through the first B intra-system switch 201b. The third current detector 523 detects the current flowing through the first A inter-system switch 171a. The fourth current detector 524 detects the current flowing through the first B inter-system switch 171b. Each of the current detectors 521 to 524 may, for example, detect the current flow information for the switch that is its detection object by detecting the inter-terminal voltage Vds of the switch, as described for the twentieth embodiment.

The detection values of the first to fourth current detectors 521 to 524 are inputted to the first controller 500A. The first controller 500A detects the magnitude of each of the currents flowing through the switches 201a, 201b, 171a, 171b, and the flow direction of each current, based on the detection values from the current detectors 521 to 524.

The second module MB includes fifth to eighth drivers 515 to 518 and fifth to eighth current detectors 525 to 528. The fifth driver 515 operates the second inter-system switch 172a in response to commands received from the second controller 500B. The sixth driver 516 operates the second B inter-system switch 172b in response to commands received from the second controller 500B. The seventh driver 517 operates the second A intra-system switch 202a in response to commands received from the second controller 500B. The eighth driver 518 operates the second B intra-system switch 202b in response to commands received from the second controller 500B.

The fifth current detector 525 detects the current flowing through the second A inter-system switch 172a. The sixth current detector 526 detects the current flowing through the second B inter-system switch 172b. The seventh current detector 527 detects the current flowing through the second A intra-system switch 202a. The eighth current detector 528 detects the current flowing through the second B intra-system switch 202b. Each of the current detectors 525 to 528 may, for example, detect the current flow information for the switch that is its detection object by detecting the inter-terminal voltage Vds of the switch, as described for the twentieth embodiment.

The detection values from the fifth to eighth current detectors 525 to 528 are inputted to the second controller 500B. The second controller 500B detects the magnitude of each of the currents flowing through the switches 202a, 202b, 172a, 172b, and the direction of flow of the current, based on the detection values from the current detectors 525 to 528.

The first controller 500A and the second controller 500B can exchange information with one another. With the present embodiment, the abnormality occurrence operation processing that has been described for the twentieth embodiment can be performed by cooperation between the first controller 500A and the second controller 500B. For example, if the ground fault occurrence location is G, shown in FIG. 38 above, the first intra-system switch 201 and the first inter-system switch 171 are specified in step S51 of FIG. 37. This specifying can be performed by the first controller 500A alone. On the other hand, for example when the ground fault occurrence location is the central path MLM, the first inter-system switch 171 and the second inter-system switch 172 are specified in step S51 of FIG. 37. This specifying can be performed by cooperation between the first controller 500A and the second controller 500B.

With the present embodiment, a power supply system is provided that includes first and second modules MA and MB, in each of which a plurality of switches, current detectors, and a controller are modularized. As a result, processing for specifying ground fault locations, and operation of the switches built into each module, can be completed within the module concerned as far as possible. As a result, when a ground fault occurs, delays in processing executed by the controllers 500A and 500B, such as processing for operating switches that have become targets of turn-off operation, can be suppressed. Hence it is possible to suppress a delay between the occurrence of a ground fault and the disconnection of the ground fault occurrence location from the power supply system.

Modification Examples of Twenty-Fifth Embodiment

Instead of a configuration in which the first controller 500A and the second controller 500B are capable of exchanging information with one another, the power supply system may include a controller that is at a higher level than the first controller 500A and the second controller 500B. In that case, the high-level controller becomes the main body for executing operation processing when an abnormality occurs.

The configuration described for the twenty-fifth embodiment is equally applicable to the twenty-first to twenty-fourth embodiments.

The number of switches constituting the inter-system switch and the intra-system switch is not limited to two, and may be from four to sixteen switches as shown in FIGS. 32 to 34 for example.

Figure 51:
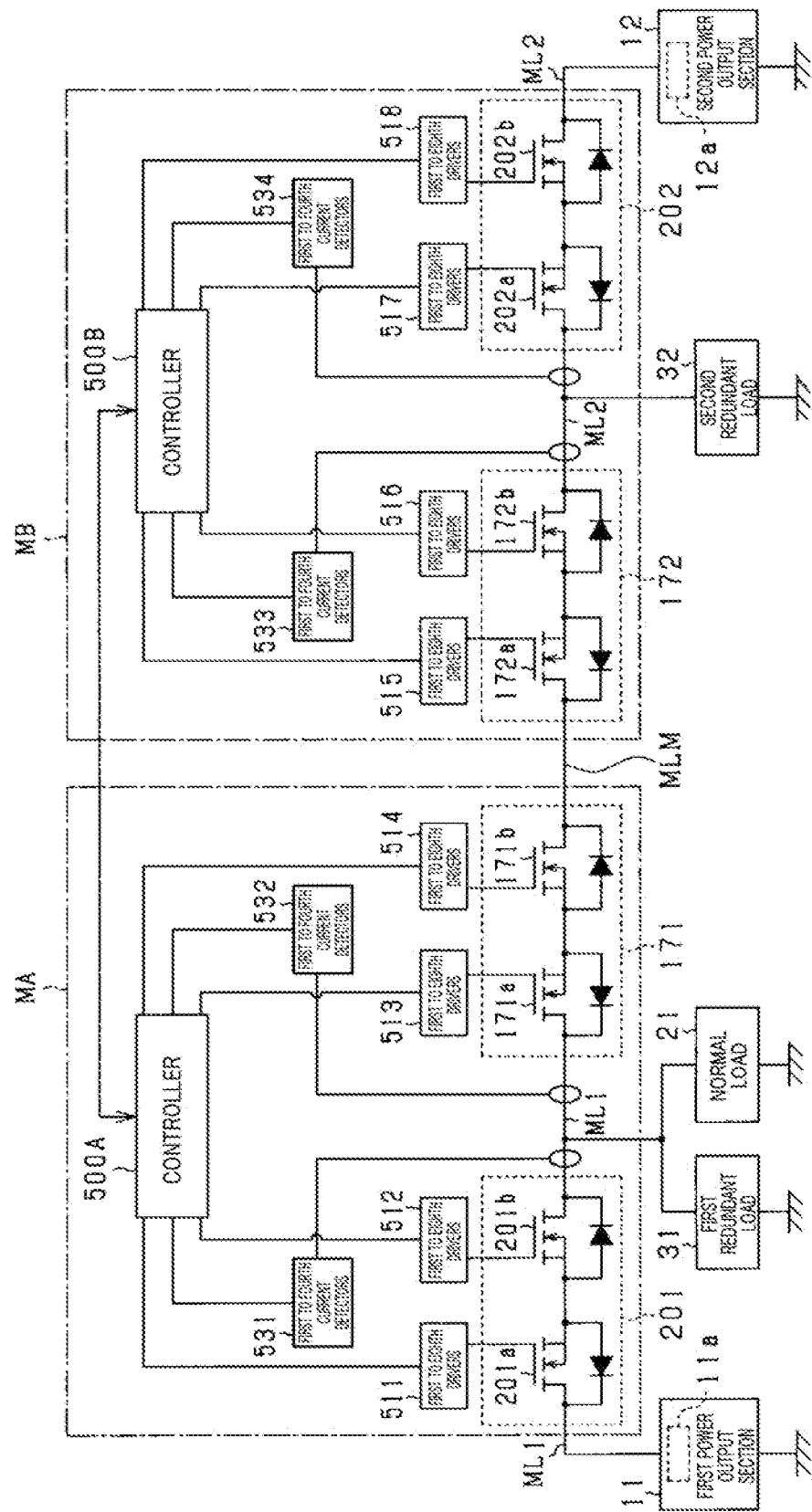
FIG. 51 is an overall configuration diagram of an in-vehicle power supply system according to a modification example of the twenty-fifth embodiment.

The present invention is not limited to a configuration in which current detectors are provided individually for each of the switching devices that constitute an inter-system switch or an intra-system switch. As shown in FIG. 51, a configuration may be used in which current detectors are provided for each of respective inter-system switches and intra-system switches. In FIG. 51, components corresponding to components shown in FIG. 50 are designated by the same reference numerals as in FIG. 50, for convenience.

The power supply system includes first to fourth current detectors 531 to 534. The first current detector 531 detects the current flowing through the first intra-system switch 201, and the second current detector 532 detects the current flowing through the first inter-system switch 171. The third current detector 533 detects the current flowing through the second inter-system switch 172, and the fourth current detector 534 detects the current flowing through the second intra-system switch 202. The detection values from the first and second current detectors 531 and 532 are inputted to the first controller 500A. The detection values from the third and fourth current detectors 533 and 534 are inputted to the second controller 500B.

OTHER EMBODIMENTS

It should be noted that each of the above embodiments may be modified as follows.

Figure 52:
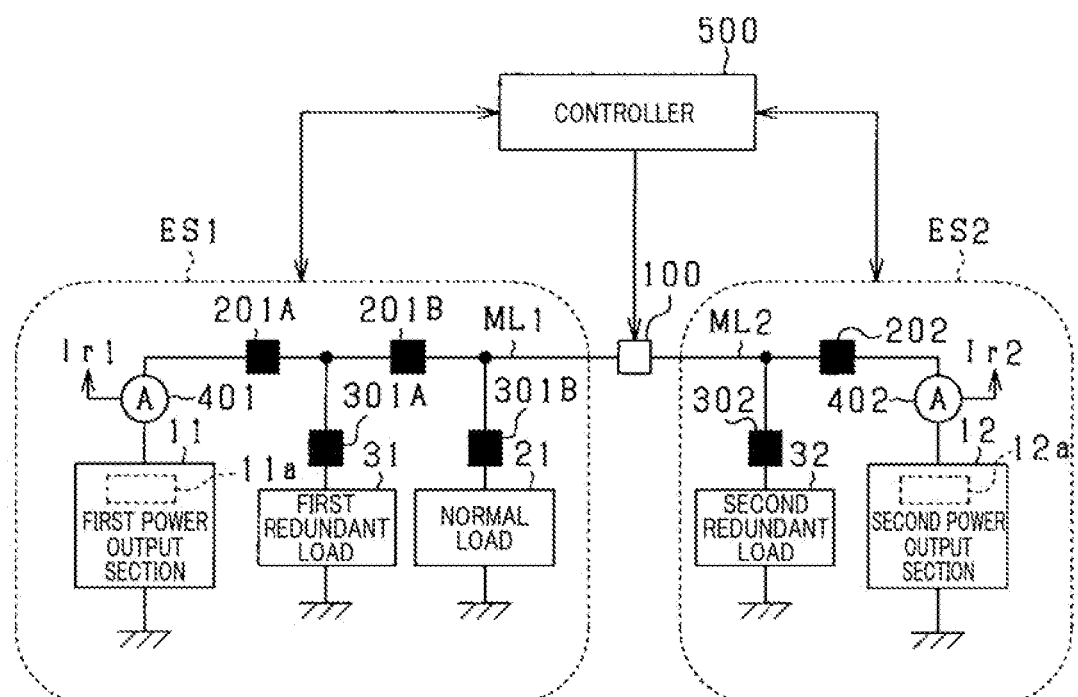
FIG. 52 is an overall configuration diagram of an in-vehicle power supply system according to another embodiment.

The configuration on the first system ES1 side in FIG. 1 may be changed to the configuration shown in FIG. 52.

In the first to nineteenth embodiments, the fuses of the third embodiment may be used in place of the individual switches.

The travel control is not limited to lane keeping support control, but may be the following types of control, for example.

Anti-lock braking control, which prevents the wheels from locking during braking control, may be used. In that case, the first and second redundant loads may be respective ABS actuators which can independently adjust the brake hydraulic pressure of each wheel during braking.

The control may be cruise control, whereby when a preceding vehicle is detected that is traveling at a lower speed than a set speed, the host vehicle is decelerated by braking control to maintain a specific inter-vehicle distance, and when the preceding vehicle is no longer detected, the host vehicle is accelerated to travel at the set speed. With that configuration, the preceding vehicle may be detected by the first B and second B redundant loads 31B and 32B in FIG. 9. In that case, at least one of the first B and second B redundant loads 31B and 32B may be a millimeter wave radar apparatus. Furthermore, in that case, the first A and second A redundant loads 31A and 32A in FIG. 9 may be respective ABS actuators.

The control may be an automatic braking control, which automatically applies a braking force to the wheels when a vehicle or a pedestrian in front of the host vehicle is detected by the first B and second B redundant loads 31B and 32B shown in FIG. 11. In that case, at least one of the first B and second B redundant loads 31B and 32B may be a millimeter wave radar apparatus. Furthermore, in that case, the first A and second A redundant loads 31A and 32A in FIG. 9 may be respective ABS actuators.

The control may be lane change support control, which monitors a blind spot at the rear of the host vehicle, by means of the first B and second B redundant loads 31B and 32B shown in FIG. 11, and which warns the driver of danger when making a lane change. Furthermore, the control may be lane departure warning control which warns the driver when the host vehicle is likely to depart from the travel lane, based on detection information from the first B and second B redundant loads 31B and 32B.

Figure 53:
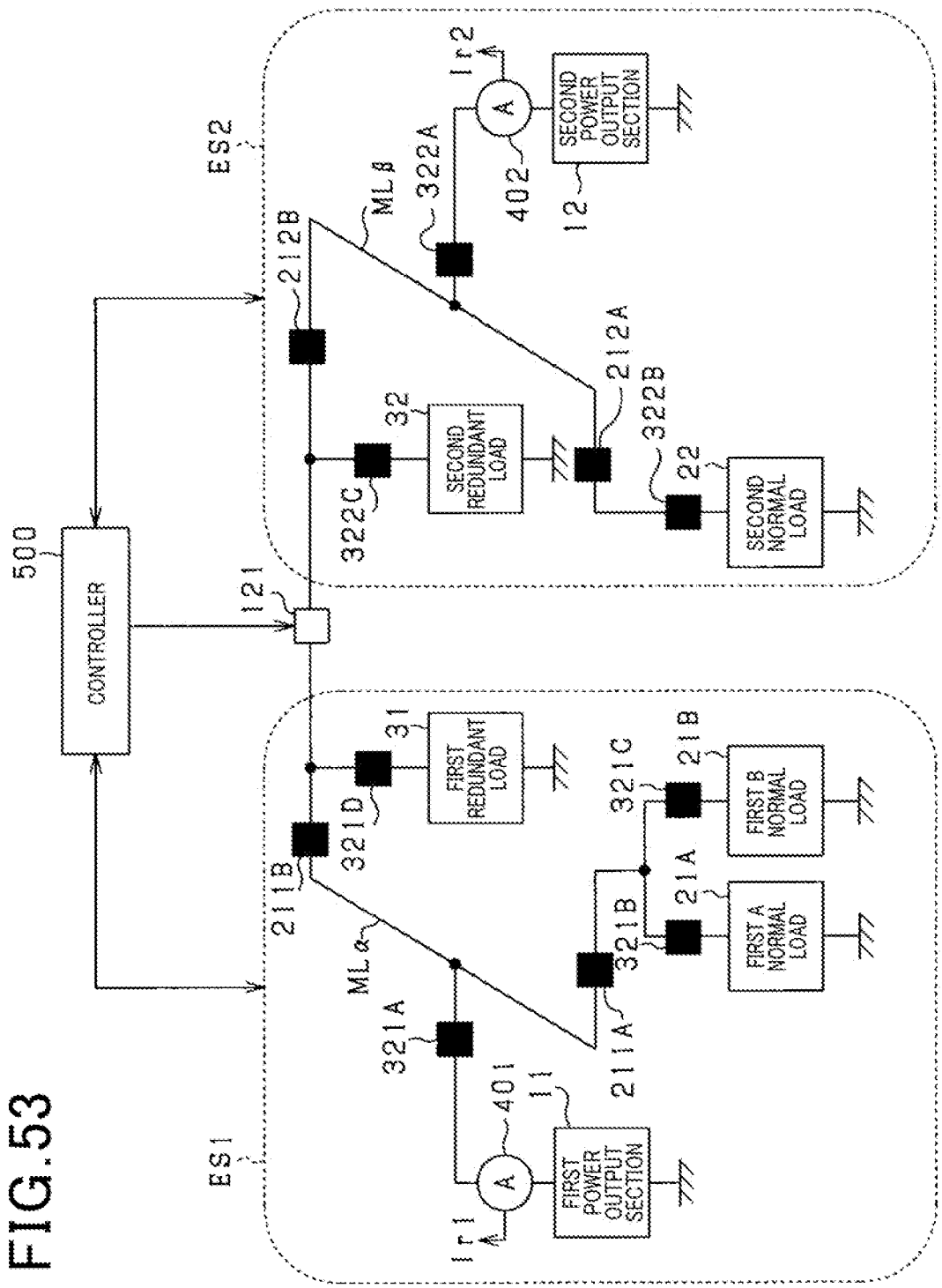
FIG. 53 is an overall configuration diagram of an in-vehicle power supply system according to another embodiment.

Among the power supply systems shown in the above embodiments, for example in the case of a power supply system in which the main paths are not connected in a ring configuration, power output sections are connected to respective ends of a main path via an inter-system switch, however the configuration is not limited to this. For example, a power output section may be connected to a position, in one of respective main paths that are connected via inter-system switches, that is sandwiched between a connection point of one electrical load to the main path and a connection point of another electrical load to the main path. FIG. 53 shows an example of this configuration. In the configuration shown in FIG. 53, the first power output section 11 is connected at a position between the connection point of first A and B normal loads 21A and 21B to the first path MLα and the connection point of the first redundant load 31 to the first path MLα. Moreover, the second power output section 12 is connected to a position in the second path MLβ that is between the respective connection points of the second normal load 22 and the second redundant load 32 to the second path MLβ. In FIG. 53, components that are identical to components shown in FIG. 16 above are designated by the same reference numerals as in FIG. 16, for convenience.

With the first to nineteenth embodiments, turn-on operations are executed sequentially on the target system, starting from the one of the intra-system switches and individual switches that is closest to a power output section, however the present invention is not limited to this. For example, in the target system, turn-on operations may be executed sequentially starting from the one of the intra-system switches that is closest to a power output section, and thereafter executed sequentially starting from the one of the individual switches that is closest to the power output section.

The storage device may for example be a fuel cell, that generates electric power based on hydrogen supplied from a hydrogen storage tank, or may be a capacitor such as an electrical two-layer capacitor or a lithium-ion capacitor, etc.

The DC-DC converter may have only the step-down function, or have only the step-up function.

The vehicle in which the power supply system is installed is not limited to a vehicle having only an engine as a main machine, but may be a vehicle having only a rotary electrical machine, for example. Furthermore, the power supply system is not limited to being destined for installation on vehicle.

Although the present disclosure has been described based on embodiments, it is understood that the disclosure is not limited to these embodiments and the structures thereof. The present disclosure encompasses various modified forms and changes that come within an equivalent scope. Furthermore, various combinations and forms, including other combinations and forms that contain one or more elements, also come within the scope and range of concepts of the present disclosure.

What is claimed is:

1. A power supply system provided with a plurality of power systems, comprising:
    a power output section provided in each of the power systems, that outputs electric power;
    an electrical load provided in each of the power systems, operating from electric power supplied by the power output section;
    main paths for connecting the respective power output sections of adjacent ones of the power systems;
    an inter-system switch provided in the main paths, which is turned on to establish a conducting state between the adjacent power systems and which is turned off to establish a disconnected state between the adjacent power systems;
    an intra-system switch provided in each of the power systems, disposed in a part of a main path that is closer to the power output section of the power system than is the inter-system switch, which is turned on to establish a conducting state between the power output section and the electrical load, and is turned off to establish a disconnected state between the power output section and the electrical load;
    a direction detection section that detects the respective directions of current flow through the inter-system switch and the intra-system switches provided in the main paths that connect the power output sections of adjacent ones of the power systems; and
    a switch group specifying section for specifying a switch group consisting of switches that are among the inter-system switches and intra-system switches, that are targets of detection by the direction detection section, are adjacent to one another in the main paths, and have directions of current flow which are opposite one another; wherein
    the main paths of the power systems are connected in the form of a ring via the inter-system switches; and
    the switch group specifying section specifies a switch group formed of a group of switches that are disposed adjacent to one other in a main path, that have detected current flow directions which are opposite to each other, and through which the current flow exceeds a threshold value of current.

2. A power supply system provided with a plurality of power systems, comprising:
    a power output section provided in each of the power systems, that outputs electric power;
    an electrical load provided in each of the power systems, operating from electric power supplied by the power output section;
    main paths for connecting the respective power output sections of adjacent ones of the power systems;
    an inter-system switch provided in the main paths, which is turned on to establish a conducting state between the adjacent power systems and which is turned off to establish a disconnected state between the adjacent power systems;
    an intra-system switch provided in each of the power systems, disposed in a part of a main path that is closer to the power output section of the power system than is the inter-system switch, which is turned on to establish a conducting state between the power output section and the electrical load, and is turned off to establish a disconnected state between the power output section and the electrical load;
    a detector provided in each of the power systems, for detecting an output current from the power output section;
    a current judgement section for judging when the output current detected by the detector has increased above a threshold value of current;
    an inter-system operating section that turns off the inter-system switch, for establishing a disconnected state between adjacent ones of the plurality of power systems, in response to the current judgement section judging that the output current detected by the detector in at least one of the power systems exceeds the threshold value of current; and
    a switch group specifying section for specifying a switch group consisting of switches that are among the inter-system switches and intra-system switches, that are targets of detection by the direction detection section, are adjacent to one another in the main paths, and have directions of current flow which are opposite one another;
    wherein the main paths of the power systems are connected in the form of a ring, via the inter-system switches.

* * * * *